United States Patent
Woo et al.

(10) Patent No.: US 10,083,555 B2
(45) Date of Patent: Sep. 25, 2018

(54) CAR CONTROL METHOD OF ELECTRONIC APPARATUS AND ELECTRONIC APPARATUS THEREOF

(71) Applicant: SAMSUNG ELECTRONICS CO., LTD., Suwon-si, Gyeonggi-do (KR)

(72) Inventors: Jeong Woo, Yongin-si (KR); Jae Il An, Seongnam-si (KR); Jae-Young Shin, Yongin-si (KR); Sehwan Choi, Suwon-si (KR); Hyun-Ju Hong, Osan-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/440,627

(22) Filed: Feb. 23, 2017

(65) Prior Publication Data

US 2017/0249791 A1     Aug. 31, 2017

(30) Foreign Application Priority Data

Feb. 29, 2016  (KR) .......................... 10-2016-0024238

(51) Int. Cl.
*H04B 17/318* (2015.01)
*G07C 9/00* (2006.01)

(52) U.S. Cl.
CPC ...... *G07C 9/00111* (2013.01); *G07C 9/00309* (2013.01); *H04B 17/318* (2015.01); *G07C 2009/0042* (2013.01); *G07C 2009/00793* (2013.01)

(58) Field of Classification Search
None
See application file for complete search history.

(56) References Cited

U.S. PATENT DOCUMENTS

| | | | | |
|---|---|---|---|---|
| 6,924,750 B2* | 8/2005 | Flick | ...................... | B60R 25/04 340/989 |
| 7,898,386 B2* | 3/2011 | Wisnia | .................... | B60R 25/04 340/5.62 |
| 7,961,094 B2* | 6/2011 | Breed | ................ | G08B 13/1663 340/541 |
| 8,050,815 B2* | 11/2011 | Perry | .................. | B60R 25/2018 340/425.5 |

FOREIGN PATENT DOCUMENTS

| KR | 10-2007-0060303 | 6/2007 |
|---|---|---|
| KR | 10-201000079607 | 7/2010 |

\* cited by examiner

*Primary Examiner* — K. Wong
(74) *Attorney, Agent, or Firm* — Nixon & Vanderhye P.C.

(57) ABSTRACT

The present disclosure relates generally to a vehicle control method of an electronic device, and the electronic device. The electronic device may include a display, a first communication circuit, a second communication circuit, one or more sensors, a memory, and a processor electrically coupled to the display, the first communication circuit, the second communication circuit, the memory, and the one or more sensors. The memory may store at least one instruction, when executed by the processor causes the electronic device to: detect a Received Signal Strength Indicator (RSSI) value of a Radio Frequency (RF) signal received from a vehicle through the first communication circuit, convert the detected RSSI value based on deviation information stored in the memory, and transmit the RF signal including the converted RSSI value to the vehicle through the first communication circuit.

20 Claims, 33 Drawing Sheets

Immobilization

Remote Keyless Entry

Keyless Entry / Go

Smart Access

CAR CONTROL METHOD OF ELECTRONIC APPARATUS AND ELECTRONIC APPARATUS THEREOF

CROSS-REFERENCE TO RELATED APPLICATION

This application is based on and claims priority under 35 U.S.C. § 119 to a Korean patent application filed in the Korean Intellectual Property Office on Feb. 29, 2016 and assigned Serial No. 10-2016-0024238, the disclosure of which is incorporated by reference herein in its entirety.

BACKGROUND

1. Field of the Disclosure

The present disclosure relates generally to a vehicle control method of an electronic device, and the electronic device thereof.

2. Description of Related Art

A vehicle control system may remotely control a vehicle. For example, the vehicle control system may include the vehicle and a remote car key carried by a user. For example, the vehicle may include a vehicular electronic device such as an Electronic Control Unit (ECU) or the like, and the vehicular electronic device may interwork with the remote car key carried by the user.

The vehicular electronic device and the remote car key may be variously called in any other terms. For example, the remote car key may be called a smart key or the like, and the electronic device for the vehicle control may be called a vehicle or electronic control unit.

For example, the electronic control unit may be manufactured of one device or circuit or the like, and a remote car key control device or circuit or the like which interworks with the smart key through wireless communication may be included in the electronic control unit.

The remote car key control device or circuit may be variously called in any other terms. For example, the remote car key control device or circuit may be variously called such as a smart key module or the like.

SUMMARY

According to various example embodiments, the smart key may be manufactured, sold, and used in pair with a smart key module equipped in the vehicle. For example, since the smart key must be always carried by a user as an independent single small electronic device, inconvenience may be caused when it is carried, and there may be a risk of losing it.

According to various example embodiments, a vehicle control method of an electronic device and the electronic device thereof may be provided so that the electronic device such as a smart phone or the like can perform a remote vehicle control through wireless communication with a smart key module of a vehicle.

According to various example embodiments, a vehicle control method of an electronic device and the electronic device thereof may be provided so that various additional service such as smart key registering, discarding, reissuing, right restriction, and temporary key issuing or the like can be performed by using the electronic device.

According to various example embodiments of the present disclosure, an electronic device may include a display, a first communication circuit, a second communication circuit, one or more sensors, a memory, and a processor electrically coupled to the display, the first communication circuit, the second communication circuit, the memory, and the one or more sensors. The memory may store at least one instruction, when executed by the processor causes the electronic device to detect a Received Signal Strength Indicator (RSSI) value of a Radio Frequency (RF) signal received from a vehicle through the first communication circuit, to convert the detected RSSI value based on deviation information stored in the memory, and to transmit the RF signal including the converted RSSI value to the vehicle through the first communication circuit.

According to various example embodiments of the present disclosure, an electronic device may include a display, a first communication circuit configured to support a cellular communication protocol, a second communication circuit configured to adjust a magnitude of an output signal and configured to support a short-distance communication protocol, at least one sensor, a processor electrically connected to the display, the first communication circuit, the second communication circuit, and the sensor, and a storage unit electrically connected to the processor. The storage unit may store at least one instruction, when executed by the processor causes the electronic device to receive first information related to a selected vehicle through the first communication circuit or the second communication circuit, to store the received first information and/or second information generated or provided based on at least one part of the first information in the storage unit, to receive a first signal from the selected vehicle using the second communication circuit and/or the sensor, to determine strength of the first signal, to change the determined strength using the second information, and to transmit information regarding the changed strength to the outside either with a selected cycle or during a selected time using the second communication circuit.

According to various example embodiments of the present disclosure, an electronic device may include a display, a first communication circuit configured to support a cellular communication protocol, a second communication circuit configured to adjust a magnitude of an output signal and to support a short-distance communication protocol, at least one sensor, a processor electrically connected to the display, the first communication circuit, the second communication circuit, and the sensor, and a storage unit electrically connected to the processor. The electronic device may store at least one instruction, when executed by the processor causes the electronic device to acquire first information related to a selected vehicle and second information related to the electronic device and/or a user of the electronic device through the first communication circuit or the second communication circuit, to transmit to a server the acquired first information and/or at least one part of the first information and the second information and/or at least one part of the second information to request issuing of a smart key for the vehicle, to download the smart key issued from the server, and to store the smart key in the electronic device.

BRIEF DESCRIPTION OF THE DRAWINGS

The above and other aspects, features and attendant advantages of the present disclosure will be more readily appreciated and understood from the following detailed description, taken in conjunction with the accompanying drawings, in which like reference numerals refer to like elements, and wherein.

DETAILED DESCRIPTION

Figure 1:
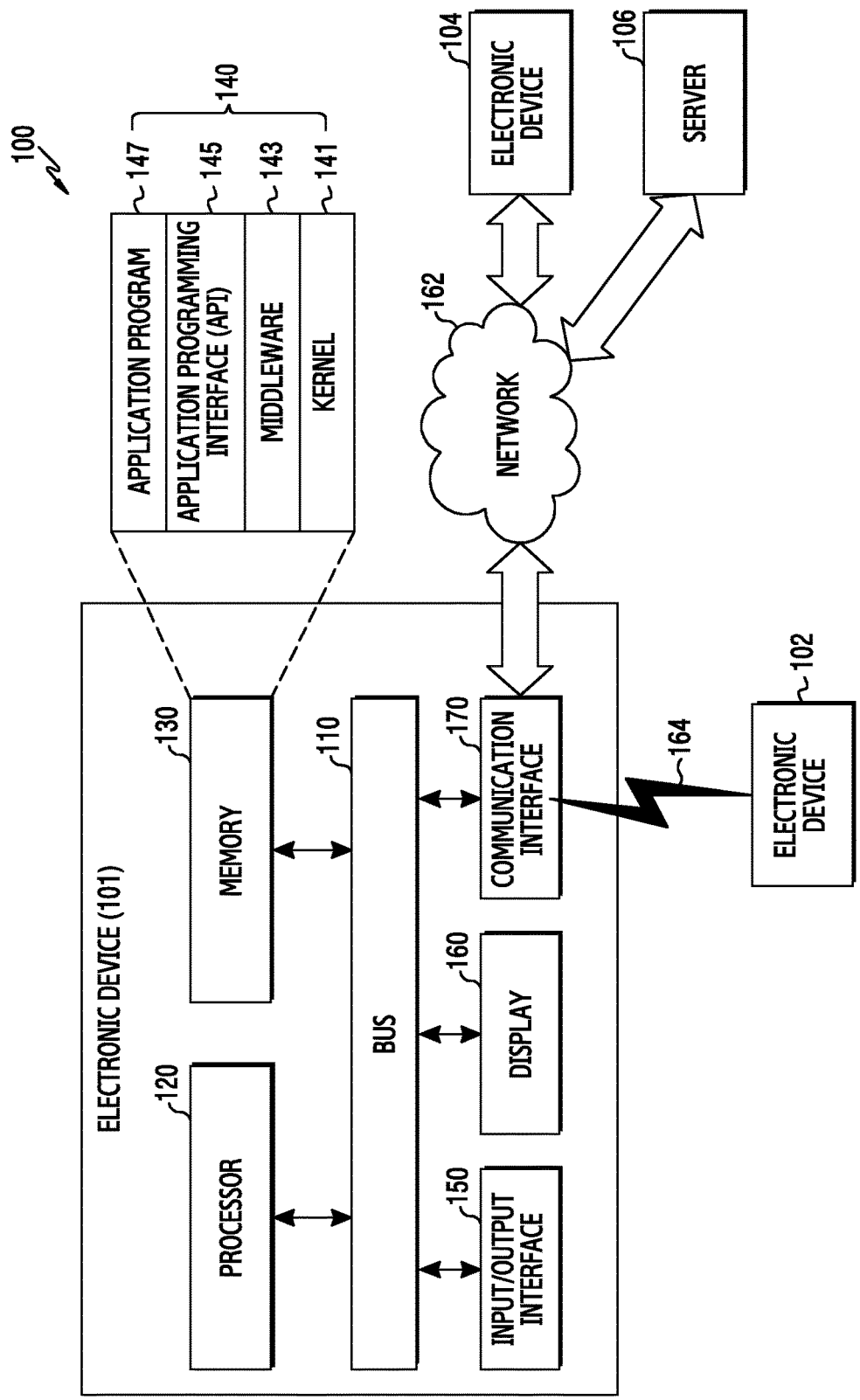
FIG. 1 is a diagram illustrating an example network environment including an example electronic device according to various example embodiments.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments illustrated in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the disclosure, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may used interchangeably with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may refer to a situation in which the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch), or the like, but is not limited thereto.

According to some embodiments, the electronic device (ex. home appliance) may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates an electronic device 101 within a network environment 100 according to various example embodiments of the present disclosure.

Referring to FIG. 1, the electronic device 101 can include a bus 110, a processor (e.g., including processing circuitry) 120, a memory 130, an input/output interface (e.g., including input/output circuitry) 150, a display (e.g., including display circuitry) 160, and a communication interface (e.g., including communication circuitry) 170. In any example embodiment, the electronic device 101 can omit at least one of the constituent elements or additionally have another constituent element.

The bus 110 can, for example, include a circuit coupling the constituent elements 120 to 170 with one another and forwarding communication (e.g., a control message and/or data) between the constituent elements.

The processor 120 can include various processing circuitry, such as, for example, and without limitation, one or more of a dedicated processor, a Central Processing Unit (CPU), an Application Processor (AP), a Communication Processor (CP) or an Image Signal Processor (ISP). The processor 120 can, for example, execute operation or data processing for control and/or communication of at least one other constituent element of the electronic device 101.

The memory 130 can include a volatile and/or non-volatile memory. The memory 130 can, for example, store an instruction or data related to at least one other constituent element of the electronic device 101. According to one example embodiment, the memory 130 can store a software and/or program 140. For example, the program 140 can include a kernel 141, a middleware 143, an Application Programming Interface (API) 145, an application program (or "application") 147, etc. At least a part of the kernel 141, the middleware 143, or the API 145 can be called an Operating System (OS).

The kernel 141 can, for example, control or manage system resources (e.g., the bus 110, the processor 120, the memory 130, etc.) that are used for executing operations or functions implemented in other programs (e.g., the middleware 143, the API 145, or the application program 147). Also, the kernel 141 can provide an interface that is capable of controlling or managing the system resources by enabling the middleware 143, the API 145, or the application program 147 to gain access to the individual constituent element of the electronic device 101.

The middleware 143 can, for example, perform a relay role of enabling the API 145 or the application program 147 to communicate and exchange data with the kernel 141. Also, the middleware 143 can process one or more work requests received from the application program 147 in accordance with the order of priority. For example, the middleware 143 can grant at least one of the application programs 147 the order of priority capable of using the system resources (e.g., the bus 110, the processor 120, the memory 130, etc.) of the electronic device 101, and process the one or more work requests. The API 145 is, for example, an interface of enabling the application program 147 to control a function of the kernel 141 or the middleware 143, and can, for example, include at least one interface or function (e.g., instruction) for file control, window control, picture processing, character control, etc.

The input/output interface 150 may include various input/output circuitry and function as, for example, an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display, or the like, but is not limited thereto. The display 160 may display, for example, various types of contents (for example, text, images, videos, icons, or symbols) for the user. The display 160 may include a touch screen and receive, for example, a touch, gesture, proximity, or hovering input by using an electronic pen or the user's body part. Thus, the display 160 may be referred to as a touch screen.

The communication interface 170 may include various communication circuitry and set communication between, for example, the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. Further, the wireless communication may include, for example, short-range communication 164. The short-range communication may include at least one of, for example, Wi-Fi, Bluetooth, Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard-232 (RS-232, and a Plain Old Telephone Service (POTS). The network 162 may include at least one of a communication network such as a computer network (e.g., a LAN or a WAN), the Internet, and a telephone network.

Each of the first and second external electronic devices 102 and 104 may be a device which is the same as or different from the electronic device 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104, or the server 106) may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

Figure 2:
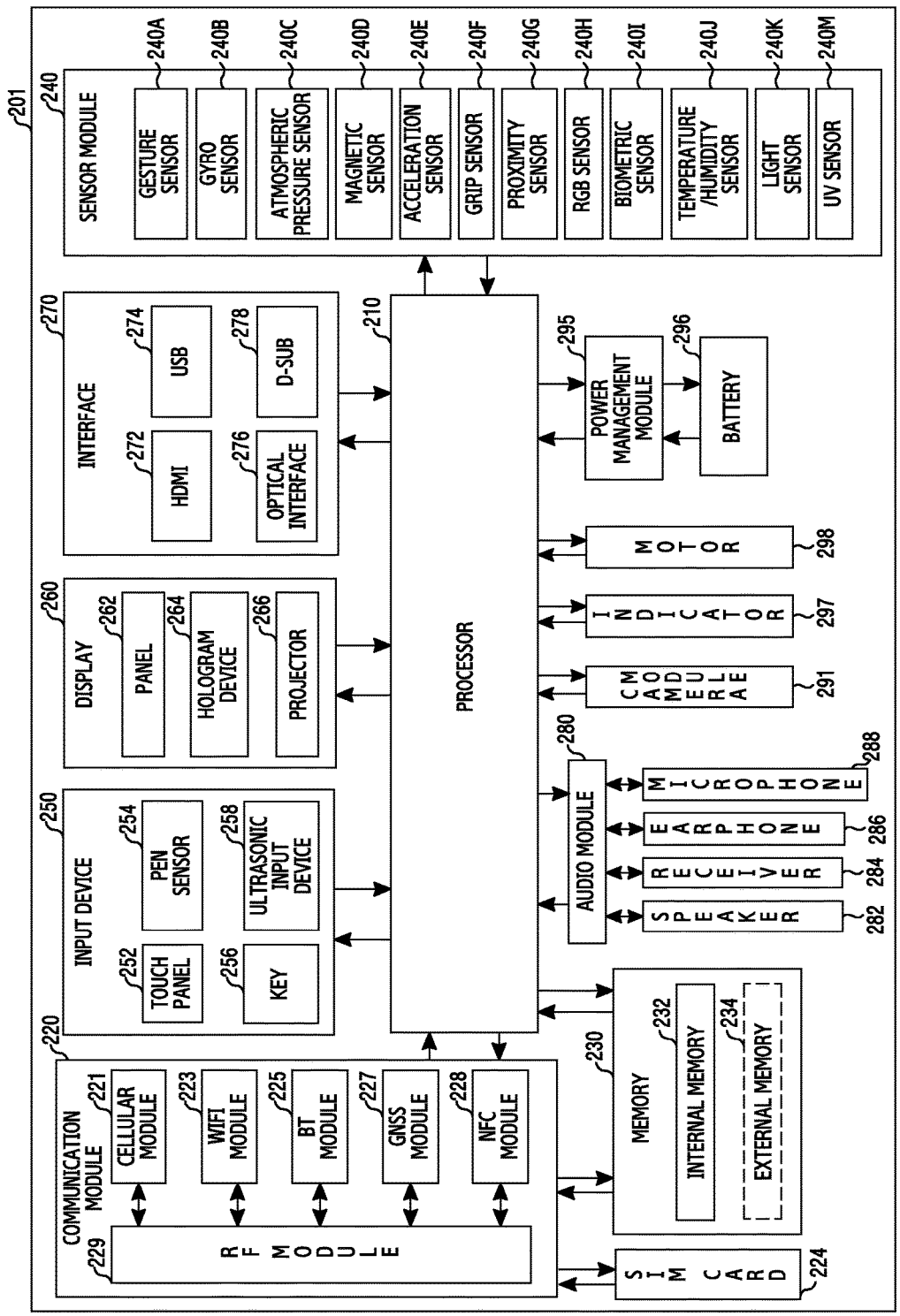
FIG. 2 is a block diagram illustrating an example electronic device according to various example embodiments.

FIG. 2 is a block diagram illustrating an example electronic device according to an example embodiment of the present disclosure. In the following description, the electronic device 201 may be, for example, the entire electronic device 100 illustrated in FIG. 1 or part of the electronic device 101.

Referring to FIG. 2, the electronic device 201 may include one or more processors (for example, an AP) (e.g., including processing circuitry) 210, a communication module (e.g., including communication circuitry) 220, a subscriber identity module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may run, for example, an operating system (OS) or application program to control a plurality of hardware or software components connected to the processors 210 and may perform various kinds of data processing and operations. The processors 210 may be configured, for example, as a system on chip (SoC). According to one example embodiment, the processors 210 may further include a graphic processing unit (GPU) and/or an image signal processor. The processors 210 may include at least part (for example, a cellular module 221) of the components illustrated in FIG. 2. The processors 210 may load a command or data received from at least one of other components (for example, a nonvolatile memory) into a volatile memory to process the command or data and may store various kinds of data in the nonvolatile memory.

The communication module 220 may have a configuration the same as or similar to that of the communication interface 170 in FIG. 1. The communication module 220 may include various communication circuitry, such as, for example, and without limitation, a cellular module 221, a Wi-Fi module 223, a Bluetooth module 225, a global navigation satellite system (GNSS) module 227 (for example, a global positioning system (GPS) module, a Glonass module, a Beidou module, or a Galileo module), a near field communication (NFC) module 228, and a radio frequency (RF) module 229.

The cellular module 221 may provide, for example, a voice call, a video call, a text message service, an Internet service, etc. through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 may provide. According to an embodiment, the cellular module 221 may include a communication processor (CP).

The Wi-Fi module 223, the BT module 225, the GNSS module 227, or the NFC module 228 may include, for example, a processor for processing data that is transmitted and received through the corresponding module. According to some embodiments, at least some (two or more) of the cellular module 221, the Wi-Fi module 223, the Bluetooth module 225, the GNSS module 227, and the NFC module 228 may be included in one Integrated Chip (IC) or IC package.

The RF module 229 may transmit and receive, for example, a communication signal (for example, an RF signal). The RF module 229 may include, for example, a transceiver, a power amplifier (amp) module (PAM), a frequency filter, a low noise amplifier (LNA), an antenna, or the like. According to another example embodiment, at least one of the cellular module 221, the Wi-Fi module 223, the Bluetooth module 225, the GNSS module 227, and the NFC module 228 may transmit and receive an RF signal through a separate RF module.

The SIM 224 may include, for example, a card including an SIM and/or an embedded SIM and may include unique identification information (for example, an integrated circuit card identifier (ICCID)) or subscriber information (for example, an international mobile subscriber identity (IMSI)).

The memory 230 (for example, a memory 130) may include, for example, an internal memory 232 and/or an external memory 234. The internal memory 232 may include, for example, at least one of a volatile memory (for example, a dynamic random-access memory (DRAM), a static RAM (SRAM), a synchronous dynamic RAM (SDRAM), or the like) and a nonvolatile memory (for example, a one-time programmable read-only memory (OTPROM), a programmable ROM (PROM), an erasable and programmable ROM (EPROM), an electrically erasable and a programmable ROM (EEPROM), a mask ROM, a flash ROM, a flash memory (for example, an NAND flash, an NOR flash, or the like), a hard drive, or a solid state drive (SSD)).

The external memory 234 may further include a flash drive, for example, a compact flash (CF), a secure digital (SD), a micro secure digital (micro-SD), a mini secure digital (mini-SD), an extreme digital (xD), a multi-media card (MMC), a memory stick, or the like. The external memory 234 may be functionally and/or physically connected to the electronic device 201 through various interfaces.

The sensor module 240 may measure, for example, physical quantities or detect an operation state of the electronic device 201 and convert measured or detected information into an electrical signal. The sensor module 240 may include, for example, at least one of a gesture sensor 240A, a gyro sensor 240B, a barometric pressure sensor (e.g., atmospheric pressure sensor) 240C, a magnetic sensor 240D, an accelerometer 240E, a grip sensor 240F, a proximity sensor 240G, a color sensor 240H (for example, a red, green, and blue (RGB) sensor), a biometric sensor 240I, a temperature/humidity sensor 240J, a illumination (e.g., light) sensor 240K, a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, a force touch sensor, an ultrasonic sensor, and/or a fingerprint sensor. The sensor module 240 may further include a control circuit to control at least one or more sensors belonging thereto. In one example embodiment, the electronic device 201 may further include a processor configured, as a part of the processors 210 or separately from the processors 210, to control the sensor module 240, thereby controlling the sensor module 240 while the processors 210 is in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of an electrostatic type, a pressure-sensitive type, an infrared type, and an ultrasonic type. Further, the touch panel 252 may further include a control circuit. The touch panel 252 may further include a tactile layer to provide a user with a tactile response.

The (digital) pen sensor 254 may, for example, be part of the touch panel or include a separate recognition sheet. The key 256 may include, for example, a physical button, an optical key, or a keypad. The ultrasonic device 258 may detect ultrasonic waves generated in an input tool through a microphone (for example, a microphone 288) and identify data corresponding to the detected ultrasonic waves.

The display 260 (for example, a display 160) may include a panel 262, a hologram device 264, or a projector 266. The panel 262 may include a configuration that is the same as or similar to that of the display 160 of FIG. 1. The panel 262 may be configured, for example, to be flexible, transparent, or wearable. The panel 262 may be formed with the touch panel 252 in a single module. According to one example embodiment, the panel 262 may include a pressure sensor (or force sensor) to measure the strength of pressure by a user touch. The pressure sensor may be configured in an integrated form with the touch panel 252 or be configured as one or more sensors separate from the touch panel 252. The hologram device 264 may display a three-dimensional image in the air using the interference of light. The projector 266 may project light onto a screen to display an image. The screen may be disposed, for example, inside or outside the electronic device 201. According to one example embodiment, the display 260 may further include a control circuit to control the panel 262, the hologram device 264, or the projector 266.

The interface 270 may include various interface circuitry, such as, for example, and without limitation a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, an SD card/MMC interface, or an Infrared Data Association (IrDA) interface.

The audio module 280 may convert, for example, a sound and an electrical signal reciprocally. At least some components of the audio module 280 may be included, for example, in an input/output interface 150 illustrated in FIG. 1. The audio module 280 may process sound information input or output, for example, through a speaker 282, a receiver 284, earphones 286, or the microphone 288.

The camera module 291 is a device that takes, for example, a still image and a video. According to one example embodiment, the camera module 291 may include one or more image sensors (for example, a front sensor or a rear sensor), a lens, an image signal processor (ISP), or a flash (for example, an LED, a xenon lamp, or the like).

The power management module 295 may manage, for example, the power of the electronic device 201. According to one example embodiment, the power management module 295 may include a power management integrated circuit (PMIC), a charger integrated circuit (IC), or a battery or fuel gauge. The power management module 295 may be supplied with power from the outside via a cable and/or wirelessly. For example, the power management module 295 may be supplied with power from the outside using a wireless charging method, such as a magnetic resonance method, a magnetic induction method, or an electromagnetic wave method. The power management module 295 may further include an additional circuit, such as a coil loop, a resonance circuit, or a rectifier, to be supplied with power wirelessly. The battery gauge may measure, for example, the remaining battery charge, the charging voltage, the current, or temperature of the battery 296.

The battery 296 may include, for example, a rechargeable battery and/or a solar battery. According to one example embodiment, the battery 296 may include a plurality of cells connectable in series or in parallel.

The indicator 297 may display a specific state of the electronic device 201 or a component thereof (for example, the processors 210), for example, a booting state, a message state, or a charging state. The motor 298 may convert an electrical signal into mechanical vibrations and may generate vibrations or a haptic effect. Although not shown, the electronic device 201 may include a processing device for supporting a mobile TV (for example, a GPU). The processing device for supporting the mobile TV may process media data in accordance with digital multimedia broadcasting (DMB), digital video broadcasting (DVB), or mediaFlo™ standards.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
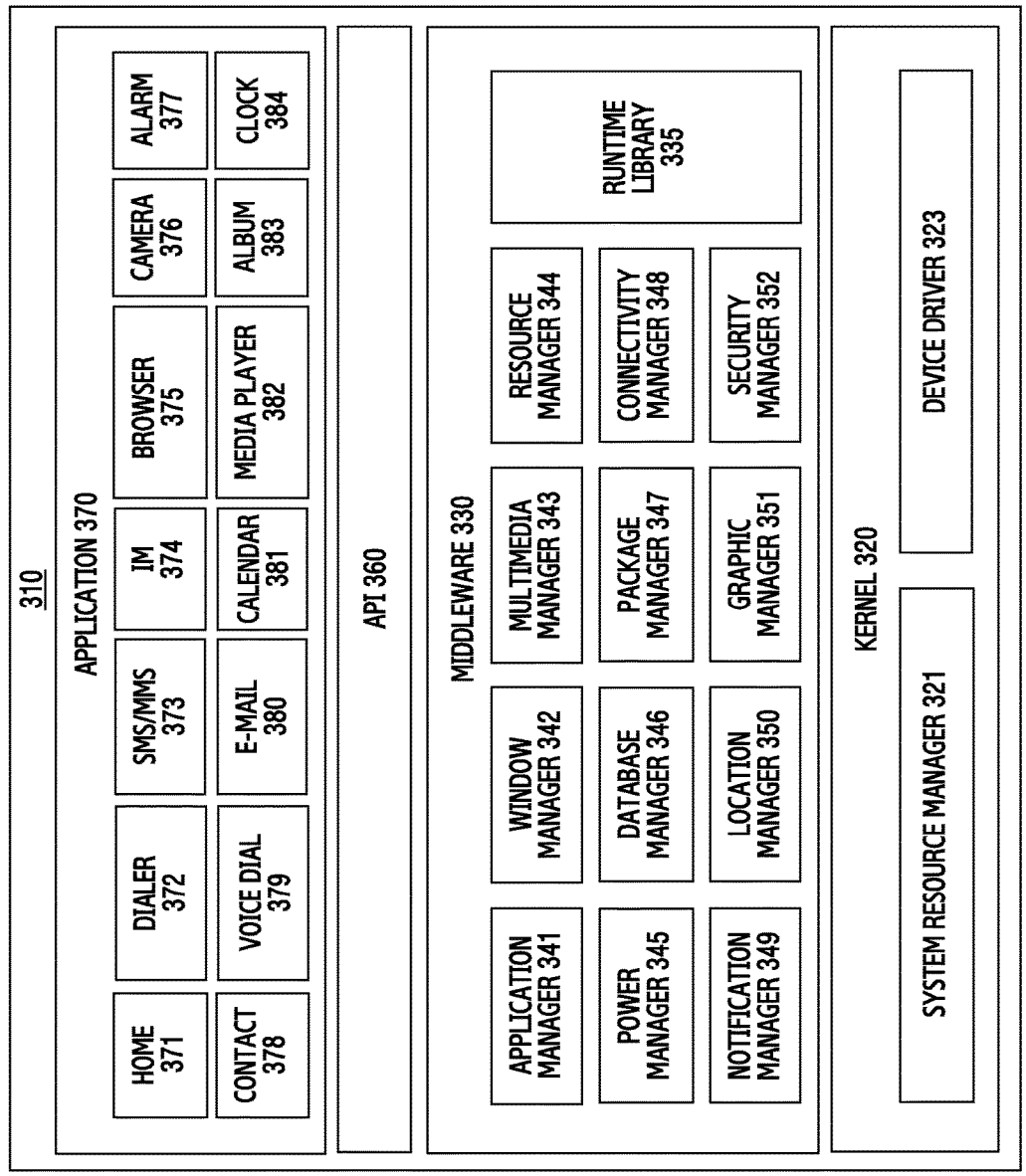
FIG. 3 is a block diagram illustrating an example programming module of an electronic device according to various example embodiments.

FIG. 3 is a block diagram illustrating an example program module according to various example embodiments. According to one example embodiment, the program module 310 (e.g., the program 140) can include an Operating System (OS) controlling resources related to an electronic device (e.g., the electronic device 101), and/or various applications (e.g., the application program 147) run on the operating system. The operating system can, for example, include Android™, iOS™, Windows™, Symbian™, Tizen™, or Bada™.

Referring to FIG. 3, the program module 310 can include a kernel 320 (e.g., the kernel 141), a middleware 330 (e.g., the middleware 143), an API 360 (e.g., the API 145), and/or an application 370 (e.g., the application program 147). At least some of the program module 310 can be preloaded onto an electronic device, or can be downloaded from an external electronic device (e.g., the electronic device 102, 104, the server 106, etc.).

The kernel 320 can, for example, include a system resource manager 321 and/or a device driver 323. The system resource manager 321 can perform the control of system resources, the allocation thereof, or the recovery thereof. According to one example embodiment, the system resource manager 321 can include a process management unit, a memory management unit, or a file system management unit. The device driver 323 can, for example, include a display driver, a camera driver, a Bluetooth driver, a shared memory driver, a USB driver, a keypad driver, a WiFi driver, an audio driver, or an Inter-Process Communication (IPC) driver.

The middleware 330 can, for example, provide a function that the application 370 commonly needs, or provide various functions to the application 370 through the API 360 so that the application 370 may make use of restricted system resources within an electronic device. According to one example embodiment, the middleware 330 can include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 can, for example, include a library module that a compiler uses so as to add a new function through a programming language while the application 370 is executed. The runtime library 335 can perform input output management, memory management, or arithmetic function processing. The application manager 341 can, for example, manage a lifecycle of the application 370. The window manager 342 can manage a GUI resource that is used in a screen. The multimedia manager 343 can determine a format required for playing of media files, and perform the encoding or decoding of the media file by using a codec suitable for the corresponding format. The resource manager 344 can manage a source code of the application 370 or a space of a memory. The power manager 345 can, for example, manage a battery capacity or a power source, and provide power information required for an operation of an electronic device. According to one example embodiment, the power manager 345 can interwork with a Basic Input/Output System (BIOS). The database manager 346 can, for example, generate, search or change a database that will be used in the application 370. The package manager 347 can manage the installation or updating of an application distributed in a form of a package file.

The connectivity manager 348 can, for example, manage wireless connectivity. The notification manager 349 can, for example, provide events such as an arrival message, an appointment, a proximity notification, etc. to a user. The location manager 350 can, for example, manage location information of an electronic device. The graphic manager 351 can, for example, manage a graphic effect that will be provided to the user, or a user interface related with this. The security manager 352 can, for example, provide system security or user authentication. According to one example embodiment, the middleware 330 can include a telephony manager for managing a voice or video telephony function of the electronic device, or a middleware module capable of forming a combination of functions of the aforementioned constituent elements. According to one example embodiment, the middleware 330 can provide a module that is specialized by operating system type. The middleware 330 can dynamically delete some of the existing constituent elements or add new constituent elements. The API 360 is, for example, a set of API programming functions, and can be provided to have another construction in accordance with an operating system. For example, Android or iOS can provide one API set by platform, and Tizen can provide two or more API sets by platform.

The application 370 can, for example, include a home 371, a dialer 372, a Short Message Service (SMS)/Multimedia Message Service (MMS) 373, an Instant Message (IM) 374, a browser 375, a camera 376, an alarm 377, a contact 378, a voice dial 379, an electronic mail (e-mail) 380, a calendar 381, a media player 382, an album 383, a clock 384, health care (e.g., measuring a momentum, a blood sugar, etc.), or an environment information (e.g., air pressure, humidity, temperature information) provision application. According to one example embodiment, the application 370 can include an information exchange application capable of supporting information exchange between an electronic device and an external electronic device. The information exchange application can, for example, include a notification relay application for relaying specific information to the external electronic device, or a device management application for managing the external electronic device. For example, the notification relay application can relay notification information, which is generated in another application of the electronic device, to the external electronic device, or can receive notification information from the external electronic device and provide the received notification information to a user. The device management application can, for example, install, delete, or update a function (e.g., the turn-on/turn-off of the external electronic device itself or some constituent components thereof or the adjustment of a brightness or resolution of a display) of the external electronic device communicating with the electronic device, or an application operating in the external electronic device. According to one example embodiment, the application 370 can include an application (e.g., a health care application of a mobile medical instrument) designated according to an attribute of the external electronic device. According to one example embodiment, the application 370 can include an application received from the external electronic device. At least a part of the program module 310 can be implemented (e.g., executed) by software, firmware, hardware (e.g., the processor 210) or a combination of at least two or more of them, and can include a module for performing one or more functions, a program, a routine, sets of instructions, or a process.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of a dedicated processor, a CPU, an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

The embodiments disclosed herein are provided merely to easily describe technical details of the present disclosure and to help the understanding of the present disclosure, and are not intended to limit the scope of various embodiments of the present disclosure. Therefore, it should be construed that all modifications and changes or various other embodiments based on the technical idea of various embodiments of the present disclosure fall within the scope of various embodiments of the present disclosure.

An apparatus according to various example embodiments of the present disclosure may include all information communication devices supporting a display function, multimedia devices, wearable devices, and application devices thereof, that is, all devices which use one or more of various processors such as, for example, and without limitation, may include a dedicated processor, an Application Processor (AP), a Communication Processor (CP), a Graphic Processing Unit (GPU), and a Central Processing Unit (CPU), or the like.

Hereinafter, an operating method and apparatus will be described according to various example embodiments with reference to the accompanying drawings. However, since the various example embodiments of the present disclosure are not restricted or limited by the content described below, it should be noted that the present disclosure is applicable to the various example embodiments on the basis of example embodiments described below. A hardware-based access method is described for example in the various example embodiments of the present disclosure described hereinafter. However, since the various example embodiments of the present disclosure include a technique in which hardware and software are both used, a software-based access method is not excluded in the example embodiments of the present disclosure.

Hereinafter, a vehicle control method of an electronic device and the electronic device thereof are described in detail according to various example embodiments. The electronic device to which the vehicle control method is applied may be, for example, various types of electronic devices such as a smart phone or the like which is always carried by a user.

Figure 4:
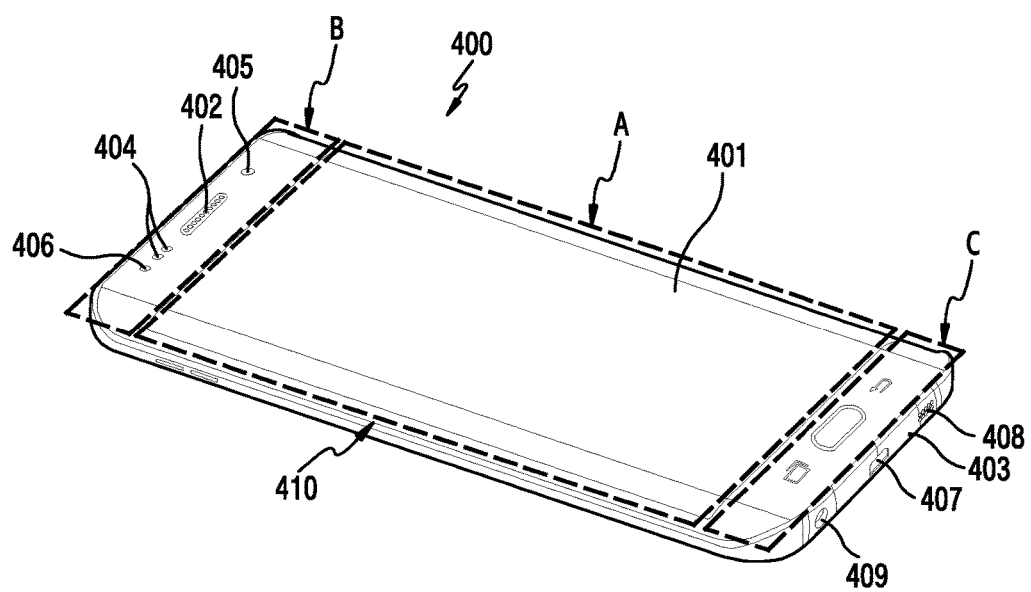
FIG. 4 is a front perspective view illustrating an example electronic device according to various example embodiments of the present disclosure.

FIG. 4 is a front perspective view illustrating an example electronic device according to various example embodiments of the present disclosure. The electronic device according to various example embodiments may include all or some parts of the electronic device 101 of FIG. 1. Referring to FIG. 4 according to various example embodiments, an electronic device 400 may include a display 401 in a front portion. According to various example embodiments, a receiver 402 may be disposed to an upper side of the display 401 to receive a voice of a peer user. According to various example embodiments, a microphone unit 403 may be disposed to a lower side of the display 401 to transmit a voice of a user.

According to various example embodiments, components for performing various functions of the electronic device 400 may be disposed around a portion in which the receiver 402 is installed. The components may include at least one sensor module 404. The sensor module 404 may include, for example, at least one of an illumination sensor (e.g., an optical sensor), a proximity sensor (e.g., an optical sensor), an infrared sensor, and an ultrasonic sensor. According to various example embodiments, the component may include a camera unit 405. According to various example embodiments, the component may include an indicator 406 so that the user recognizes state information of the electronic device.

According to various example embodiments, a speaker unit 408 may be disposed to one side of the microphone unit 403. According to various example embodiments, an interface connector port 407 may be disposed to the other side of the microphone unit 403 by using a data transmission/reception function and external power provided by an external device in order to charge the electronic device 400. According to various example embodiments, an ear-jack hole 409 may be disposed to one side of the interface connector port 407.

According to various example embodiments, the electronic device 400 may include a metal member 410 as a housing. According to various example embodiments, the metal member 410 may be disposed along with a boundary of the electronic device 400, and may also be disposed by being extended up to at least one area extended from the boundary in a rear portion of the electronic device 400.

According to various example embodiments, the metal member 410 defines at least one part of a thickness of the electronic device along with the boundary of the electronic device 400, and may be formed in a closed-loop shape. However, the present disclosure is not limited thereto, and thus the metal member 410 may be formed to correspond to at least one part of the thickness of the electronic device. Alternatively, at least one part of the metal member 410 may be embodied inside the electronic device 400.

According to various example embodiments, if the electronic device 400 operates as a smart key for a vehicle control, the electronic device 400 may include an antenna for transmitting/receiving a signal with respect to a smart key module of the vehicle (e.g., a Low Frequency (LF) antenna for receiving a signal of the smart key module of the vehicle, at least one Ultra High Frequency (UHF) antenna for transmitting a signal to the smart key module of the vehicle, etc.).

According to various example embodiments, the antenna may be disposed to various locations of the electronic device 400. According to various example embodiments, the antenna may be disposed to a display area (e.g., an area A) of the electronic device 400, an upper area (e.g., an area B) of the display, and/or a lower area (e.g., an area C) of the display.

According to various example embodiments, the antenna may be disposed to a constitutional element (e.g., a receiver, a speaker, a Printed Circuit Board (PCB), etc.) of the electronic device 400. According to various example embodiments, the antenna may be configured by using at least one part of the aforementioned metal member 410 if a gain is ensured.

According to various example embodiments, the electronic device 400 may use at least one antenna disposed as described above to perform communication with the vehicle. For example, the electronic device 400 may use at least one antenna included in the electronic device 400 to receive information related to the vehicle from the vehicle, and may transmit another information generated on that basis of at least one part of the received information to the vehicle. For another example, the electronic device 400 may use at least one antenna included in the electronic device 400 to perform a vehicle control operation in a remote manner by performing wireless communication with the smart key module equipped in the vehicle.

Figure 5:
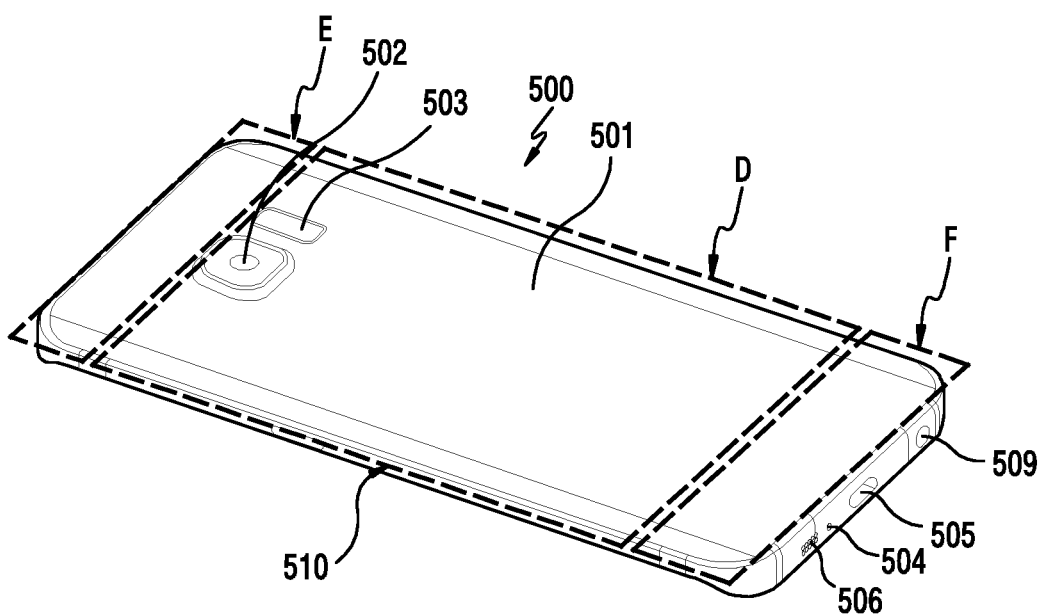
FIG. 5 is a rear perspective view illustrating an example electronic device according to various example embodiments of the present disclosure.

FIG. 5 is a rear perspective view illustrating an example electronic device according to various example embodiments of the present disclosure. The electronic device according to various example embodiments may include all or some parts of the electronic device 101 of FIG. 1.

An electronic device 500 of FIG. 5 may be similar to the electronic device 400 of FIG. 4, or may be for another example embodiment of the electronic device. Referring to FIG. 5 according to various example embodiments, a rear camera unit 502 may be disposed to a rear portion of the electronic device 500, and at least one electronic component 503 may be disposed to one side of the rear camera unit 502.

According to various example embodiments, the electronic component 503 may include at least one of an illumination sensor (e.g., an optical sensor), a proximity sensor (e.g., an optical sensor), an infrared sensor, an ultrasonic sensor, a heart rate sensor, and a flash device. A microphone unit 504, speaker unit 506, interface connector port 505, and ear-jack hole 509 disposed to a lower side of the electronic device 500 may perform the same or similar function of FIG. 4.

According to various example embodiments, if the electronic device 500 operates as a smart key for a vehicle control, the electronic device 500 may include an antenna for transmitting/receiving a signal with respect to a smart key module of the vehicle (e.g., a Low Frequency (LF) antenna for receiving a signal of the smart key module of the vehicle, at least one Ultra High Frequency (UHF) antenna for transmitting a signal to the smart key module of the vehicle, etc.). According to various example embodiments, the antenna may be disposed to various locations of the electronic device 500.

According to various example embodiments, the antenna may be disposed to a center area (e.g., an area D) of a rear portion 501 of the electronic device 500, an upper area (e.g., an area E) of the rear portion 501, and/or a lower area (e.g., an area F) of the rear portion 501. According to various example embodiments, the antenna may be disposed to a constitutional element (e.g., a receiver, a speaker, a Printed Circuit Board (PCB), etc.) of the electronic device 500.

According to various example embodiments, the antenna may be configured by using at least one part of a metal member 510 including at least one part of the electronic device 500 if a gain is ensured.

According to various example embodiments, the electronic device 500 may use at least one antenna disposed as described above to perform communication with the vehicle. For example, the electronic device 500 may use at least one antenna disposed as described above to receive information related to the vehicle from the vehicle, and may transmit another information generated on that basis of at least one part of the received information to the vehicle. For another example, the electronic device 500 may use at least one antenna disposed as described above to perform a vehicle control operation in a remote manner by performing wireless communication with the smart key module equipped in the vehicle.

Figure 6:
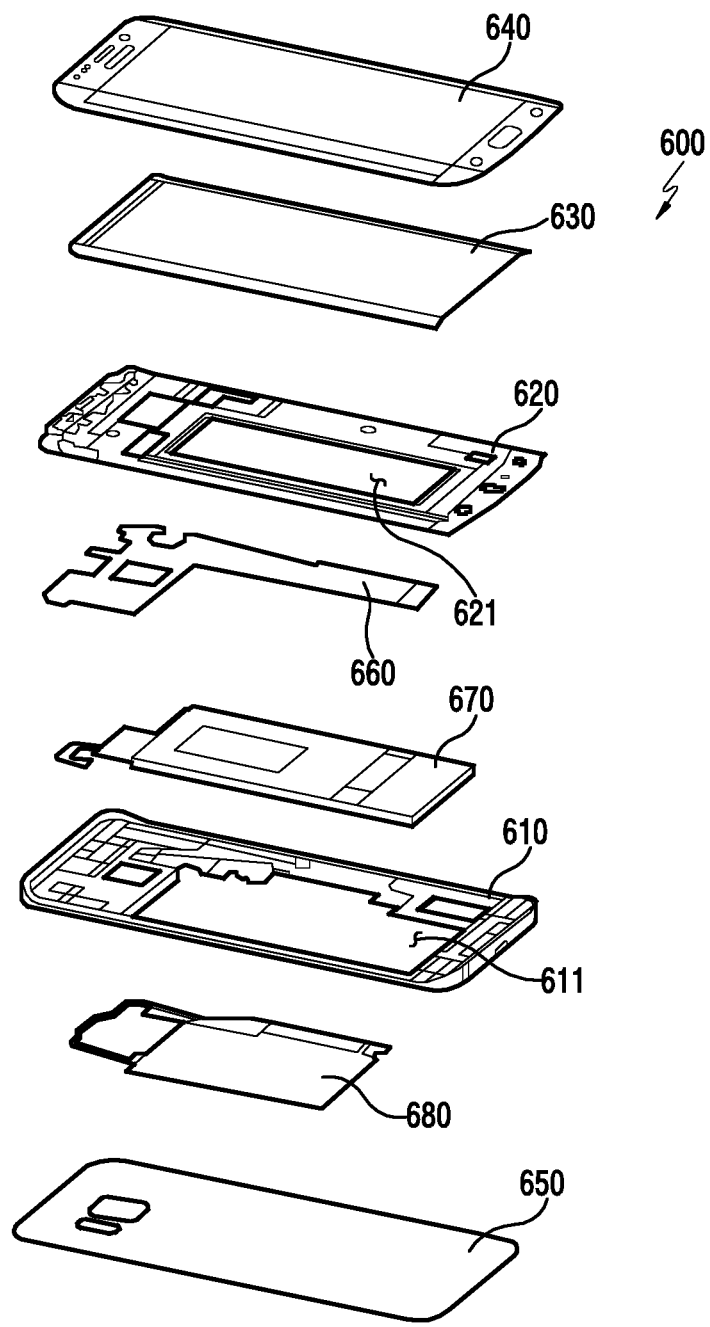
FIG. 6 is an exploded perspective view illustrating an example electronic device according to various example embodiments of the present disclosure.

FIG. 6 is an exploded perspective view illustrating an example electronic device according to various example embodiments of the present disclosure. The electronic device according to various example embodiments may include all or some parts of the electronic device 101 of FIG. 1.

An electronic device 600 of FIG. 6 may be similar to the electronic devices 400 and 500 of FIG. 4 and FIG. 5, or may be for another example embodiment of the electronic device.

Referring to FIG. 6 according to various example embodiments, the electronic device 600 may have a Printed Circuit Board (PCB) 660, a bracket 620, a display module 630, and a front window 640 which are disposed to an upper side with respect to a housing 610. Herein, the PCB 660 may use, for example, a Flexible Printed Circuit Board (FPCB) as an electronic component created by forming a conductive circuit (e.g., copper) having good electric conductivity on an insulator.

According to various example embodiments, a wireless power transmission/reception member 680 and a rear window 650 may be disposed to a lower side with respect to the housing 610. According to various example embodiments, a battery pack 670 may be contained in a space 611 for containing a battery packet formed on the housing 610, and may be disposed to avoid the PCB 660.

According to various example embodiments, the battery pack 670 and the PCB 660 may be disposed in parallel without overlapping with each other. According to various example embodiments, the display module 630 may be fixed to the bracket 620, and the front window 640 may be attached to the bracket 620 by means of an adhesive member. According to various example embodiments, the rear window 650 may also be attached to the housing 610 by means of the adhesive member.

According to various example embodiments, one part of the bracket 620 may further include a counter-boring and hole area 621 for ensuring a space for mounting a component or a margin space considering a change of a component in use such as swelling of a battery pack.

According to various example embodiments, if the electronic device 600 operates as a smart key for a vehicle control, the electronic device 600 may include an antenna for transmitting/receiving a signal with respect to a smart key module of the vehicle (e.g., a Low Frequency (LF) antenna for receiving a signal of the smart key module of the vehicle, at least one Ultra High Frequency (UHF) antenna for transmitting a signal to the smart key module of the vehicle, etc.).

According to various example embodiments, the antenna may be disposed to the battery packet 670 including a relatively wide area. However, the present disclosure is not limited thereto, and thus the antenna may also be disposed to the display module (e.g., a rear portion of the display module) 630, the bracket 620, or the housing 610.

According to various example embodiments, the electronic device 600 may use at least one antenna disposed as described above to perform communication with the vehicle. For example, the electronic device 600 may use at least one antenna disposed as described above to receive information related to the vehicle from the vehicle, and may transmit another information generated on that basis of at least one part of the received information to the vehicle. For another example, the electronic device 600 may use at least one antenna disposed as described above to perform a vehicle control operation in a remote manner by performing wireless communication with the smart key module equipped in the vehicle.

Figure 7A:
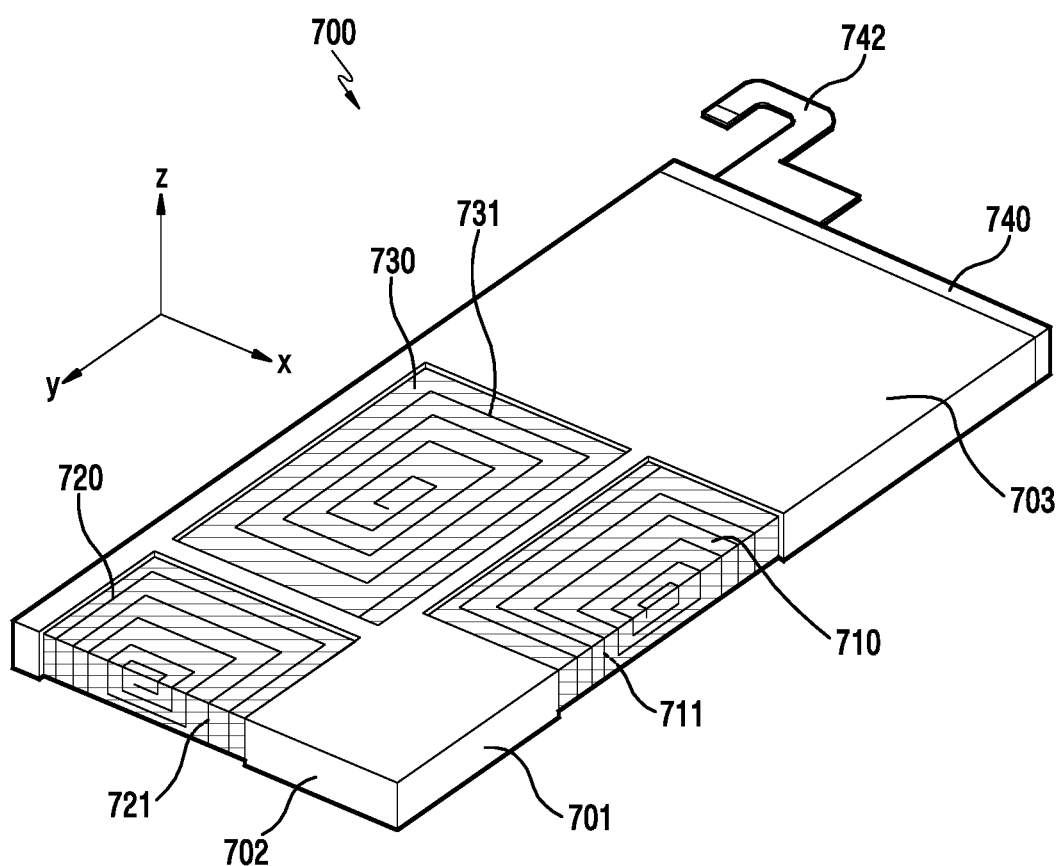
FIG. 7A is a diagram illustrating an example structure of an antenna disposed to a battery pack according to various example embodiments of the present disclosure.

FIG. 7A is a diagram illustrating an example structure of an antenna disposed to a battery pack according to various example embodiments of the present disclosure. A battery pack 700 of FIG. 7A may be similar to the battery pack 670 of FIG. 6 or may be for another example embodiment.

Referring to FIG. 7A according to various example embodiments, the battery pack 700 may include a first side 701 facing a first direction (e.g., an x-axis direction), a second side 702 neighboring to the first side 701 and facing a second direction (e.g., an y-axis direction), a third side 703 neighboring to the first side 701 and the second side 702 and facing a third direction (e.g., a z-axis direction), and a fourth side (not shown) formed in an opposite direction (i.e., the z-axis direction) of the third side 703.

According to various example embodiments, if the electronic device performs an operation of a smart key of a vehicle, the battery packet 700 may include an antenna for transmitting/receiving a signal with respect to a smart key module of the vehicle (e.g., a Low Frequency (LF) antenna for receiving a signal of the smart key module of the vehicle, at least one Ultra High Frequency (UHF) antenna for transmitting a signal to the smart key module of the vehicle, etc.).

According to various example embodiments, the antenna may include at least three antenna members 710, 720, and 730 radiated in a 3-axis direction. According to various example embodiments, the antenna may include the first antenna member 710 radiated in the first direction, the second antenna member 720 radiated in the second direction, and the third antenna member 730 radiated in the third direction and/or the fourth direction.

According to various example embodiments, the respective antenna members 710, 720, and 730 may include a flexible printed circuit including coil-type patterns 711, 721, and 731, a metal plate including a specific pattern, or the like. According to various example embodiments, the antenna members 710, 720, and 730 may be disposed to be attached to the first, second, third, and fourth sides of the battery pack 700.

According to various example embodiments, the first, second, and third antenna members 710, 720, and 730 may include at least one LF antenna for receiving a signal transmitted from the smart key module of the vehicle. According to various example embodiments, at least one part of the signal received through the LF antenna may be delivered to a processor or the like which is present inside the electronic device, through a terminal portion 742 and a Power Control Module (PCM) portion of a mold member 740 for firmly supporting the battery pack 700.

According to various example embodiments, the first antenna member 710 may be attached in a manner of being extended to the first side 701 from the third side 703 and/or fourth side of the battery pack 700. According to various example embodiments, the second antenna member 720 may be attached in a manner of being extended to the second side 702 from the third side 703 and/or fourth side of the second antenna member 720. According to various example embodiments, the third antenna member 730 can be attached to at least one area of the third side 703 and/or fourth side of the battery pack 700, and thus can be manufactured with a much simpler and more effective structure.

Figure 7B:
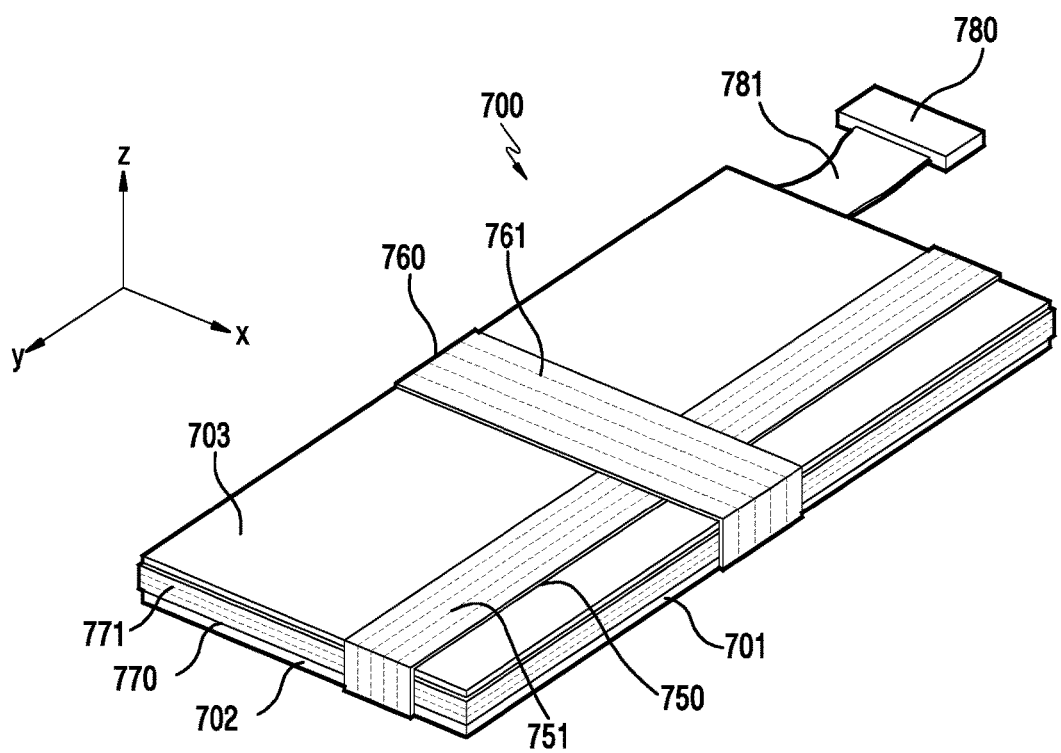
FIG. 7B is a diagram illustrating an example structure of an antenna disposed to a battery pack according to various example embodiments of the present disclosure.

FIG. 7B is a diagram illustrating an example structure of an antenna disposed to a battery pack according to various example embodiments of the present disclosure. The battery pack 700 of FIG. 7B may be similar to the battery pack 670 of FIG. 6 or may be for another example embodiment.

Referring to FIG. 7B according to various example embodiments, the battery pack 700 may include the first side 701 facing the first direction (e.g., the x-axis direction), the second side 702 neighboring to the first side 701 and facing the second direction (e.g., the y-axis direction), the third side 703 neighboring to the first side 701 and the second side 702 and facing the third direction (e.g., the z-axis direction).

According to various example embodiments, if the electronic device performs an operation of a smart key of a vehicle, the battery packet 700 may include an antenna for transmitting/receiving a signal with respect to the smart key module of the vehicle. For example, the antenna may include a Low Frequency (LF) antenna for receiving a signal of the smart key module of the vehicle, at least one Ultra High Frequency (UHF) antenna for transmitting a signal to the smart key module of the vehicle, or the like.

According to various example embodiments, the LF antenna may include at least three antenna members 750, 760, and 770 radiated in a 3-axes direction. For example, the LF antenna may include the first antenna member 750 radiated in the first direction, the second antenna member 760 radiated in the second direction, and a third antenna member 730 radiated in the third direction, and coil-type patterns 751, 761, and 771 may be formed respectively in the three antenna members 750, 760, and 770.

According to various example embodiments, the respective antenna members 750, 760, and 770 may be disposed to surround the battery pack 70 in the x, y, and z axes. According to various example embodiments, the respective antenna members 750, 760, and 770 may be disposed to wind a coil several times directly to the battery pack 700. According to various example embodiments, the respective antenna members 750, 760, and 770 may be disposed such that an FPCB including a plurality of coil-type patterns surrounds the battery pack 770.

According to various example embodiments, the antenna may include at least one LF antenna for receiving a signal transmitted from the smart key module of the vehicle. According to various example embodiments, a signal received from the antenna may be delivered to a processor or the like which is present inside the electronic device through an ID pin 780 connected to a cable 781 extracted from the battery pack 700.

FIGS. 8A, 8B, 8C and 8D are diagrams illustrating an example of vehicle control functions provided in an electronic device according to various example embodiments of the present disclosure. The electronic device according to various example embodiments may include all or some parts of the electronic device 101 of FIG. 1.

Figure 8A:
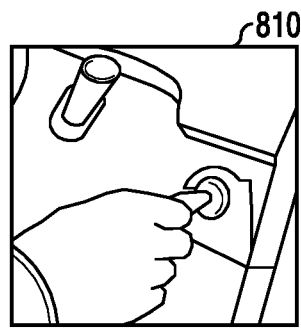
FIGS. 8A, 8B, 8C and 8D are diagrams illustrating an example of vehicle control functions provided in an electronic device according to various example embodiments of the present disclosure.

Referring to FIG. 8A according to various example embodiments, an electronic device 800 may perform a function (e.g., immobilization) 810 capable of avoiding a theft through user authentication. For example, a unique password is assigned to a door handle of a vehicle. The electronic device 800 performs user authentication through wireless communication with a smart key equipped in the vehicle, and if the user authentication is complete, may open a door or turn engine ignition on.

Figure 8B:
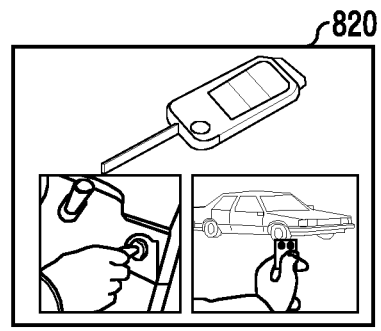

Referring to FIG. 8B according to various example embodiments, the electronic device 800 may perform a function (e.g., a Remote Keyless Entry (RKE)) 820 capable of opening/closing a door or a trunk, flickering warning light, and controlling engine ignition on/off, or the like.

Figure 8C:
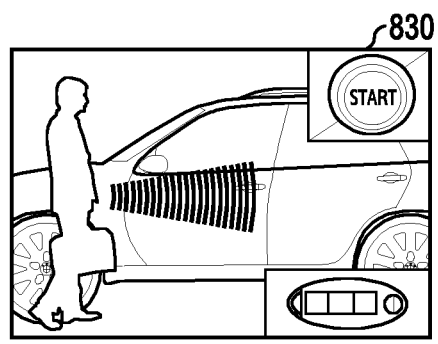

Referring to FIG. 8C according to various example embodiments, the electronic device 800 may provide a function (e.g., a Passive Keyless Entry/Go (PKG)) 830 capable of opening a door automatically by determining a location of a key of the electronic device 800 by the use of a smart key module equipped in a vehicle, or capable of turning engine ignition on by pressing a button without having to insert a key by the user.

Figure 8D:
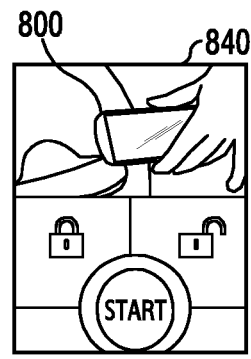

Referring to FIG. 8D according to various example embodiments, the electronic device 800 may provide a function (e.g., smart access) 840 capable of automatically opening/closing a door and turning engine ignition on/off by using proximity communication. At least one or more of the vehicle control functions may be functions which are the same as or similar to functions provided in a vehicle control system using a typical smart key.

Figure 9:
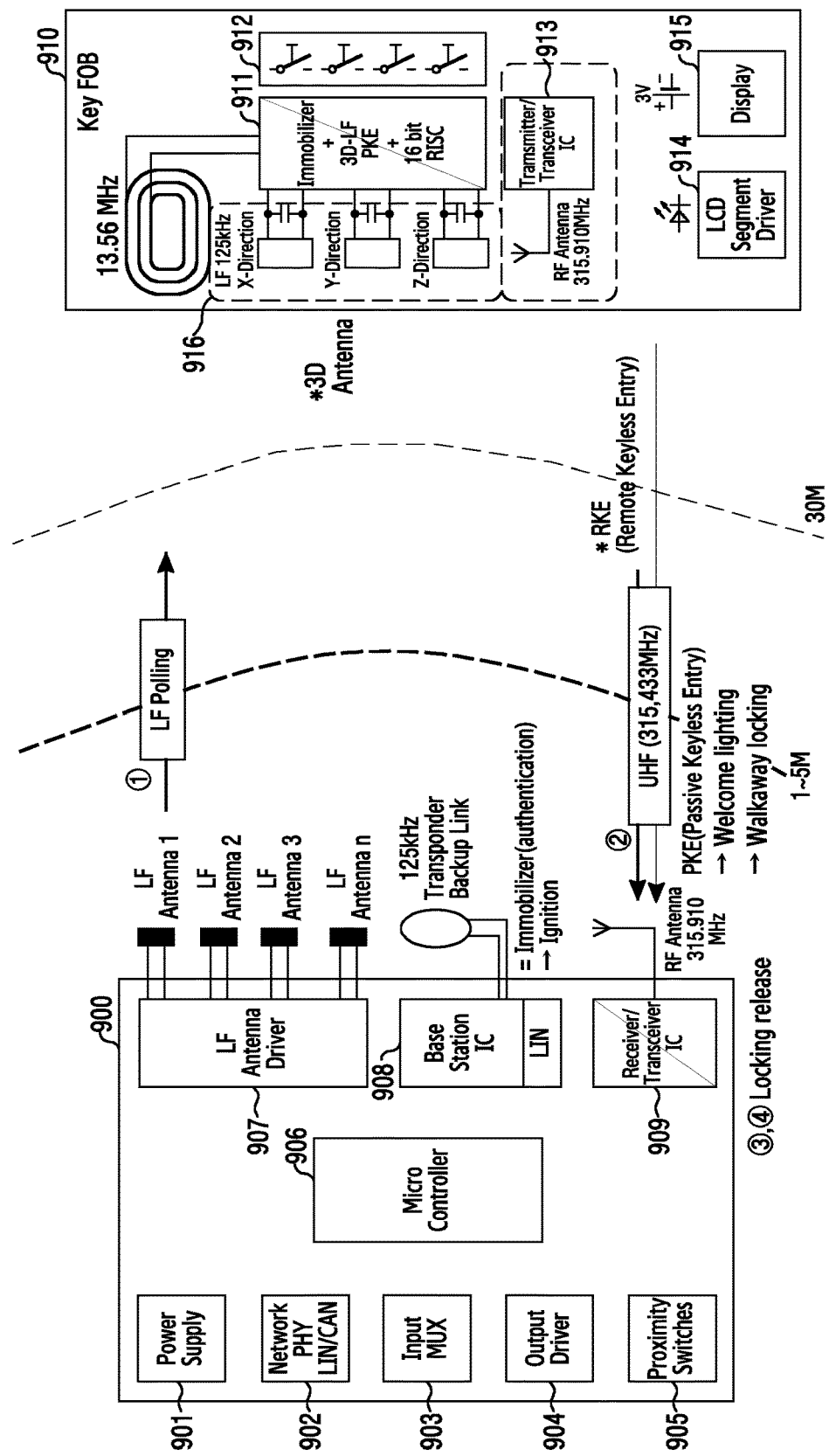
FIG. 9 is a diagram illustrating an example of an electronic device and a smart key module according to various example embodiments of the present disclosure.

FIG. 9 is a diagram illustrating an example of an electronic device and a smart key module according to various example embodiments of the present disclosure. The electronic device according to various example embodiments may include all or some parts of the electronic device 101 of FIG. 1.

Referring to FIG. 9 according to various example embodiments, a smart key module 900 equipped in a vehicle may include a power supply unit 901, a network access unit 902, an input unit 903, an output driving unit 904, a proximity switch unit 905, a control unit 906, an antenna unit 907, a base station Integrated Circuit (IC) 908, a transceiver 909, or the like.

Herein, at least any one of the respective elements 901 to 909 may be configured separately from the smart key module 900. For example, the power supply unit 901 may be included in the smart key module 900 as an element for supplying power required for the smart key module 900, or may be configured as an external element electrically connected to the smart key module 900.

The network access unit 902 according to various example embodiments may be, for example, a Local Interconnect Network (LIN)/Controller Area Network (CAN) as a network Physical (PHY) widely used as a vehicle network. The LIN is widely used in the vehicle as a cheap embedded networking standard for connecting an intelligence device, and the CAN is widely used to transmit data in an electronic control unit of the vehicle.

The input unit 903 according to various example embodiments may be an input MUX for multiplexing several signals which are input to the smart key module 900. The output driving unit 904 according to various example embodiments may be an output driver for adjusting strength or level or the like of a signal which is output from the smart key module 900. The proximity switch unit 905 according to various example embodiments may be a proximity switch which operates by electric field disturbance.

The control unit 906 according to various example embodiments may be a micro controller for interworking with the aforementioned respective components. The antenna unit 907 according to various example embodiments may be an LF antenna driver to which a plurality of LF antennas are connected. The base station IC 908 according to various example embodiments may perform network communication inside the vehicle through the LIN, and a 125 kHz transponder backup link may be connected. The transceiver 909 according to various example embodiments may be a receiver/transceiver IC for transmitting/receiving a signal with respect to the electronic device 910 through an RF antenna.

According to various example embodiments, the electronic device 910 may include a control unit 911, a switch unit 912, a transceiver unit 913, a Liquid Crystal Display (LCD) segment driving unit 914, a display 915, or the like. For example, the control unit 911 may include a micro controller for interworking with respective elements to control an overall operation of the electronic device 910. For example, the switch unit 912 may be constructed of at least one switch, and may connect the transceiver unit 913 and the control unit 911 by being selectively turned on/off under the control of the control unit 911. For example, the transceiver unit 913 may include a receiver/transceiver IC for transmitting/receiving a signal with respect to the smart key module 900 through an RF antenna. For example, the LCD segment driving unit 914 may include an LCD driver for driving the display 915. For example, the display 915 may include a touch screen for displaying an operational state of the electronic device 910 and various user interface screens.

The control unit 911 according to various example embodiments may include an immobilizer in which a security code of a smart key is embedded. The LCD segment driving unit 914 according to various example embodiments may include an LCD segment driver for emitting or flickering light to indicate the operational state of the electronic device 910.

According to various example embodiments, the control unit 906 of the smart key module 900 may control the antenna unit 907 to perform an operation (e.g., LF polling) of transmitting an RF signal, and the control unit 911 of the electronic device 910 may control the transceiver unit 913 to perform an operation (e.g., UHF (315,433 MHz)) for transmitting the RF signal.

According to various example embodiments, for example, the RF signal transmitted in the electronic device 910 may be a control signal for performing a vehicle control operation such as remote keyless entry, passive keyless entry (e.g., welcome lighting, walk-away locking), or the like. A specific operation based on the control signal will be described in detail hereinafter with reference to the accompanying drawings.

According to various example embodiments, the control unit 906 of the smart key module 900 may perform a corresponding operation (e.g., releasing locking) on the basis of an RF signal of the electronic device 910. Herein, the smart key module 900 may perform various functions such as user authentication, and as illustrated in FIG. 9, a 3D antenna 916 of X/Y/Z axes may be installed in the electronic device 910.

According to various example embodiments, the control unit 911 of the electronic device 910 may be called a processor, and the processor may detect signal strength (e.g., RSSI value) of an RF signal received from the smart key module 900. For example, the signal strength (e.g., RSSI value) may be detected as a relatively great value if a distance between the smart key module 900 and the electronic device 910 is close (e.g., 1~5 m), and may be detected as a relatively small value if the distance between the smart key module 900 and the electronic device 910 is far (e.g., 30 m).

Figure 10:
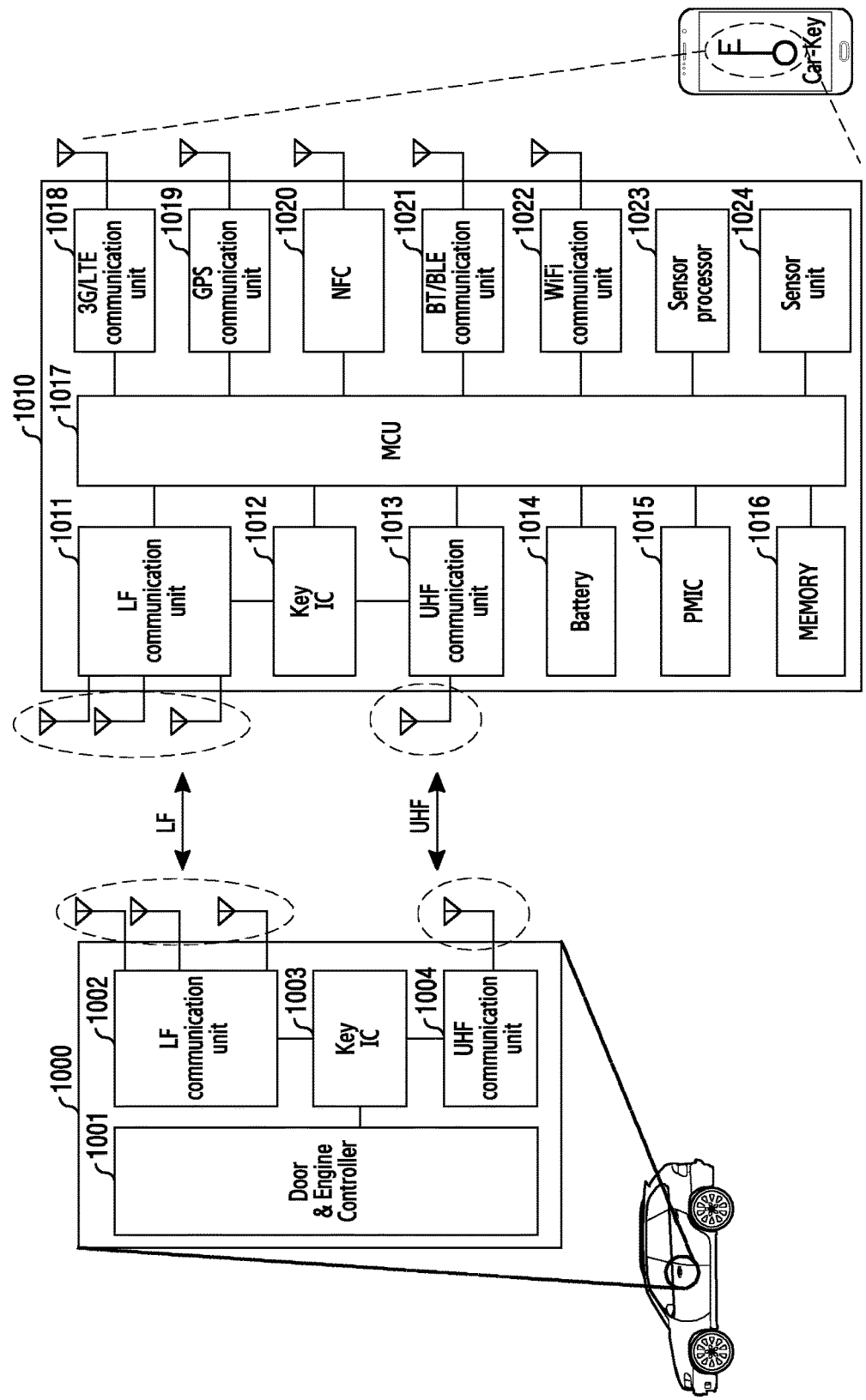
FIG. 10 is a block diagram illustrating an example electronic device and a smart key module according to various example embodiments of the present disclosure.

FIG. 10 is a block diagram illustrating an example electronic device and a smart key module according to various example embodiments of the present disclosure. The electronic device according to various example embodiments may include all or some parts of the electronic device 101 of FIG. 1. Referring to FIG. 10 according to various example embodiments, a smart key module 1000 equipped in a vehicle may include a door and/or engine controller 1001, an LF communication unit 1002, a key IC 1003, a UHF communication unit 1004, or the like. At least one LF antenna may be connected to the LF communication unit 1002 according to various example embodiments. At least one UHF antenna may be connected to the UHF communication unit 1004 according to various example embodiments.

An electronic device 1010 according to various example embodiments may include an LF communication unit 1011, a key IC 1012, a UHF communication unit 1013, a battery 1014, a power management IC 1015, a memory 1016, a control unit 1017, a 3G/LTE communication unit 1018, a GPS communication unit 1019, an NFC communication unit 1020, a BT/BLE communication unit 1021, a WiFi communication unit 1022, a sensor processor 1023, a sensor unit 1024, or the like.

The sensor unit 1024 according to various example embodiments may include a 6-axis sensor, a geomagnetic sensor, an acceleration sensor, a posture sensor, or the like. Herein, the posture sensor may be one independent sensor, or may be a virtual combination sensor for detecting a posture of the electronic device by combining detection signals of the acceleration sensor and the geomagnetic sensor or the like.

For example, the electronic device 1010 may determine a movement, tilt, or the like of the electronic device 1010 on the basis of at least one part of information acquired from at least one sensor included in the sensor unit 1024, and may determine a signal cycle and signal strength on the basis of a result of the determination.

According to various example embodiments, if it is determined that the electronic device 1010 is in a horizontal state while facing a direction of a vehicle, the electronic device 1010 may decrease a signal cycle and/or decrease signal strength to reduce power usage on the basis of information detected from at least any one of the 6-axis sensor, the geomagnetic sensor, the acceleration sensor, and the posture sensor.

For another example, if it is determined that the electronic device 1010 faces an opposite direction of the vehicle and/or is in any state (e.g., a vertical state) other than the horizontal state, the electronic device 1010 may increase the signal cycle and/or increase the signal strength to prevent a vehicle control from having an error even if the power usage is increased.

For another example, the electronic device 1010 may determine whether the electronic device 1010 is in contact with the vehicle and/or approaches thereto on the basis of information detected from the at least any one of sensors, and may perform various regulation operations such as increasing or decreasing or the like of the signal cycle and the signal strength on the basis of a result of the determination.

The electronic device 1010 according to various example embodiments may include a display such as a touch screen. The display according to various example embodiments may display, for example, at least one app image indicating a shape of a smart key. Accordingly, a user can simply execute the smart function by intuitively touching the image of the smart key by watching the image of the shape of the smart key displayed on the display.

An application program for executing the smart key function according to various example embodiments may be downloaded from a server (e.g., an app providing server) connected through a communication circuit (e.g., the 3G/LTE communication unit 1018) supporting a cellular communication protocol, and may be stored in the memory 1016. Herein, the downloaded application may be various types of applications in which, for example, an app image indicating the shape of the smart key is displayed on the display of the electronic device, and if the user touches the image of the smart key, the smart key function is executed.

Wireless communication with the smart key module 1000 according to various example embodiments may be performed through a communication circuit (e.g., the LF communication unit 1011 and the UHF communication unit 1013) supporting a short-distance communication protocol. For example, the electronic device 1010 may receive an RF signal of the smart key module 1000 via the LF communication unit 1011, and may transmit the RF signal to the smart key module 1000 via the UHF communication unit 1013. A plurality of LF antennas may be connected to the LF communication unit 1011 according to various example embodiments. An input gain of an RF signal of the LF communication unit 1011 may be adjusted by the control unit 1017. At least one UHF antenna may be connected to the UHF communication unit 1013 according to various example embodiments.

The electronic device according to various example embodiments may include a display, a first communication circuit, a second communication circuit, one or more sensors, a memory, and a processor, and the processor may be electrically coupled to each of these elements. In addition, the memory may store at least one instruction, when executed, for allowing the processor to detect a Received Signal Strength Indicator (RSSI) value of a Radio Frequency (RF) signal received from a vehicle through the first communication circuit, convert the detected RSSI value on the basis of deviation information stored in the memory, and transmit the RF signal indicating the converted RSSI value to the vehicle through the first communication circuit.

According to various example embodiments of the present disclosure, an electronic device may include a display, a first communication circuit, a second communication circuit, one or more sensors, a memory, and a processor electrically coupled to the display, the first communication circuit, the second communication circuit, the memory, and the one or more sensors. The memory may store at least one instruction, when executed by the processor causes the electronic device to detect an RSSI value of an RF signal received from a vehicle through the first communication circuit, convert the detected RSSI value on the basis of deviation information stored in the memory, and transmit the RF signal indicating the converted RSSI value to the vehicle through the first communication circuit.

According to various example embodiments, the deviation information may include an RF characteristic data table for correcting an RF reception signal sensitivity difference between a smart key corresponding to a smart key module equipped in the vehicle and the first communication circuit.

According to various example embodiments, the first communication circuit may support a short-distance communication protocol. The processor may adjust an input gain of the RF signal of the first communication circuit to correct the RF reception signal sensitivity difference between the smart key corresponding to the smart key module equipped in the vehicle and the first communication circuit.

According to various example embodiments, the processor may download the deviation information by performing an interface with respect to a server for providing the deviation information, and may store the deviation information in the memory.

According to various example embodiments, the processor may download information related to the smart key by performing an interface with respect to a server for providing the information related to the smart key corresponding to the smart key module equipped in the vehicle, and may generate the deviation information on the basis of at least one part of the information related to the smart key and thereafter stores the deviation information in the memory.

According to various example embodiments, the display may be a touch screen, and an image indicating a shape of the smart key and an icon for selecting at least one of smart key registering, discarding, reissuing, right controlling, and temporary key issuing may be displayed on the display.

According to various example embodiments, the processor may perform at least one operation among smart key registering, discarding, reissuing, right controlling, and temporary key issuing to control the vehicle through the smart key module.

According to various example embodiments, the apparatus may further include an antenna for transmitting/receiving the RF signal. The antenna may include at least one of a Low Frequency (LF) antenna and an Ultra High Frequency (UHF) antenna.

According to various example embodiments, the antenna may be disposed to a battery pack of the electronic device.

According to various example embodiments, the antenna may include a plurality of antenna members disposed to different sides of the battery pack so as to be radiated respectively in directions of x, y, and z axes of the battery packet.

According to various example embodiments of the present disclosure, a method may include receiving first information related to a selected vehicle by an electronic device including a display, a first communication circuit supporting a cellular communication protocol, a second communication circuit supporting a short-distance communication protocol, at least one sensor, a processor, and a storage unit through the first communication circuit or the second communication circuit, storing the received first information and/or second information generated or provided on the basis of at least one part of the first information in the storage unit, receiving a first signal from the selected vehicle using the second communication circuit and/or the sensor, determining strength of the first signal, and changing the determined strength using the second information, and transmitting information regarding the changed strength to the outside either with a selected cycle or during a selected time by using the second communication circuit.

According to various example embodiments, the first information may include at least any one of an ID number of the vehicle, key box information related to the ID number, a password, and biometric information.

According to various example embodiments, the second information may include information regarding a magnitude of an output signal based on a relative location of the electronic device on the basis of the selected vehicle.

According to various example embodiments, the relative location of the electronic device may include an interior of the vehicle and an exterior of the vehicle on the basis of the selected vehicle.

According to various example embodiments, the relative location of the electronic device may include a location less than a first distance from an external housing of the vehicle or greater than or equal to the first distance and less than a second distance from the external housing on the basis of the selected vehicle.

According to various example embodiments, the second communication circuit may include at least one of Wireless Fidelity (WiFi), Bluetooth, Near Field Communication (NFC), and Global Navigation Satellite System (GNSS).

According to various example embodiments of the present disclosure, an electronic device may include a display, a first communication circuit configured to support a cellular communication protocol, a second communication circuit configured to adjust a magnitude of an output signal and supporting a short-distance communication protocol, at least one sensor, a processor electrically connected to the display, the first communication circuit, the second communication circuit, and the sensor, and a storage unit electrically connected to the processor. The electronic device may store at least one instruction, when executed by the processor causes the electronic device to acquire first information related to a selected vehicle and second information related to the electronic device and/or a user of the electronic device through the first communication circuit or the second communication circuit, transmit to a server the acquired first information and/or at least one part of the first information and the second information and/or at least one part of the second information to request for issuing of a smart key on the vehicle, download the smart key issued from the server to store the smart key in the electronic device.

According to various example embodiments, since the instruction stored in the electronic device is executed, the processor may further perform at least operation among smart key registering, discarding, reissuing, right controlling, and temporary key issuing by performing an interface with the server.

Figure 11:
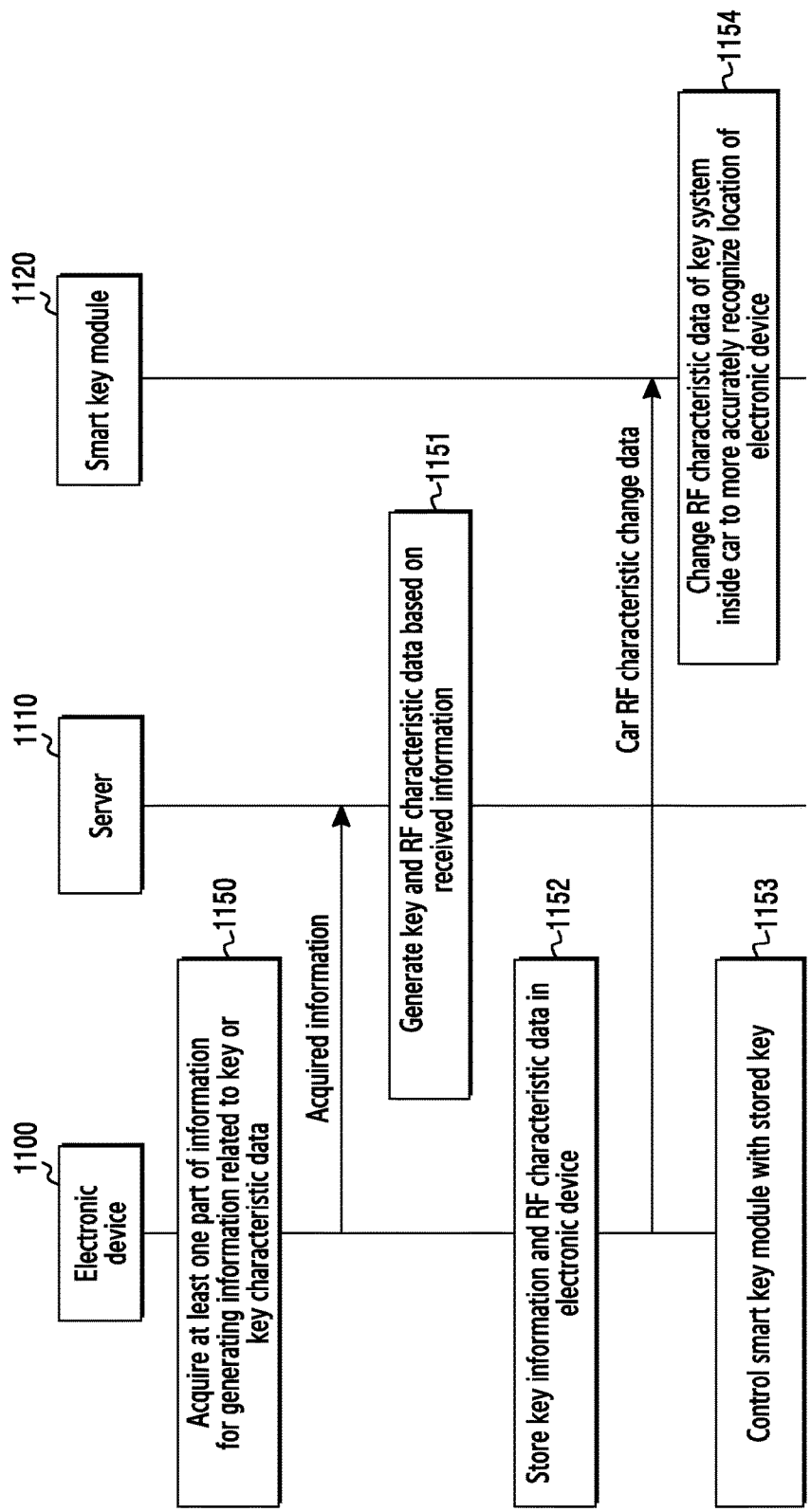
FIG. 11 is a flowchart illustrating an example method for controlling a vehicle according to various example embodiments of the present disclosure.

FIG. 11 is a flowchart illustrating an example vehicle control method according to various example embodiments of the present disclosure. For example, an electronic device 1100 carried by a user may wirelessly communicate with a server 1110 and a smart key module 1120 of a vehicle, and thus may perform a vehicle control operation and change RF characteristic data of a key system inside the vehicle.

Referring to FIG. 11 according to various example embodiments, through a first communication circuit (e.g., an LF communication unit, a UHF communication unit) supporting a short-distance communication protocol, the electronic device 1100 may wirelessly communicate with the smart key module 1120 equipped in the vehicle, and may communicate with the server 1110 through a second communication circuit (e.g., a 3G/LTE communication unit) supporting a cellular communication protocol.

In operation 1150 according to various example embodiments, the electronic device 1100 may perform an operation of acquiring at least one part of information for generating information related to a key or key characteristic data.

For example, the electronic device 1100 may acquire information related to a vehicle control on the basis of a user's input. According to various example embodiments, the electronic device 1100 may acquire information through an application for the vehicle control.

According to various example embodiments, the electronic device 1100 may acquire the information related to the vehicle control through an external electronic device or server operatively coupled to the electronic device 1100. The vehicle-related information acquired according to various example embodiments may include at least one part of a vehicle identification number or a vehicle ID (or a Vehicle Production Number (VPN)), key box information, a password for security, and biometric information.

According to various example embodiments, a user of the electronic device 1100 may input information regarding the vehicle and information regarding the electronic device 1100 through a key application program, and may configure a password, biometric information, or the like for security. Herein, information regarding the vehicle may be the vehicle identification number, the key box information, or the like, and information regarding the electronic device 1100 may be IMEI, a serial number, subscriber information, or the like. The electronic device 1100 may transmit to the server 1110 at least one part of a variety of information regarding the user, the electronic device 1100, and the vehicle.

In operation 1151 according to various example embodiments, the server 1110 may perform an operation of generating the key and RF characteristic data corresponding to the electronic device 1100 on the basis of information received from the electronic device 1100. For example, the server 1110 may perform user authentication and generate RF characteristic data of a new key on the basis of the variety of information received from the electronic device 1100. For example, the RF characteristic data of the new key may be generated for changing RF power, gain, axis, or the like of the electronic device 1100, so that RF characteristic data of a reference key corresponding to the typical smart key is matched to RF characteristic data of a key included in the electronic device 1100. The server 1110 may transmit the RF characteristic data of the generated key and the new key to the electronic device 1100.

In operation 1152 according to various example embodiments, the electronic device 1100 may perform an operation of storing RF characteristic data and key information received from the server 1110. For example, the RF characteristic data may be an antenna gain/axis, an antenna ID, an RSSI-location matching table, or the like. Herein, the RSSI-location table may be a table (e.g., a look-up table) indicating a distance between the electronic device 1100 and the smart key module 1120 on the basis of an RSSI value, and the electronic device 1100 may transmit the information to the smart key module 1120 as vehicle RF characteristic change data.

In operation 1153 according to various example embodiments, the electronic device 1100 may perform an operation of controlling the smart key module 1120 equipped in the vehicle as a key stored through the aforementioned operation. For example, RF performance of the electronic device, which is modified by the RF characteristic data, is at least partially identical to a reference key of the typical smart key. Therefore, various remote control functions provided in the conventional vehicle control system can be accurately performed in a normal manner.

According to various example embodiments, the remote control functions may include at least one of the function 810 for preventing the theft as illustrated in FIG. 8, the function 820 for controlling the opening/closing of the door or the trunk, flickering of the warning light, and turning on/off of the ignition or the like in a remote manner as illustrated in FIG. 8B, the function 830 by which the vehicle determines the location of the key and automatically opens the door and the user can turn the engine ignition on by pressing the button without having to insert the key as illustrated in FIG. 8C, and the function 840 by which opening/closing of the door and turning on/off of the engine ignition can be automatically performed by using proximity communication as illustrated in FIG. 8D.

In operation 1154 according to various example embodiments, the smart key module 1120 may perform an operation of changing RF characteristic data of a key system inside the vehicle so that the location of the electronic device 1100 can be more accurately recognized. For example, if the RF performance of the electronic device 1100, which is modified on the basis of the RF characteristic data, does not satisfy RF characteristic data newly generated by the server 1110, the smart key module 1120 may perform an operation of changing the RF characteristic data of the key system inside the vehicle. For example, the RF characteristic data of the key system inside the vehicle may include at least one of transmit power for communication with the electronic device 1100 and a location recognition coordinate regarding the electronic device 1100.

Figure 12:
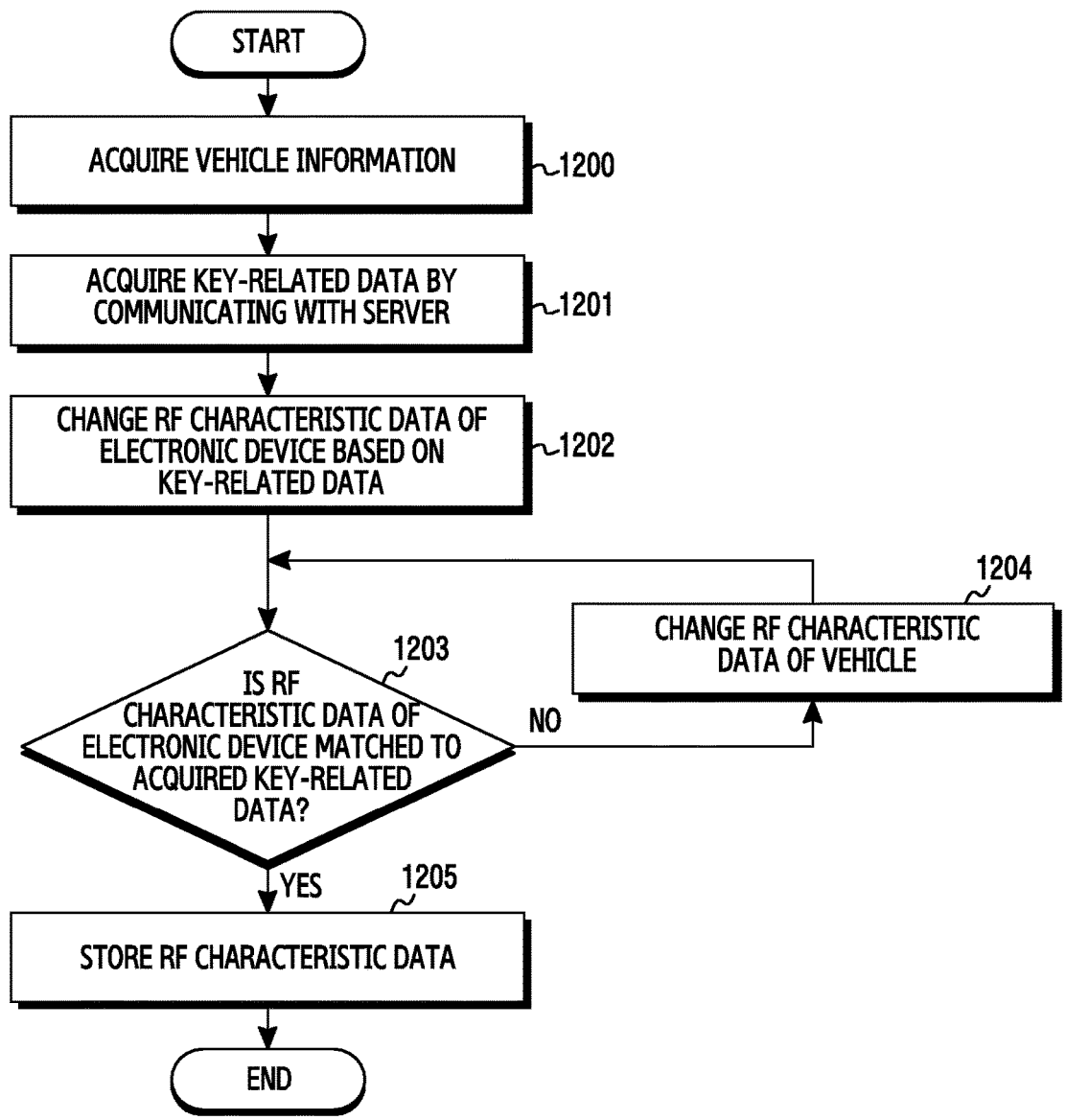
FIG. 12 is a flowchart illustrating an example method of changing a key Radio Frequency (RF) characteristic according to various example embodiments of the present disclosure.

FIG. 12 is a flowchart illustrating an example method of changing a key RF characteristic according to various example embodiments of the present disclosure. For example, an electronic device carried by a user may wirelessly communicate with a server and a smart key module to change the key RF characteristic of a vehicle. The electronic device according to various example embodiments may include all or some parts of the electronic device 101 of FIG. 1.

Referring to FIG. 12 according to various example embodiments, in operation 1200, the electronic device may acquire vehicle information. For example, the electronic device may execute an application, and may communicate with the vehicle by executing the application to acquire information related to the vehicle. For another example, the electronic device may receive the information related to the vehicle from an input of the user or the like by executing the application. For another example, the electronic device may acquire the information related to the vehicle from the server or external electronic device operatively coupled to the electronic device.

According to various example embodiments, in operation 1201, the electronic device may communicate with the server to acquire key-related data. For example, if the electronic device acquires the information related to the vehicle in operation 1200, an authentication procedure may be performed on the user by interworking with the server for confirming whether the user of the electronic device has an access right to the key-related data. If the user authentication is successful, the electronic device may acquire at least one part of the key-related data from the server on the basis of at least one part of the information related to the vehicle. For example, the key-related data may include at least one of key RF and antenna performance data (e.g., a reception gain, an antenna gain pattern, etc.) related to a car key (e.g., a smart key) capable of controlling the vehicle, and a reference matching table (e.g., a distance per RSSI) between a key location coordinate and an RF characteristic.

According to various example embodiments, in operation 1202, the electronic device may change the RF characteristic data of the electronic device on the basis of the acquired key-related data. For example, the electronic device may store the key-related data (e.g., the car key) downloaded from the server, and may change key RF characteristic data of the electronic device so as to be matched to a reference matching table included in the key-related data. For example, the electronic device may change a gain of a receiving end (Rx) for receiving an RF signal in the electronic device or an antenna gain pattern or the like so as to be matched to a reference matching table of a smart key matched to the smart key module equipped in the vehicle.

According to various example embodiments, in operation 1203, the electronic device may confirm whether the RF characteristic data of the electronic device is changed so as to be matched to the acquired key-related data. For example, the electronic device may confirm whether the RF characteristic data of the electronic device, which is changed in operation 1202, is matched to RF performance included in the reference matching table of the smart key acquired from the server in operation 1201.

According to various example embodiments, in operation 1204, if a result of the determination in operation 1203 shows that the RF characteristic data of the electronic device is not changed so as to be matched to the key-related data, the electronic device may communicate with the vehicle to change the RF characteristic data (e.g., key RF characteristic) of the vehicle. For example, the electronic device may provide control to change transmit power or location recognition coordinate or the like of the smart key module included in the vehicle.

According to various example embodiments, in operation 1205, if the RF characteristic data of the electronic data is changed so as to be matched to the acquired key-related data, the electronic device may store the changed RF characteristic data (e.g., key RF characteristic) of the electronic device. The electronic device may perform wireless communication with the smart key module included in the vehicle according to the stored key RF characteristic.

Figure 13A:
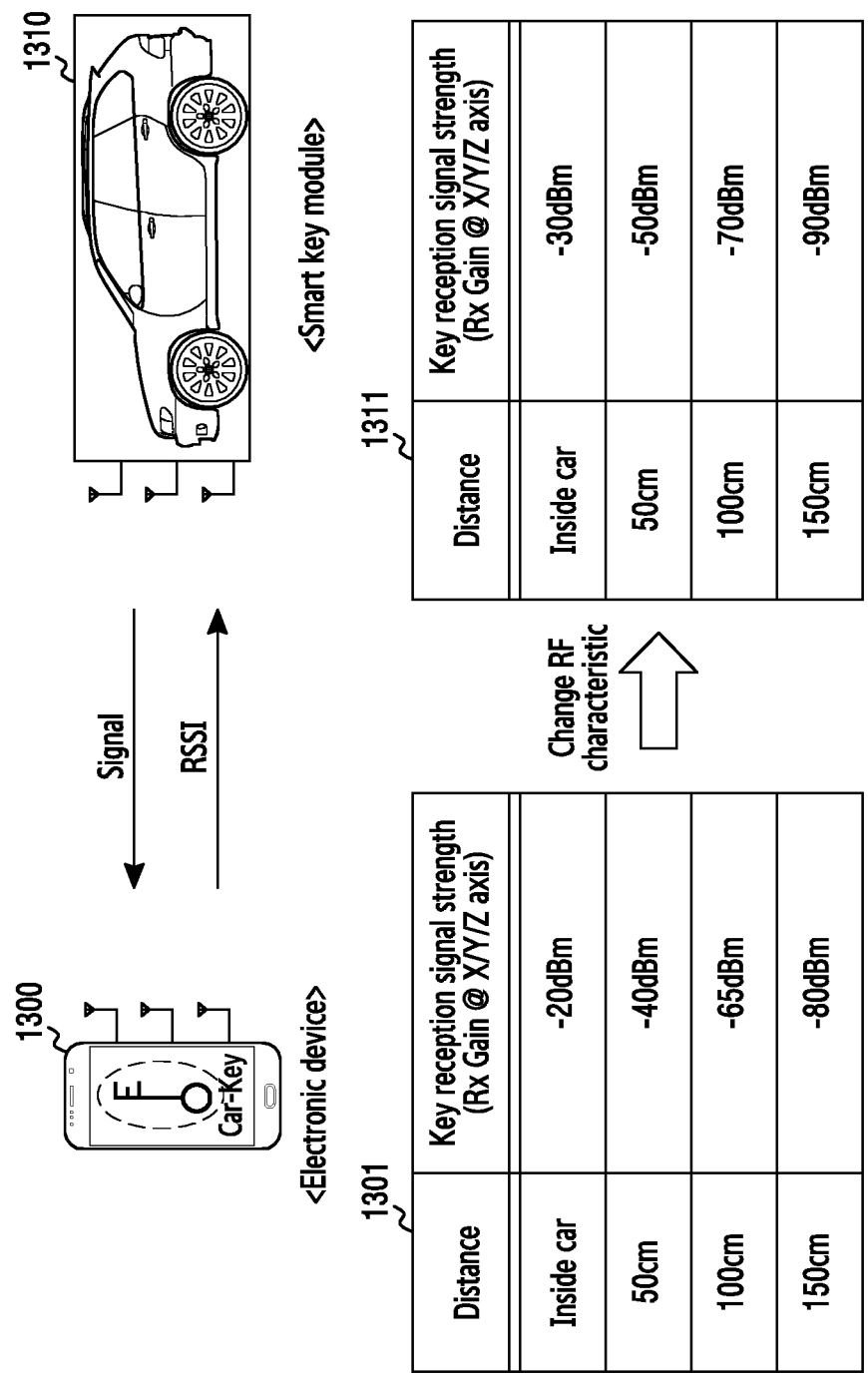
FIG. 13A, 13B and FIG. 13C are diagrams illustrating an example of an RF characteristic data table according to various example embodiments of the present disclosure.
Figure 13B:
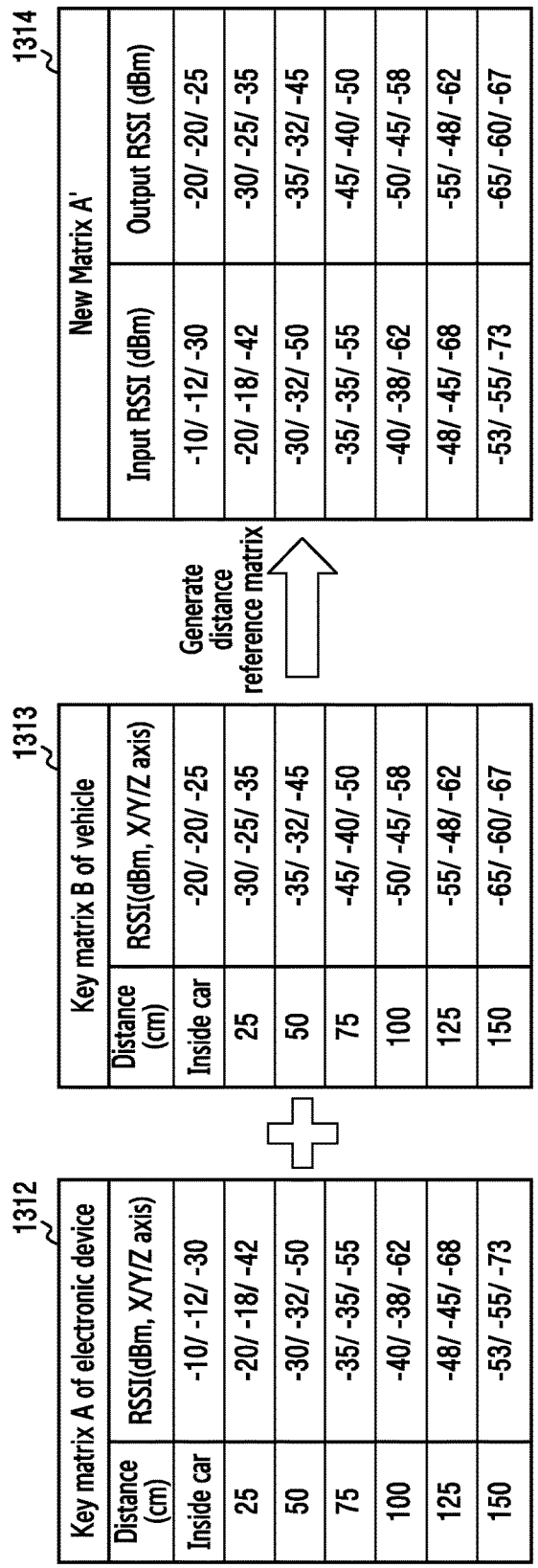
Figure 13C:
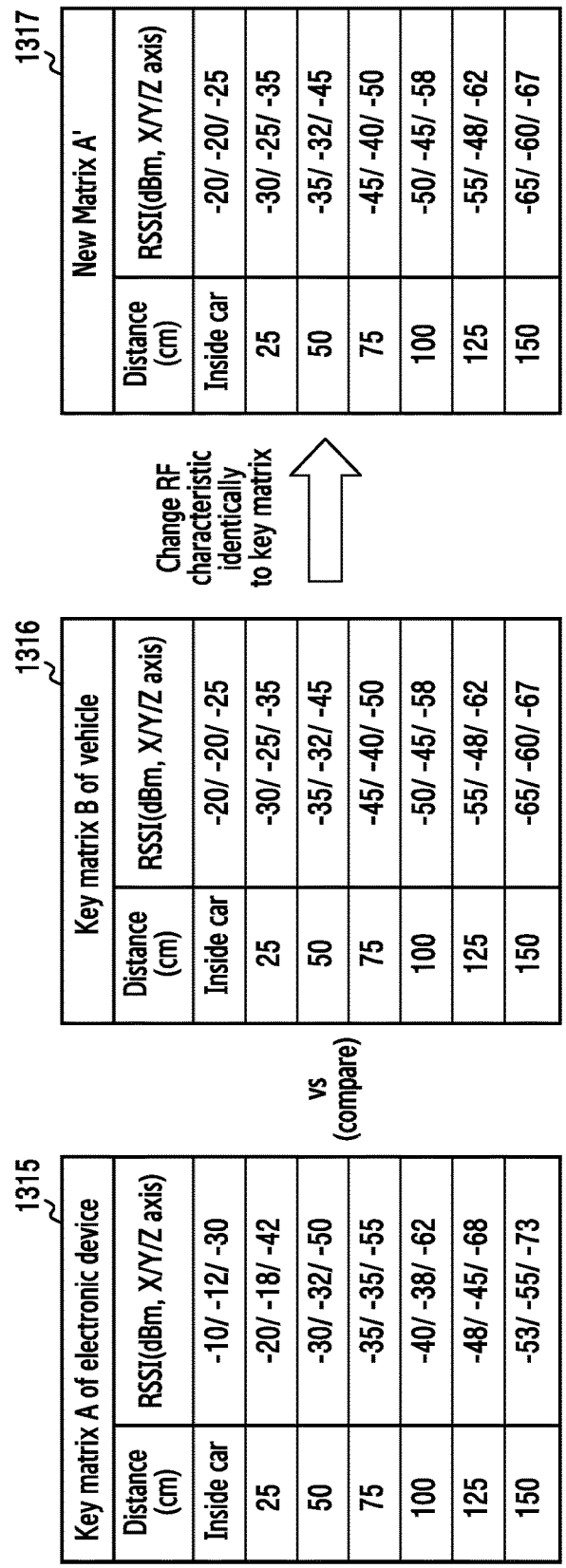

FIGS. 13A, 13B and FIG. 13C are diagrams illustrating an example of an RF characteristic data table according to various example embodiments of the present disclosure. An electronic device 1300 according to various example embodiments may include all or some parts of the electronic device 101 of FIG. 1.

Referring to FIG. 13A according to various example embodiments, the electronic device 1300 may transmit RF signal strength information on the basis of at least one part of RF signal information received from a vehicle, and may transmit at least one part of the changed signal strength information to the vehicle. A smart key module 1310 equipped in the vehicle according to various example embodiments may transmit an RF signal, for example, with a specific cycle. The electronic device 1300 may receive the RF signal of the smart key module to detect a Received Signal Strength Indication (RSSI) value which is an index of received signal strength. The electronic device 1300 may transmit to the smart key module 1310 the RF signal indicating the detected RSSI value. For example, the electronic device 1300 may transmit the RSSI value to the smart key module 1310 by correcting the value so as to be matched to an RF characteristic table stored in the smart key module 1310 of the vehicle.

According to various example embodiments, as illustrated in FIG. 13A, different values may be recorded in an RF characteristic data table 1301 stored in the electronic device 1300 and an RF characteristic data table 1311 stored in the smart key module 1310. For example, in the RF characteristic data table 1301 of the electronic device 1300, if key reception signal strength is −20 dBm, −40 dBm, −65 dBm, or −80 dBm, values indicating 'inside the car', 'distance of 50 cm', 'distance of 100 cm', or 'distance of 150 cm' may be respectively recorded in association with each other. In the RF characteristic data table 1311 of the smart key module 1310, if key reception signal strength is −30 dBm, −50 dBm, −70 dBm, or −90 dBm, values indicating 'inside the car', 'distance of 50 cm', 'distance of 100 cm', or 'distance of 150 cm' may be respectively recorded in association with each other. For example, the RF characteristic data table 1301 of the electronic device may be generated in the electronic device 1300 and thereafter stored in the memory, or may be generated in the server and thereafter downloaded and stored in the electronic device 1300.

According to various example embodiments, the RF characteristic data table 1311 of the smart key module 1310 may be configured so as to be matched to the smart key for the vehicle including the smart key module 1310. Accordingly, the RF characteristic data table 1301 of the electronic device 1300 may include values different from those of the RF characteristic data table 1311 of the smart key module 1310 due to an RF characteristic difference of the electronic device 1300 and the smart key.

According to various example embodiments, in case of using a smart phone (e.g., the electronic device 1300) having a larger size than the smart key and having higher (or lower) reception sensitivity of an RF signal instead of the smart key, even if the RF signal is transmitted with the same strength in the smart key module 1310, strength of the RF signal received by the smart phone is greater (or less) than strength of the RF signal received by the smart key, and thus a difference between them must be corrected. For example, referring to FIG. 13A, if the smart key and the electronic device 1300 are equally located at a distance separated by 50 cm from the vehicle of the smart key module 1310, the smart key having relatively low reception sensitivity may detect an RSSI value of the RF signal as −50 dBm, and the electronic device 1300 having relatively high reception strength may detect the RSSI value of the RF signal as −40 dBm.

The electronic device 1300 according to various example embodiments may correct the RSSI value of the RF signal as an RSSI value of −50 dBm by referring to the reference mapping table provided from the server, even if the RSSI value of the RF signal is detected as −40 dBm in order to correct an RF characteristic deviation with respect to the aforementioned smart key. The electronic device 1300 may transmit the RF signal indicating the corrected RSSI value of −50 dBm to the smart key module 1310.

The electronic device 1300 according to various example embodiments may decrease an input gain of a receiving end of the electronic device 1300 for receiving the RF signal of the smart key module 1310 such that the RSSI value of the RF signal is detected as −50 dBm, in order to correct an RF characteristic deviation with respect to the aforementioned smart key. Herein, a method of correcting the RSSI value and a method of adjusting the input gain of the receiving end may be applied independently or may be applied together to be associated with each other.

According to various example embodiments, herein, the correction of the RSSI value may be influenced by a detection value of a posture sensor included in the electronic device 1300. For example, this is because reception sensitivity of the RF signal received from the smart key module 1310 may differ depending on a posture of the electronic device 1300.

According to various example embodiments, if the posture of the electronic device 1300 detected through the posture sensor is in a direction (e.g., a horizontal posture) facing the smart key module 1310, the electronic device 1300 may determine that the reception sensitivity of the RF signal is relatively high. If the posture of the electronic device 1300 detected through the posture sensor is in a direction (e.g., an inclined posture) not facing the smart key module 1310, the electronic device 1300 may determine that the reception sensitivity of the RF signal is relatively low. Accordingly, the electronic device 1300 may differently assign a weight to the RSSI correction value on the basis of posture information of the electronic device 1300 detected through the posture sensor, or may differently adjust the input gain of the receiving end.

According to various example embodiments, the electronic device 1300 may use a reference mapping table 1314 as illustrated in FIG. 13B in order to correct the RSSI value of the RF signal transmitted to the smart key module 1310. For example, the electronic device 1300 may detect an RSSI value for a distance to the vehicle similarly to a key matrix 1312 of the electronic device on the basis of the RF characteristic of the electronic device 1300. The smart key module 1310 of the vehicle may include a key matrix 1313 of the vehicle including the RSSI value for the distance to the vehicle on the basis of the RF characteristic of the smart key having a RF characteristic different from the electronic device 1300. Accordingly, the electronic device 1300 may generate the new matrix 1314 of a distance reference by combining RSSI values of the key matrix 1312 of the electronic device and the key matrix 1313 of the vehicle in order to correct a deviation of an RSSI value for a distance to the vehicle, which is generated due to an RF characteristic deviation with respect to the smart key. For example, the new matrix 1314 may be generated in such a manner that information of the key matrix 1312 of the electronic device is set to an input RSSI and information of the key matrix 1313 of the vehicle is set to an output RSSI so that the input RSSI and the output RSSI are matched in a 1:1 manner.

According to various example embodiments, if the RSSI value of the RF signal received from the vehicle is "−10/−12/−30 dBm", the electronic device 1300 may correct the RSSI value to "−20/−20/−30 dBm" on the basis of the new matrix 1314 and may transmit it to the smart key module 1310.

According to various example embodiments, the electronic device 1300 may update a reference mapping table 1317 as illustrated in FIG. 13C in order to change the RF characteristic of the electronic device 1300 so as to correct the RF characteristic deviation with respect to the smart key. For example, the electronic device 1300 may detect an RSSI value for a distance to the vehicle similarly to a key matrix 1315 of the electronic device on the basis of the RF characteristic of the electronic device 1300. The smart key module 1310 of the vehicle may include a key matrix 1316 of the vehicle including the RSSI value for the distance to the vehicle on the basis of the RF characteristic of the smart key having a RF characteristic different from the electronic device 1300. Accordingly, the electronic device 1300 may change the RF characteristic of the electronic device to include the RSSI value for the distance to the vehicle similarly to the new matrix 1317.

Figure 14:
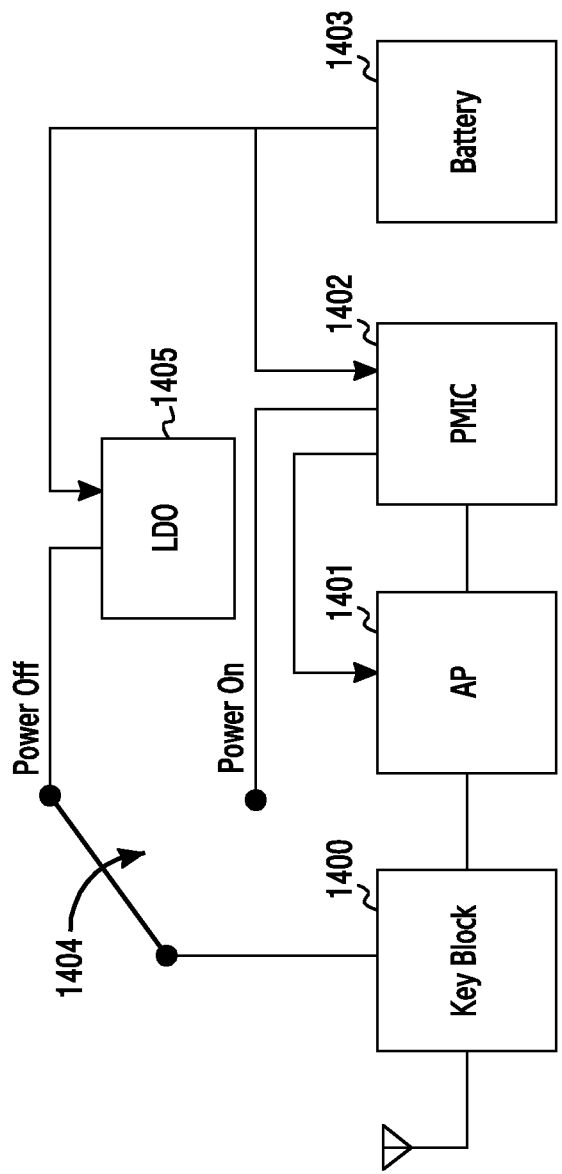
FIG. 14 is a diagram illustrating an example of configuring one part of an electronic device according to various example embodiments of the present disclosure.

FIG. 14 is a diagram illustrating an example of configuring one part of an electronic device according to various example embodiments of the present disclosure. The electronic device according to various example embodiments may include all or some parts of the electronic device 101 of FIG. 1. The following description is a block diagram illustrating example power management of a key block for performing a vehicle control function even if power of the electronic device is off.

Referring to FIG. 14 according to various example embodiments, the electronic device may include a key block 1400, an application processor 1401, a Power Management Integrated Circuit (PMIC) 1402, a battery 1403, a power switch 1404, a power element (e.g., a Low Drop Out (LDO)) 1405, or the like. For example, the power element 1405 is an element for converting and/or rectifying voltage of the battery 1403 into required specific voltage, and may directly supply power of the battery 1403 as power of the key block 1400 according to the conversion of the power switch 1404.

According to various example embodiments, if main power of the electronic device is off, the electronic device may convert the power switch 1404 to connect the key block 1400 to the power element 1405. For example, the electronic device may convert the power switch 1404 to independently supply power of the battery 1403 to the key block 1400 through the power element 1405, and thus may persistently provide the smart key function in a state where the main power of the electronic device is off.

According to various example embodiments, if a power state of the battery 1403 is a low battery state (e.g., 2.8~3.3V), the electronic device may automatically turn off the main power of the electronic device. If the main power of the electronic device is off, the electronic device may convert the power switch 1404 to independently supply the power of the battery 1403 in the low battery state to the key block 1400 through the power element 1405, and thus may persistently provide the smart key function.

Figure 15:
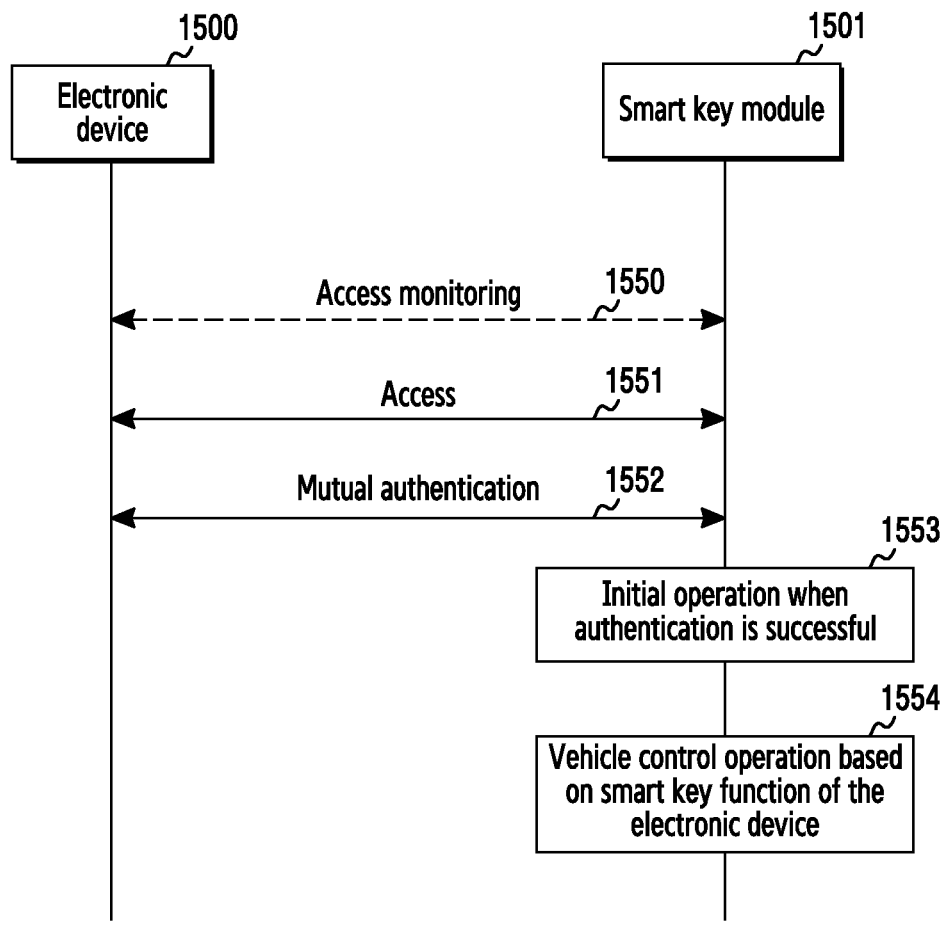
FIG. 15 is a flowchart illustrating an example vehicle automatic control function according to various example embodiments of the present disclosure.

FIG. 15 is a flowchart illustrating an example vehicle automatic control function according to various example embodiments of the present disclosure. For example, if an electronic device and a vehicle have access to each other, this may be automatically detected to perform the vehicle automatic control function. An electronic device 1500 according to various example embodiments may include all or some parts of the electronic device 101 of FIG. 1.

Referring to FIG. 15 according to various example embodiments, in operation 1550, at least one of a smart key module 1501 equipped in the vehicle and the electronic device 1500 may transmit/receive an RF signal with a specific cycle to perform an operation of monitoring whether the vehicle and the electronic device 1500 have access to each other.

In operation 1551 according to various example embodiments, the electronic device 1500 and the smart key module 1501 may perform an operation of confirming an access of the electronic device 1500 and the vehicle through the monitoring of operation 1550.

In operation 1552 according to various example embodiments, the electronic device 1500 and the smart key module 1501 may perform a mutual authentication operation through wireless communication. For example, the electronic device 1500 and the smart key module 1501 of the vehicle may perform mutual authentication by exchanging unique identification information assigned thereto through short-distance wireless communication. For example, the unique identification information of the electronic device 1500 may be a user equipment serial number, a phone number, a user ID, or the like, and the unique identification information of the vehicle may use various types of identification information such as a vehicle serial number, a smart key serial number, or the like.

In operation 1553 according to various example embodiments, if a mutual authentication is successful with respect to the electronic device 1500, the smart key module 1501 of the vehicle may perform an initial operation. For example, the smart key module 1501 may perform various operations such as flickering of warning light or the like of the vehicle and automatically opening of a door or the like, in order to indicate the authentication success. Further, the electronic device 1500 may display various messages or the like to indicate the authentication success on a screen of the electronic device 1500.

In operation 1554 according to various example embodiments, the smart key module 1501 may perform a vehicle control operation based on the smart key function of the electronic device 1500. For example, the smart key module 1501 may perform various vehicle control operations such as turning on of engine ignition or the like without having to insert a key after the user rides on the vehicle.

Figure 16:
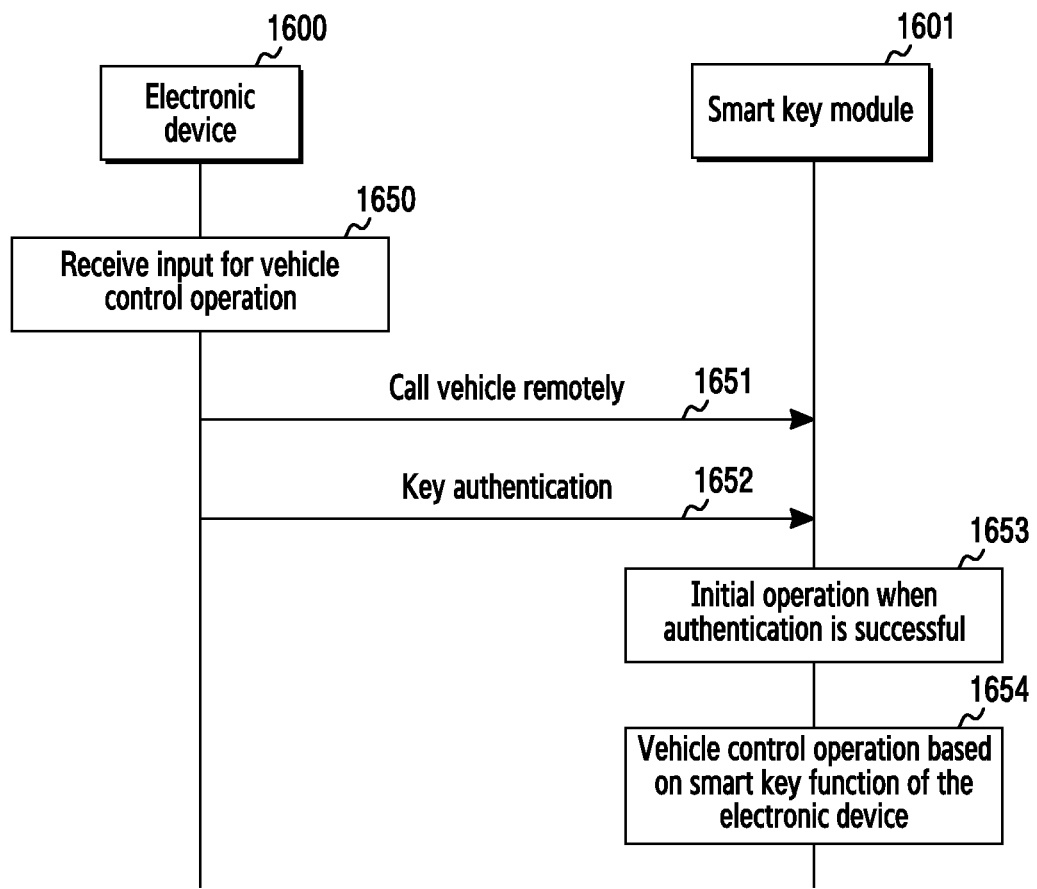
FIG. 16 is a flowchart of an operation for a vehicle remote control function according to various example embodiments of the present disclosure.

FIG. 16 is a flowchart illustrating an example vehicle remote control function according to various example embodiments of the present disclosure. An electronic device 1600 according to various example embodiments may include all or some parts of the electronic device 101 of FIG. 1. For example, the electronic device 1600 may perform a vehicle remote control function (e.g., a Remote Keyless Entry (RKE)) such as turning on/off of ignition and opening/closing of a door or the like of the vehicle through wireless communication in a distance far from the vehicle (e.g., a smart key module 1601).

Referring to FIG. 16 according to various example embodiments, in operation 1650, the electronic device 1600 carried by a user may perform an operation of receiving an input for a vehicle control through a smart key function. For example, the electronic device 1600 may execute an application for executing the smart key function through an interface with respect to the user. The electronic device 1600 may receive a user input for the vehicle control through the application. For another example, the electronic device 1600 may receive an input of a button (hardware key) to which a vehicle control function is mapped.

In operation 1651 according to various example embodiments, the electronic device 1600 may perform an operation of remotely calling the vehicle. For example, the electronic device 1600 may remotely transmit a vehicle call signal if the vehicle (e.g., the smart key module 1601) is separated far from it. For example, the electronic device 1600 may generate unique identification information assigned thereto and an RF signal included in a command for requesting a vehicle call, and may transmit them to the smart key module 1601 of the vehicle.

In operation 1652 according to various example embodiments, the electronic device 1600 and the smart key module 1601 equipped in the called vehicle may perform a key authentication operation. For example, the key authentication operation is for exchanging and confirming a specific code value specified in advance between the electronic device 1600 and the smart key module 1601, and a key code value encrypted for security may be mutually exchanged.

In operation 1653 according to various example embodiments, the smart key module 1601 may perform an initial operation if key authentication is successfully achieved with respect to the electronic device 1600. For example, the smart key module 1601 may perform various operations to indicate the success of key authentication, such as flickering of warning light of the vehicle, automatically opening of a door, or the like. For another example, the electronic device 1600 may output key authentication success information by using at least one of a message, a sound, and a vibration.

In operation 1654 according to various example embodiments, the smart key module 1601 may perform a vehicle control operation based on the smart key function of the electronic device 1600. For example, the smart key module 1601 may receive an RF signal transmitted from the electronic device 1600, and may remotely perform various vehicle control operations such as turning on/off of ignition of the vehicle, opening/closing of a door, or the like.

Figure 17:
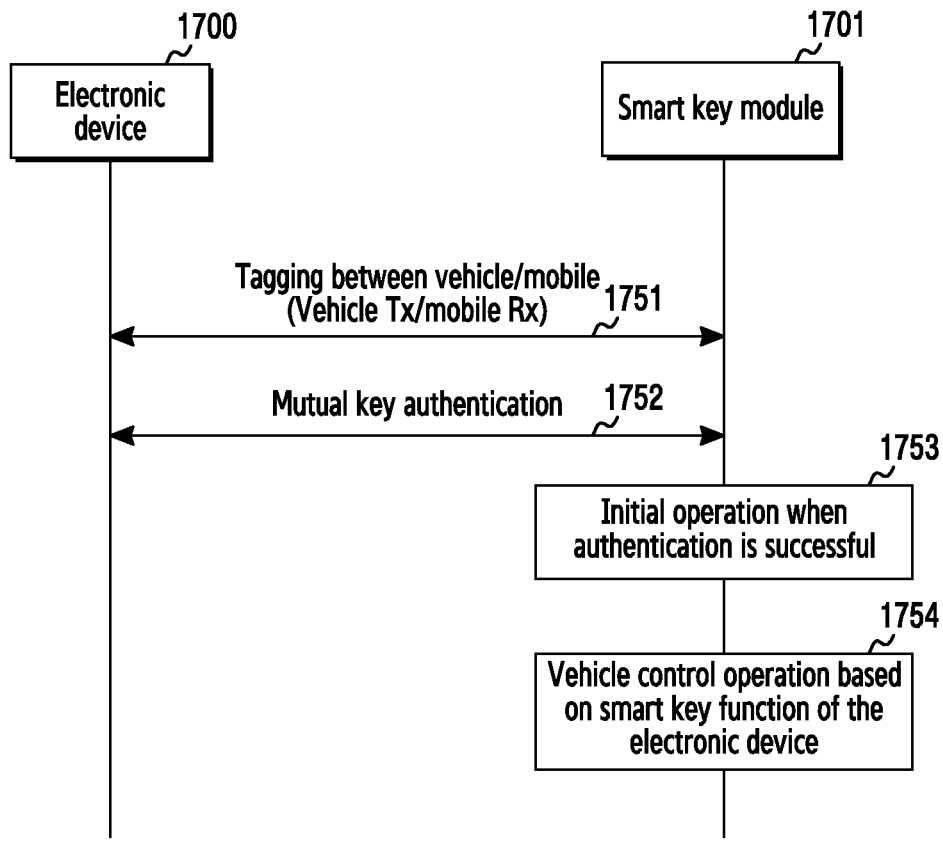
FIG. 17 is a flowchart illustrating an example vehicle access and control function according to various example embodiments of the present disclosure.

FIG. 17 is a flowchart illustrating an example vehicle access and control function according to various example embodiments of the present disclosure. An electronic device 1700 according to various example embodiments may include all or some parts of the electronic device 101 of FIG. 1. For example, the electronic device 1700 may perform the vehicle access and control function (e.g., tagging & control) through tagging with the vehicle (e.g., a smart key module 1701).

Referring to FIG. 17 according to various example embodiments, if tagging occurs in the electronic device 1700 and the vehicle in operation 1751, the smart key module 1701 equipped in the vehicle and the electronic device 1700 may perform a mutual key authentication operation in operation 1752. For example, the key authentication operation is for exchanging and confirming a specific code value specified in advance between the electronic device 1700 and the smart key module 1701. For security, encrypted key code values may be mutually exchanged.

In operation 1753 according to various example embodiments, if the mutual key authentication is successful with respect to the electronic device 1700, the smart key module 1701 may perform the initial operation. For example, the smart key module 1701 may perform various operations such as flickering of warning light or the like of the electronic device and automatically opening of a door or the like, in order to indicate a key authentication success. For another example, the electronic device 1700 may output key authentication success information by using at least one of visual information (e.g., a message), a sound, and a vibration.

In operation 1754 according to various example embodiments, the smart key module 1701 may perform a vehicle control operation based on the smart key function of the electronic device 1700. For example, if the user tags the electronic device on a key box after riding on the vehicle, the smart key module 1701 may perform various vehicle control operations such as turning on of engine ignition.

According to various example embodiments, at least one of the electronic device 1700 and the smart key module 1701 may perform an operation of monitoring whether a mutual access is achieved. For example, at least one of the electronic device 1700 and the smart key module 1701 may transmit/receive an RF signal with a specific cycle to confirm an access of the vehicle and the electronic device 1700. Upon confirming the access of the vehicle and the electronic device 1700, at least one of the electronic device 1700 and the smart key module 1701 may detect tagging information between the vehicle and the electronic device 1700 by activating a sensor for detecting the tagging.

Figure 18A:
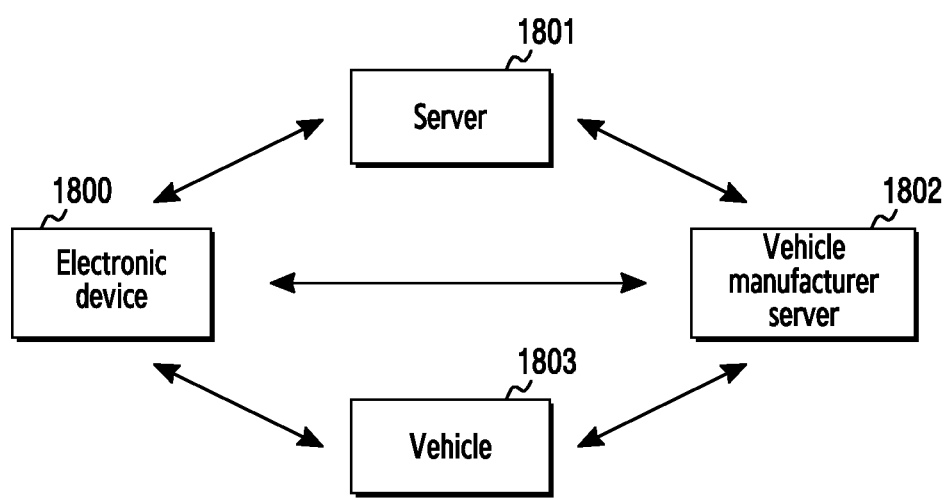
FIG. 18A is a diagram illustrating an example of a network system for issuing a smart key according to various example embodiments of the present disclosure.

FIG. 18A is a diagram illustrating an example of a network system for issuing a smart key according to various example embodiments of the present disclosure. An electronic device 1800 according to various example embodiments may include all or some parts of the electronic device 101 of FIG. 1.

Referring to FIG. 18A, the network system may include the electronic device 1800, a server 1801, a vehicle manufacturer server 1802, and a vehicle 1803 to interwork with one another. For example, the server 1801 and the vehicle manufacturer server 1802 may interwork with each other as separate elements, or may be one integrated server.

For another example, the server 1801 may interwork with the electronic device 1800, and may perform a relay function so that the electronic device 1800 and the vehicle manufacturer server 1802 interwork with each other. Further, the vehicle manufacturer server 1802 may interwork with the electronic device 1800 through the server 1801, or may directly interwork with the electronic device 1800 as illustrated in FIG. 18A.

According to various example embodiments, the electronic device 1800 may acquire a key (e.g., a master key) of the vehicle 1803 to be controlled through a smart key function from the vehicle manufacturer server 1802. For example, if user authentication is successful through the server 1801, the electronic device 1800 may acquire the key of the vehicle 1803 from the vehicle manufacturer server 1802. For another example, if the user authentication is successful through the vehicle manufacturer server 1802, the electronic device 1800 may acquire the key of the vehicle 1803 from the vehicle manufacturer server 1802.

Figure 18B:
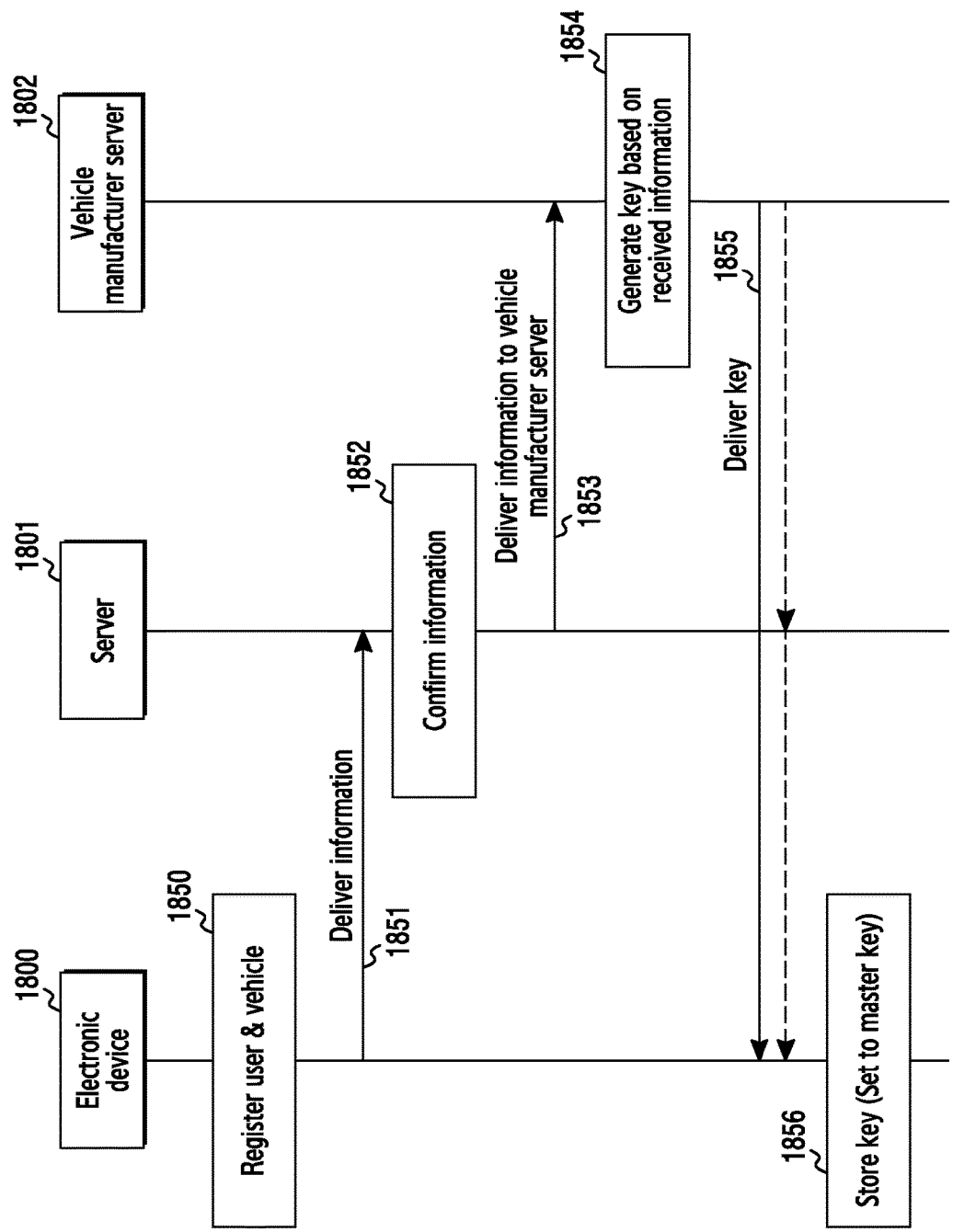
FIG. 18B is a flowchart illustrating an example function of newly issuing a smart key according to various example embodiments of the present disclosure.

FIG. 18B is a flowchart illustrating an example function of newly issuing a smart key according to various example embodiments of the present disclosure. The electronic device 1800 according to various example embodiments may include all or some parts of the electronic device 101 of FIG. 1. For example, the electronic device 1800 may wirelessly communicate with the server 1801 and the vehicle manufacturer server 1802, and thus may acquire and store a newly issued smart key for controlling a first vehicle.

Referring to FIG. 18B according to various example embodiments, in operation 1850, the electronic device 1800 may perform an operation for a user and vehicle registration procedure. For example, the electronic device 1800 may perform the user and vehicle registration procedure by logging in an application for the user and vehicle registration. For another example, the electronic device 1800 may perform a user and vehicle registration procedure without an additional login (e.g., non-member) through the application for the user and vehicle registration. For another example, the electronic device 1800 may perform the user and vehicle registration procedure by accessing a website operated by the server 1801. For another example, the electronic device 1800 may perform the user and vehicle registration procedure through an Automatic Response System (ARS) operated by the server 1801. Herein, in the user and vehicle registration procedure, various types of user information and vehicle information may be used such as unique identification information of the user, unique identification information of the electronic device, and unique identification information of the vehicle, or the like.

In operation 1851 according to various example embodiments, the electronic device 1800 may perform an operation of providing information to the server 1801. For example, information provided to the server 1801 may include at least one part of the user information and the vehicle information.

In operation 1852 according to various example embodiments, the server 1801 may perform an operation of confirming information provided from the electronic device 1800. For example, the server 1801 may confirm validity of information provided from the electronic device 1800.

In operation 1853 according to various example embodiments, if the information provided from the electronic device 1800 is valid, the server 1801 may perform an operation of providing information to the vehicle manufacturer server 1802. For example, the server 1801 may provide the vehicle manufacturer server 1802 with at least one part of the user information and vehicle information provided from the electronic device 1800. For example, the server 1801 may be a manufacturer server of the electronic device, and the server 1801 and the vehicle manufacturer server 1802 may interwork with each other as separate servers or may be integrated as one server.

In operation 1854 according to various example embodiments, the vehicle manufacturer server 1802 may perform an operation of generating a key corresponding to the first vehicle on the basis of the received information. For example, the vehicle manufacturer server 1802 may generate an encrypted key on the basis of at least one part of the user information and vehicle information received from the server 1801.

In operation 1855 according to various example embodiments, the vehicle manufacturer server 1802 may perform an operation of transmitting the key to the electronic device 1800. For example, the vehicle manufacturer server 1802 may transmit the key to the electronic device 1800 through a network. For another example, the vehicle manufacturer server 1802 may transmit the key to the electronic device 1800 via the server 1801.

In operation 1856 according to various example embodiments, the electronic device 1800 may perform an operation of receiving and storing the key. For example, the electronic device 1800 may use the key provided from the server 1801 or the vehicle manufacturer server 1802 as a key for controlling the first vehicle. Herein, the electronic device 1800 may register the key as a master key.

Figure 19:
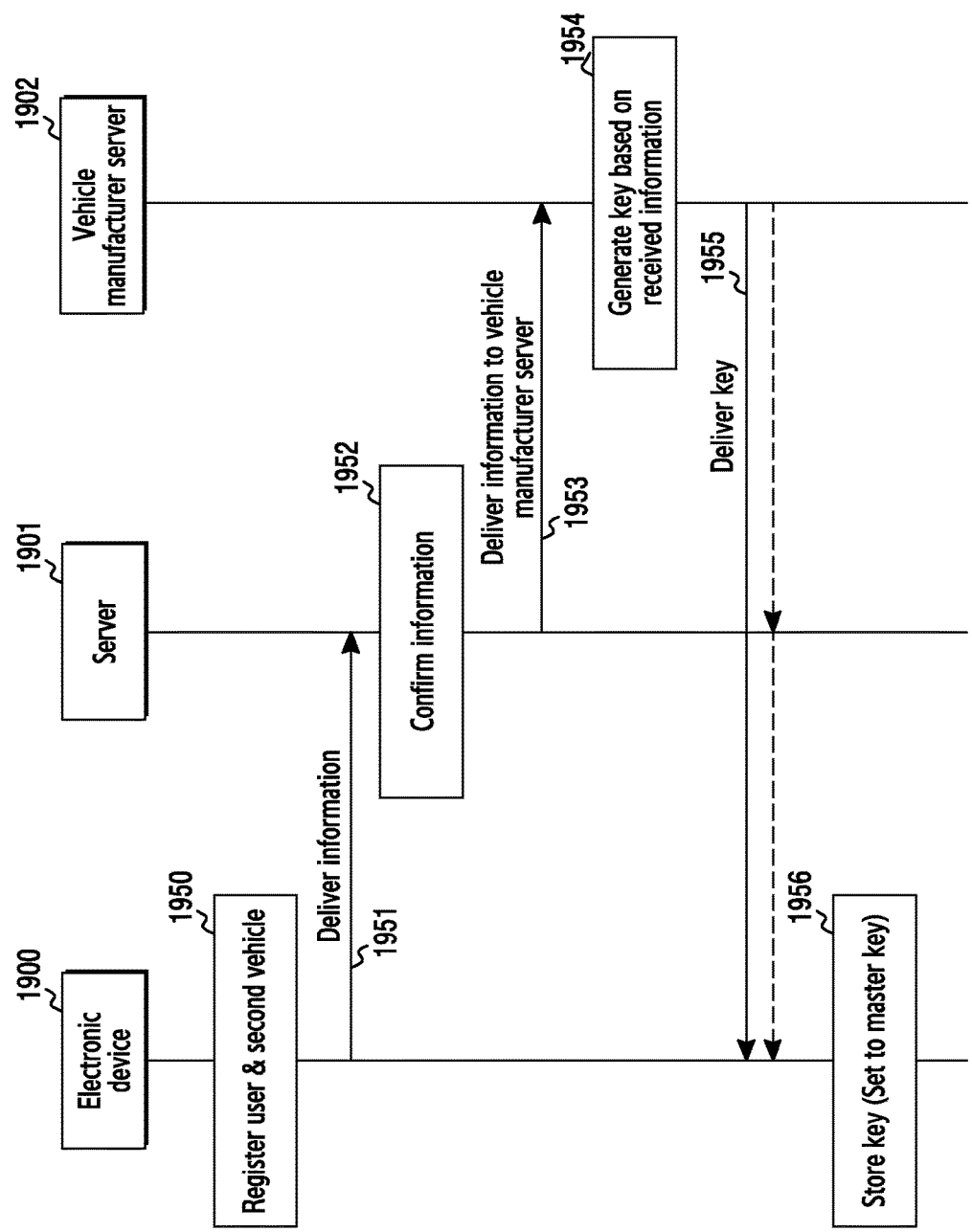
FIG. 19 is a flowchart illustrating an example function of additionally issuing a smart key according to various example embodiments of the present disclosure.

FIG. 19 is a flowchart illustrating an example function of additionally issuing a smart key according to various example embodiments of the present disclosure. An electronic device 1900 according to various example embodiments may include all or some parts of the electronic device 101 of FIG. 1. For example, the electronic device 1900 may wirelessly communicate with a server 1901 and a vehicle manufacturer server 1902, and thus may acquire a newly issued smart key for controlling a second vehicle which is additionally purchased by a user.

Referring to FIG. 19 according to various example embodiments, in operation 1950, if a user additionally purchases the second vehicle, the electronic device 1900 may perform an operation of registering the second vehicle information and user information. For example, the electronic device 1900 may register the second vehicle information and the user information by using an application. For another example, the electronic device 1900 may register the second vehicle information and the user information through a web site or an ARS.

In operation 1951 according to various example embodiments, the electronic device 1900 may perform an operation of providing information to the server 1901. For example, information provided to the server 1901 may include at least one part of the user information and the second vehicle information.

In operation 1952 according to various example embodiments, the server 1901 may perform an operation of confirming information provided from the electronic device 1900. For example, the server 1901 may confirm validity of information provided from the electronic device 1900.

In operation 1953 according to various example embodiments, if the information provided from the electronic device 1900 is valid, the server 1901 may perform an operation of providing information to the vehicle manufacturer server 1902. For example, the information provided to the vehicle manufacturer server 1902 may include at least one part of the user information and second vehicle information provided from the electronic device 1900. For example, the server 1901 and the vehicle manufacturer server 1902 may interwork with each other as separate servers or may be integrated as one server.

In operation 1954 according to various example embodiments, the vehicle manufacturer server 1902 may perform an operation of generating a key corresponding to the second vehicle on the basis of at least one part of the received information. For example, the key may be encrypted.

In operation 1955 according to various example embodiments, the vehicle manufacturer server 1902 may perform an operation of transmitting the key to the electronic device 1900.

In operation 1956 according to various example embodiments, the electronic device 1900 may perform an operation of receiving and storing the key. For example, the electronic device 1900 may use the key as a key for controlling at least one vehicle. Herein, the key may be configured as a master key capable of remotely controlling both of the first vehicle and the second vehicle, or may be limited to remotely control only the second vehicle.

Figure 20:
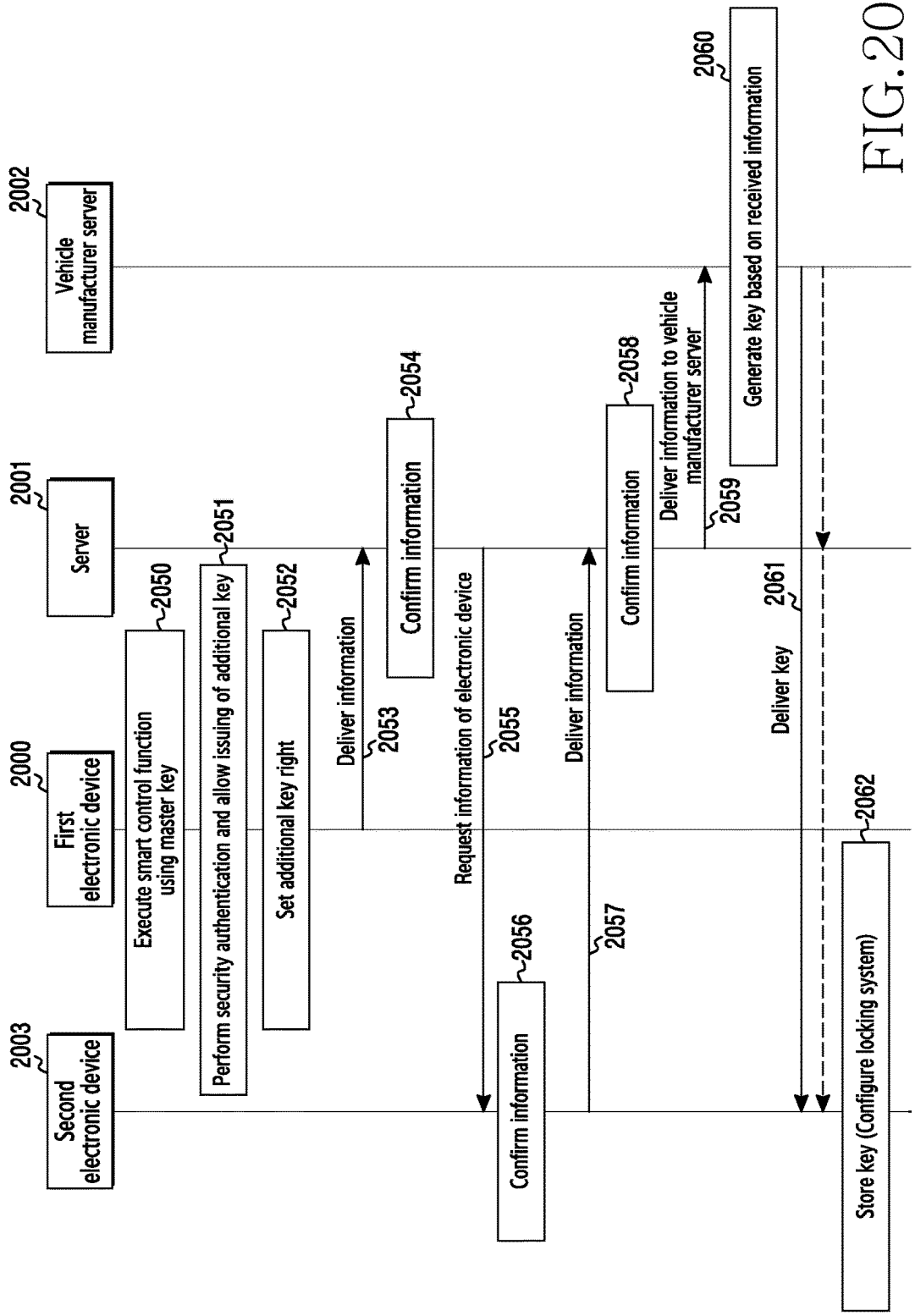
FIG. 20 is a flowchart illustrating an example function of issuing a smart key to others according to various example embodiments of the present disclosure.

FIG. 20 is a flowchart illustrating an example function of issuing a smart key to others according to various example embodiments of the present disclosure. A first electronic device 2000 or a second electronic device 2003 according to various example embodiments may include all or some parts of the electronic device 101 of FIG. 1. For example, the first electronic device 2000 may wirelessly communicate with a server 2001 and a vehicle manufacturer server 2002, and may issue the smart key for a vehicle control to the second electronic device 2003 of the others.

Referring to FIG. 20 according to various example embodiments, in operation 2050, the first electronic device 2000 may perform an operation of executing a smart key function using a master key. For example, the first electronic device 2000 may execute an application for managing the master key. For another example, the first electronic device 2000 may log in a web site operated by the server 2001. For example, the first electronic device 2000 may log in the web site as a non-member.

In operation 2051 according to various example embodiments, the first electronic device 2000 may perform security authentication on the second electronic device 2003 for issuing the key and thereafter may perform an operation of allowing to issue an additional key. For example, the first electronic device 2000 may perform an authentication procedure on a user of the second electronic device 2003 by using user information (e.g., a phone number or an ID or the like) of the second electronic device 2003. If the user of the second electronic device 2003 is successfully authenticated, the first electronic device 2000 may allow to issue the additional key for the second electronic device 2003.

In operation 2052 according to various example embodiments, the first electronic device 2000 may perform a right setting operation for limiting a right to the additional key. For example, the first electronic device 2000 may set a right to the additional key through a user interface (e.g., a right setting screen).

For example, if the vehicle is driven by using the additional key, the right to the additional key may include a driving speed (e.g., an upper limit of 80 Km/h), an operating time (e.g., operable from 7:00 am to 9:00 pm), an operating duration (e.g., operable from Sep. 1, 2015 to Sep. 30, 2015), an access right (e.g., impossible to have simultaneous access to the master key).

In operation 2053 according to various example embodiments, the first electronic device 2000 may perform an operation of providing information required to issue the additional key to the server 2001. For example, the information required to issue the additional key may include user information of the master key, master key information, new user information for issuing the additional key, or the like.

In operation 2054 according to various example embodiments, the server 2001 may perform an operation of confirming the received information. For example, the server 2001 may confirm the new user information from the information provided from the first electronic device 2000.

In operation 2055 according to various example embodiments, the server 2001 may perform an operation of requesting the second electronic device 2003 to provide information on the second electronic device 2003.

In operation 2056 according to various example embodiments, the second electronic device 2003 may perform an operation of confirming the information on the second electronic device 2003 according to the request of the server 2001.

For example, the second electronic device 2003 may execute an application for managing the smart key to acquire the information on the second electronic device 2003. For another example, the second electronic device 2003 may acquire the information on the second electronic device 2003 through a web site or an ARS. Herein, the information on the second electronic device 2003 may include at least one of identification information on the user of the second electronic device 2003, identification information of the second electronic device 2003, and identification information of the vehicle.

In operation 2057 according to various example embodiments, the second electronic device 2003 may perform an operation of providing the information on the second electronic device 2003 to the server 2001.

In operation 2058 according to various example embodiments, the server 2001 may perform an operation of confirming the information provided from the second electronic device 2003. For example, the server 2001 may confirm at least one part of the identification information on the user of the second electronic device 2003 and the identification information of the second electronic device 2003.

In operation 2059 according to various example embodiments, the server 2001 may perform an operation of providing the information to the vehicle manufacturer server 2002. For example, the server 2001 and the vehicle manufacturer server 2002 may interwork as a separate server or may be integrated as one server.

In operation 2060 according to various example embodiments, the vehicle manufacturer server 2002 may generate a key for additional issuing on the basis of at least one part of the received information. For example, the vehicle manufacturer server 2002 may generate an encrypted key for additional issuing to the second electronic device 2003 on the basis of at least one part of the identification information on the user of the second electronic device 2003 and the identification information of the second electronic device 2003.

In operation 2061 according to various example embodiments, the vehicle manufacturer server 2002 may perform an operation of providing the key for additional issuing to the second electronic device 2003. For example, the vehicle manufacturer server 2002 may directly transmit the key to the second electronic device 2003 or may transmit the key to the second electronic device 2003 via the server 2001.

In operation 2062 according to various example embodiments, the second electronic device 2003 may perform an operation of receiving and storing the key. For example, the second electronic device 2003 may use the key as a key for controlling the vehicle, and may configure a locking system suitable for the key.

According to various example embodiments, if a remote communication modem does not exist in the vehicle, a procedure of additionally issuing a key for the vehicle to the second electronic device 2003 may equally perform operation 2050 to operation 2059. In operation 2060 and operation 2061, the vehicle manufacturer server 2002 may generate a temporary access key encrypted for the vehicle and a key for controlling the vehicle and may transmit the keys to the second electronic device 2003. In operation 2062, the second electronic device 2003 may receive and store the temporary access key and the key for controlling the vehicle.

According to various example embodiments, in case of approaching the vehicle not having the remote communication modem, the second electronic device 2003 may have access to the locking system of the vehicle by using the temporary access key. The second electronic device 2003 may communicate with the smart key module equipped in the vehicle through short-distance communication and thus may add the locking system suitable for the key for controlling the vehicle to the vehicle.

Figure 21:
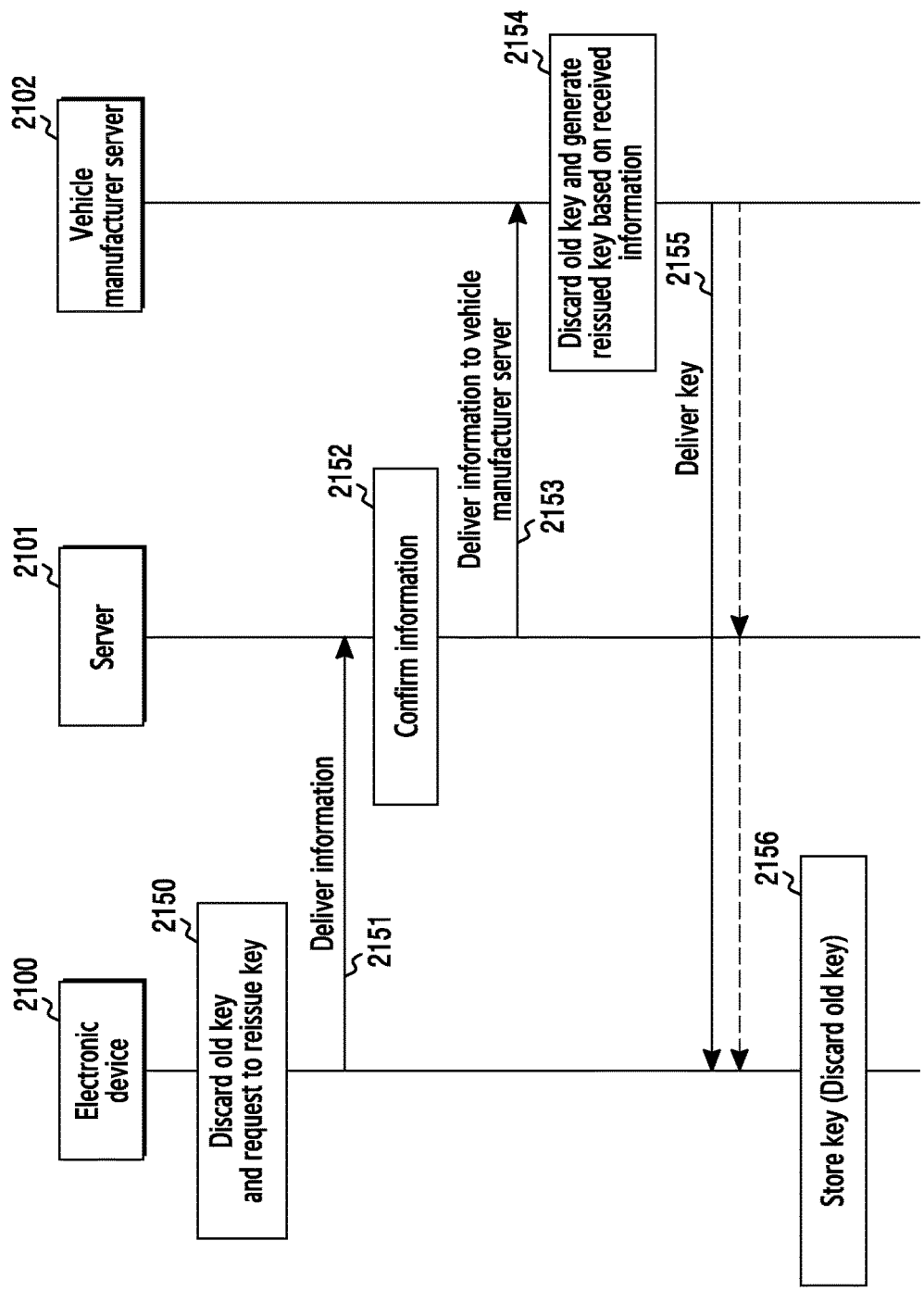
FIG. 21 is a flowchart illustrating an example function of discarding and reissuing a smart key according to various example embodiments of the present disclosure.

FIG. 21 is a flowchart illustrating an example function of discarding and reissuing a smart key according to various example embodiments of the present disclosure. An electronic device 2100 according to various example embodiments may include all or some parts of the electronic device 101 of FIG. 1. For example, the electronic device 2100 may wirelessly communicate with a server 2101 and a vehicle manufacturer server 2102 to discard an old smart key and to reissue a new smart key.

Referring to FIG. 21 according to various example embodiments, in operation 2150, the electronic device 2100 may discard the old key and perform an operation of requesting key reissuing. For example, the electronic device 2100 may discard the key stored in the conventional electronic device and may confirm whether an input for requesting key reissuing is detected when the conventional electronic device having the key stored therein is lost or discarded. For another example, the electronic device 2100 may confirm whether an input for requesting the discarding of the key stored in the electronic device 2100 is detected when the vehicle is scrapped. For another example, the electronic device 2100 may confirm whether the input for requesting the discarding of the key stored in the electronic device 2100 is detected when an ownership of the vehicle is transferred. For example, the electronic device 2100 may confirm whether the request for discarding the key or reissuing the key is detected through a web site or an application for managing the key. Herein, an additional security authentication step may be further included to reinforce the security.

In operation 2151 according to various example embodiments, the electronic device 2100 may perform an operation of transmitting information for requesting the discarding and reissuing of the key to the server 2101. For example, the electronic device 2100 may transmit information of a user who requests for the discarding and reissuing of the key, key discarding and reissuing request information, or the like to the server 2101.

In operation 2152 according to various example embodiments, the server 2101 may perform an operation of confirming information provided from the electronic device 2100. For example, the server 2101 may determine whether the information provided from the electronic device 2100 is valid. For example, the server 2101 may compare user information included in the information provided from the electronic device 2100 with pre-set valid user information to determine whether the information provided from the electronic device 2100 is valid.

In operation 2153 according to various example embodiments, an operation of delivering at least one part of the information provided from the electronic device 2100 to the vehicle manufacturer server 2102 may be performed. For example, if the confirmation result of operation 2152 shows that the validity of the information satisfies a determined condition, the server 2101 may deliver at least one part of the information to the vehicle manufacturer server 2102.

In operation 2154 according to various example embodiments, the vehicle manufacturer server 2102 may perform an operation of discarding the old key and generating a key to be reissued on the basis of at least one part of the received information. For example, the vehicle manufacturer server 2102 may generate a new key encrypted on the basis of at least one part of user information and vehicle information included in information received from the server 2101.

In operation 2155 according to various example embodiments, the vehicle manufacturer server 2102 may perform an operation of transmitting the key to the electronic device 2100. For example, the vehicle manufacturer server 2102 may directly transmit the key to the electronic device 2100 through the network, or may transmit it to the electronic device 2100 by using the server 2101. For example, the vehicle manufacturer server 2102 may transmit it together with information indicating the discarding of the old key.

In operation 2156 according to various example embodiments, the electronic device 2100 may perform an operation of receiving and storing the key and discarding the old key. For example, the electronic device 2100 may discard the old key so that the reissued key and the old key do not collide, and may store the key. The electronic device 2100 may configure a locking system corresponding to the key, and may perform a vehicle control operation in response to the key without responding to the old key.

Figure 22:
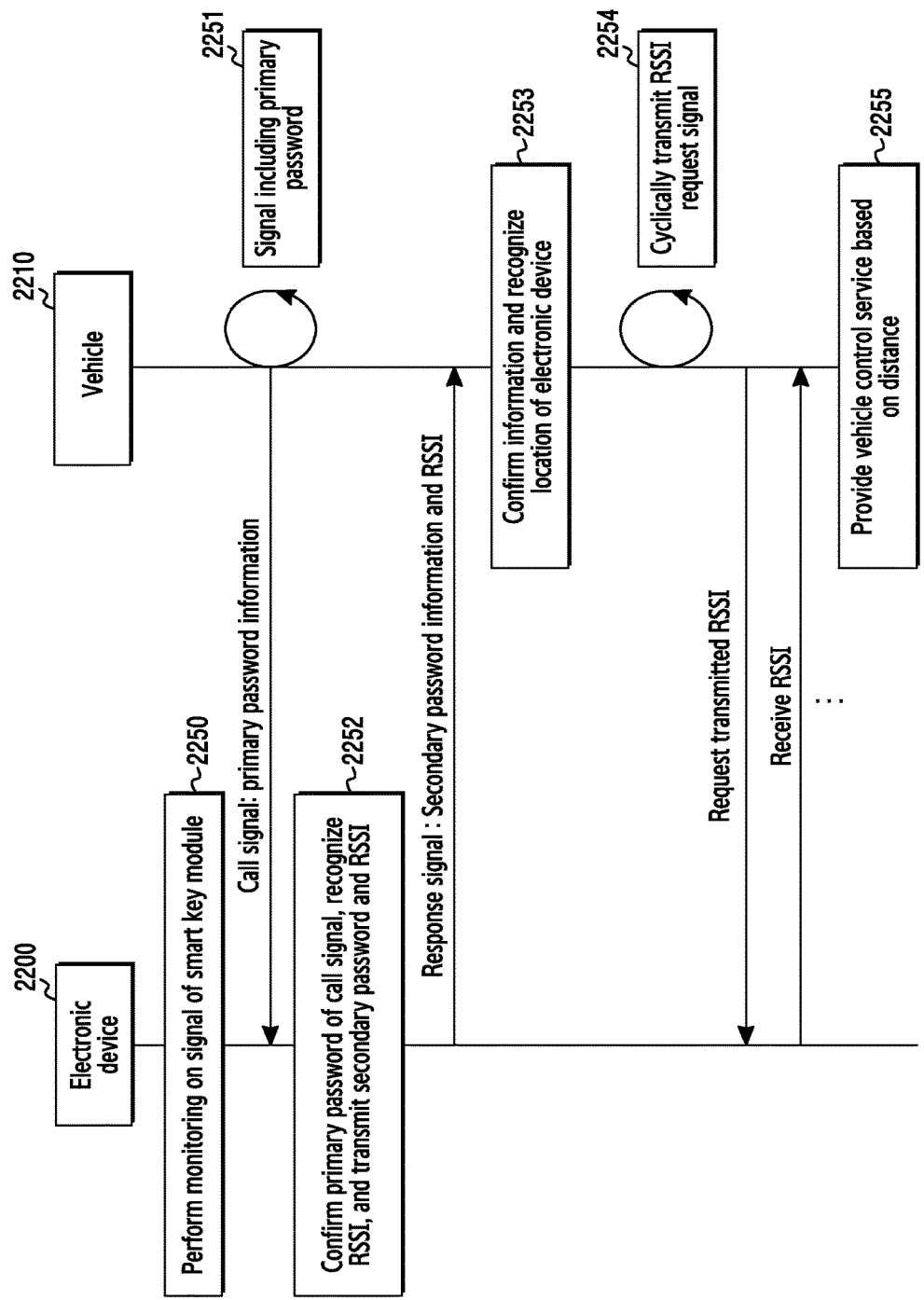
FIG. 22 is a flowchart illustrating an example operation between an electronic device and a vehicle according to various example embodiments of the present disclosure.

FIG. 22 is a flowchart illustrating an example operation between an electronic device and a vehicle according to various example embodiments of the present disclosure. An electronic device 2200 according to various example embodiments may include all or some parts of the electronic device 101 of FIG. 1. For example, a vehicle control operation between the electronic device 2200 and a vehicle 2210 may be performed through authentication using a password.

Referring to FIG. 22 according to various example embodiments, in operation 2250, the electronic device 2200 may perform a monitoring operation for detecting a signal of the vehicle 2210 (e.g., a smart key module). For example, the electronic device 2200 may cyclically monitor whether a signal transmitted from the smart key module of the vehicle 2210 is detected. For example, a cycle for monitoring whether the signal transmitted from the vehicle 2110 is detected may be set or changed by a system or a user.

In operation 2251 according to various example embodiments, the vehicle 2210 may perform an operation of transmitting at least one part of a signal including primary password information. For example, the vehicle 2210 may cyclically transmit at least one part of a call signal including the primary password information for confirming an access of the electronic device 2200 for storing the key for the vehicle control. Herein, the primary password information may be password information such as a specific code value or the like mutually agreed between the electronic device 2200 and the vehicle 2210.

In operation 2252 according to various example embodiments, the electronic device 2200 may perform an operation of transmitting a secondary password to the vehicle 2210 in response to the call signal. For example, the electronic device 2200 may confirm the primary password from the call signal received from the vehicle 2210, and may confirm an RSSI value of the call signal. If the primary password of the call signal is matched to the pre-stored password, the electronic device 2200 may correct the secondary password pre-set or randomly generated and the RSSI value of the call signal, and may transmit them to the vehicle 2210.

According to various example embodiments, as described above, the corrected RSSI value transmitted to the vehicle 2210 may be a value corrected on the basis of an RF characteristic data table as RSSI correction information or deviation information of an RF characteristic (e.g., reception sensitivity) between the smart key of the vehicle 2210 and the electronic device 2200. For example, even if an RSSI value of an RF signal (e.g., a call signal) measured by the electronic device 2200 is −20 dBm, a value corrected on the basis of the RF characteristic data table may be −30 dBm. The electronic device 2200 may transmit an RF signal indicating −30 dBm corrected by the RF characteristic data table to the vehicle 2210.

In operation 2253 according to various example embodiments, the vehicle 2210 may perform an operation of confirming the received information and recognizing a location of the electronic device. For example, if the secondary password included in the received information is matched to the pre-stored password, the vehicle 2210 may confirm the location of the electronic device 2200 by using key authentication and the RSSI value included in the received information. For example, the vehicle 2210 may determine that the distance to the electronic device 2200 is close if an RSSI value received from the electronic device 2200 is great, and may determine that the distance to the electronic device 2200 is far if the RSSI value received from the electronic device 2200 is small. Herein, secondary password information may be password information mutually agreed between the electronic device 2200 and the vehicle 2210.

In operation 2254 according to various example embodiments, the vehicle 2210 may perform an operation of transmitting a signal for requesting an RSSI value of the electronic device 2200 to the electronic device 2200. For example, the vehicle 2210 may transmit a request signal for the RSSI to the electronic device 2200 to persistently recognize the location of the electronic device 2200. The electronic device 2200 may transmit the RSSI value for the request signal of the RSSI value to the vehicle 2210 in response to the request of the RSSI value. In this case, the electronic device 2200 may correct the RSSI value for the request signal for the RSSI value and transmit it to the vehicle 2210.

In operation 2255 according to various example embodiments, the vehicle 2210 may perform an operation of providing a vehicle control service on the basis of a distance to the electronic device 2200. For example, the vehicle 2210 may prepare or provide various vehicle control services such as warning light flickering, door open preparation, engine on/off preparation, door locking, or the like.

Figure 23:
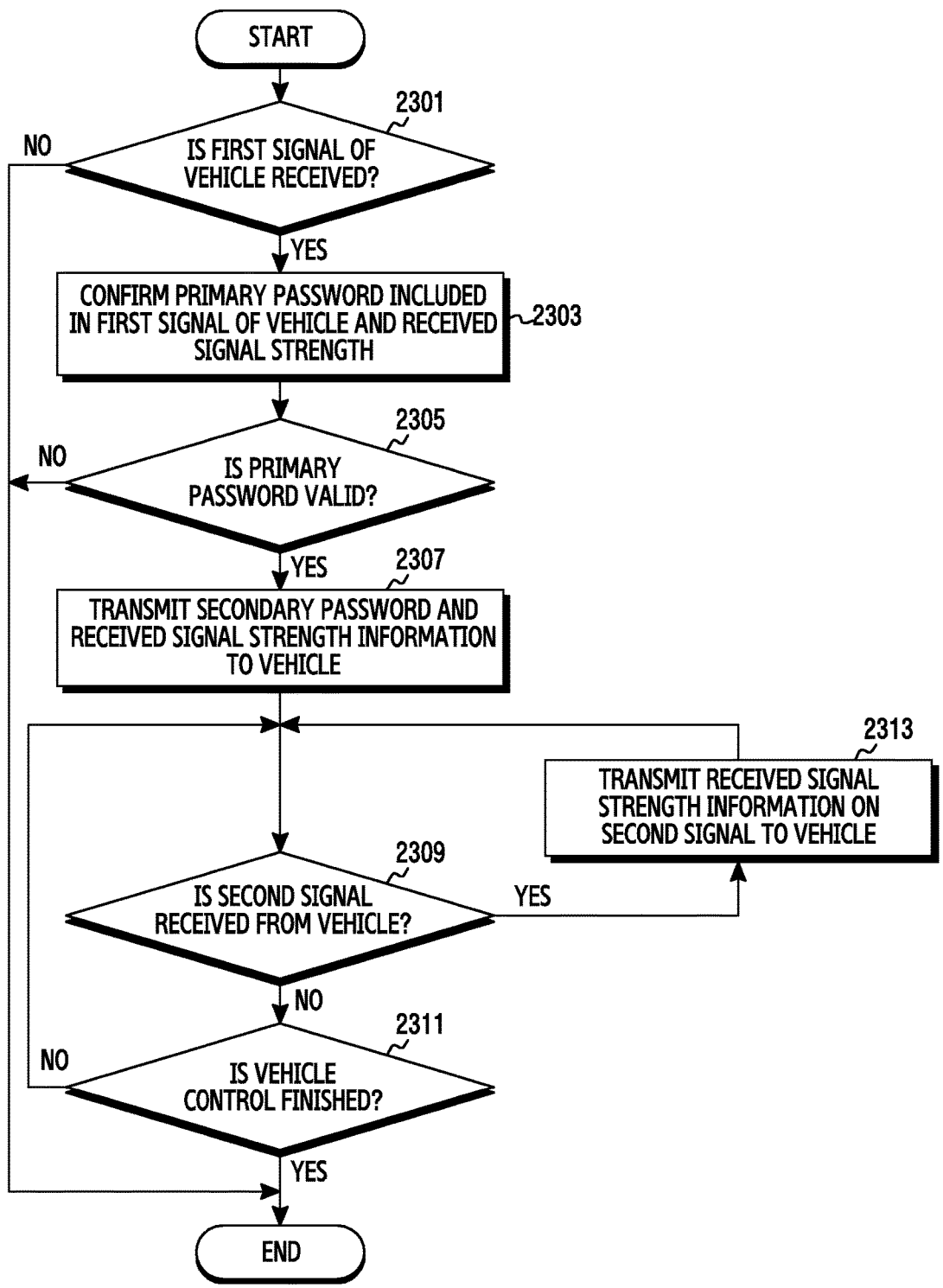
FIG. 23 is a flowchart illustrating an example operation of an electronic device according to various example embodiments of the present disclosure.

FIG. 23 is a flowchart illustrating an example operation of an electronic device according to various example embodiments of the present disclosure. The electronic device according to various example embodiments may include all or some parts of the electronic device 101 of FIG. 1.

Referring to FIG. 23 according to various example embodiments, in operation 2301, the electronic device may confirm whether a first signal transmitted from a vehicle is received. For example, the electronic device may persistently or cyclically perform an operation of monitoring a signal of the vehicle to confirm whether the first signal transmitted from the vehicle is received. For example, the first signal may include at least one part of a call signal including a primary password.

In operation 2303 according to various example embodiments, upon receiving the first signal of the vehicle, the electronic device may confirm the primary password included in the first signal of the vehicle and received signal strength on the first signal. For example, primary password information may be password information mutually agreed between the electronic device and the vehicle. The received signal strength may include an RSSI value of the first signal.

In operation 2305 according to various example embodiments, the electronic device may determine whether the primary password included in the first signal is valid. For example, the electronic device may confirm whether the primary password included in the first signal is matched to a password pre-set in the electronic device. If the primary password is matched to the pre-set password, the electronic device may determine that the primary password is valid.

The electronic device according to various example embodiments may determine that a right capable of controlling the vehicle is not set if it is determined that the primary password is not valid.

In operation 2307 according to various example embodiments, if it is determined that the primary password is valid, the electronic device may transmit received signal strength information on the signal of the vehicle and a signal including a secondary password to the vehicle. For example, the electronic device may correct an RSSI value for the signal of the vehicle on the basis of a pre-stored RF characteristic data table, and thereafter may transmit it to the vehicle together with the secondary password. For example, secondary password information may be configured as a value which is the same as or different from the primary password as password information mutually agreed between the electronic device and the vehicle.

In operation 2309 according to various example embodiments, the electronic device may confirm whether a second signal is received from the vehicle. For example, the second signal may include a received signal strength request signal transmitted to persistently confirm a location of the electronic device in the vehicle.

In operation 2311 according to various example embodiments, if the second signal is not received from the vehicle, the electronic device may confirm whether a vehicle control is finished. For example, in operation 2307, the electronic device may confirm whether a reference time elapses from a time at which the secondary password is transmitted to the vehicle. If the second signal is not received from the vehicle until the reference time elapses, the electronic device may determine that the vehicle cannot be controlled. For example, the electronic device may determine that authentication on the electronic device fails in the vehicle or it is beyond a distance capable of controlling the vehicle.

The electronic device according to various example embodiments may confirm whether the second signal is received from the vehicle in operation 2309 if the vehicle control is not finished.

In operation 2313 according to various example embodiments, if the second signal is received from the vehicle, the electronic device may detect the received signal strength information on the second signal and transmit it to the vehicle. For example, if the second signal is received from the vehicle before the reference time does not elapse from the time at which the secondary password is transmitted to the vehicle, the electronic device may determine that the electronic device is successfully authenticated on the basis of the secondary password of the electronic device in the vehicle. The electronic device may detect an RSSI value for the second signal in response to the second signal. The electronic device may correct the RSSI value for the second signal on the basis of pre-stored deviation information or an RF characteristic data table, and thereafter may transmit it to the vehicle.

In operation 2309 according to various example embodiments, the electronic device may re-confirm whether the second signal is received from the vehicle.

Figure 24:
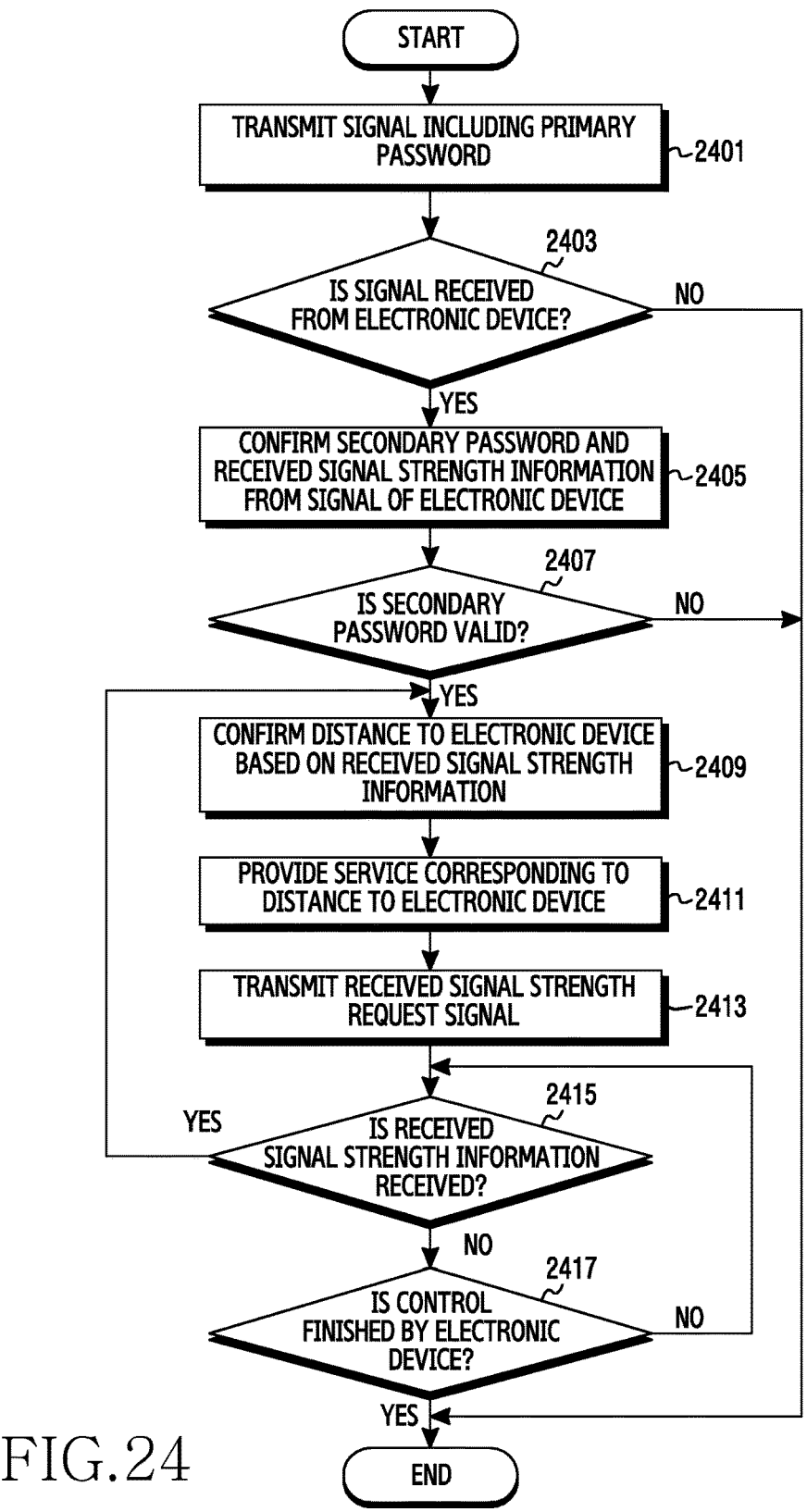
FIG. 24 is a flowchart illustrating an example operation of a vehicle according to various example embodiments of the present disclosure.

FIG. 24 is a flowchart illustrating an example operation of a vehicle according to various example embodiments of the present disclosure. The vehicle according to various example embodiments may include all or some parts of the smart key module 900 of FIG. 9 or the smart key module 1000 of FIG. 10.

Referring to FIG. 24 according to various example embodiments, in operation 2401, the vehicle (e.g., a smart control module of the vehicle) may transmit a first signal including a primary password. For example, the vehicle may transmit a call signal including the primary password persistently or cyclically so that an electronic device capable of controlling the vehicle can determine whether having access to the vehicle. For example, primary password information may be password information mutually agreed between the electronic device and the vehicle.

In operation 2403 according to various example embodiments, the vehicle may confirm whether a signal is received from the electronic device. For example, the vehicle may confirm whether a response signal for the first signal is received from the electronic device. If the response signal for the first signal is received, the vehicle may determine that the electronic device authenticates the vehicle according to the primary password included in the first signal.

In operation 2405 according to various example embodiments, the vehicle may confirm a secondary password and received signal strength information on the first signal from the signal received from the electronic device. For example, secondary password information may be configured as a value which is the same as or different from the primary password as password information mutually agreed between the electronic device and the vehicle.

In operation 2407 according to various example embodiments, the vehicle may determine whether the secondary password included in the signal received from the electronic device is valid. For example, the electronic device may confirm whether the secondary password is matched to a password pre-set in the vehicle to authenticate the electronic device. If the secondary password is matched to the pre-set password, the vehicle may determine that the secondary password is valid.

The vehicle according to various example embodiments may ignore (or discard) the signal received from the electronic device to restrict the vehicle control performed by the electronic device if it is determined that the secondary password is not valid.

In operation 2409 according to various example embodiments, if it is determined that the secondary password is valid, the vehicle may recognize a distance (location) to the electronic device on the basis of received signal strength information included in the signal received from the electronic device. For example, the vehicle may determine that the distance to the electronic device is close if an RSSI value received from the electronic device is great, and may determine that the distance to the electronic device is far if the RSSI value received from the electronic device is small.

In operation 2411 according to various example embodiments, the vehicle may provide a service corresponding to the distance to the electronic device. For example, the vehicle may prepare to flicker warning light if the distance to the electronic device is less than 5 m and to open a door if the distance to the electronic device is less than 1 m. If it is determined that the electronic device is located inside the car, the vehicle may prepare to turn an engine on/off. If the distance to the electronic device is greater than or equal to 5 m, a vehicle control service may be provided such as door locking or the like.

In operation 2413 according to various example embodiments, the vehicle may transmit to the electronic device a second signal for requesting the received signal strength of the electronic device. For example, the vehicle may cyclically or persistently transmit the received signal strength request signal to the electronic device to confirm the distance (location) to the electronic device.

In operation 2415 according to various example embodiments, the vehicle may confirm whether the received signal strength information is received from the electronic device in response to the second signal.

If the received signal strength information on the second signal is received from the electronic device, in operation 2409, the vehicle according to various example embodiments may re-confirm the distance (location) to the electronic device on the basis of the received signal strength information on the second signal.

In operation 2417 according to various example embodiments, if the received signal strength information on the second signal is not received from the electronic device, the vehicle may confirm whether the control performed by the electronic device is finished. For example, in operation 2413, the vehicle may confirm whether the reference time elapses from the time at which the received signal strength request signal is transmitted to the electronic device. If a response signal is not received from the electronic device in response to the second signal until the reference time elapses, the vehicle may determine that the control performed by the electronic device is finished. For example, the vehicle may determine that the electronic device is beyond a distance capable of controlling the vehicle.

If the control performed by the electronic device is not finished, in operation 2415, the vehicle according to various example embodiments may confirm whether the response signal is received from the electronic device in response to the second signal.

Figure 25:
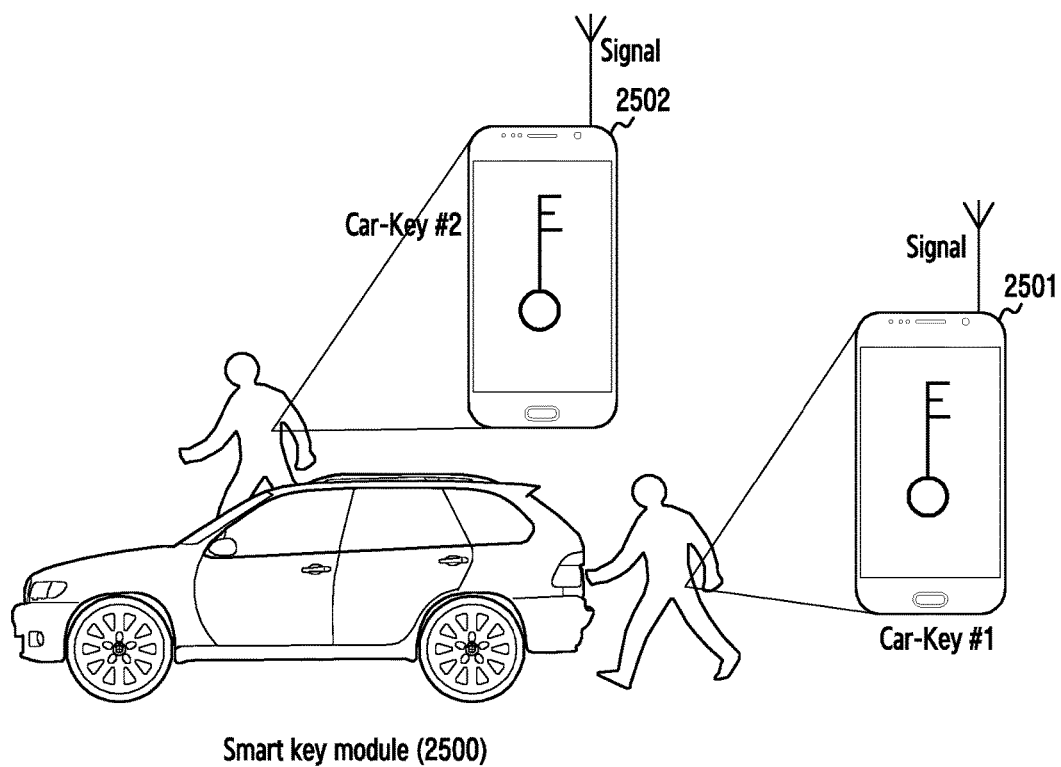
FIG. 25 is a diagram illustrating an example operation in which a plurality of electronic devices interwork with one vehicle according to various example embodiments of the present disclosure.

FIG. 25 is a diagram illustrating an example operation in which a plurality of electronic devices interwork with one vehicle according to various example embodiments of the present disclosure. A first electronic device 2501 or a second electronic device 2502 according to various example embodiments may include all or some parts of the electronic device 101 of FIG. 1. According to various example embodiments, at least one electronic device 2501 or 2502 may include information related to a smart key of at least one vehicle, and may control at least one vehicle by using the information related to the smart key. For example, a smart key module 2500 equipped in the vehicle may simultaneously interwork with the plurality of electronic devices 2501 and 2502.

Referring to FIG. 25 according to various example embodiments, the vehicle may interwork with each of the plurality of electronic devices, for example, the first electronic device 2501 and the second electronic device 2502 which include the smart key for a vehicle control.

According to various example embodiments, a key included in the first electronic device 2501 and a key included in the second electronic device 2502 may be fixed in advance as a master key and an auxiliary key, or may be mutually changed to the master key (e.g., a driver key) and the auxiliary key (e.g., a passenger key) on the basis of information related to each electronic device 2501 or 2052. For example, information related to each electronic device 2501 or 2502 may include at least one of strength, distance, and access angle of an RF signal.

According to various example embodiments, the first electronic device 2501 fixed or set to the master key may have a preferential control right to a vehicle control operation over the second electronic device 2502 fixed or set to the auxiliary key.

According to various example embodiments, the second electronic device 2502 fixed or set to the auxiliary key may perform the vehicle control operation in a more limited manner than the first electronic device 2501. For example, the vehicle control operation of the second electronic device 2502 may be limited to an operation that can be performed by a fellow passenger while avoiding an interference in driving such as opening/closing of a window or the like.

Figure 26:
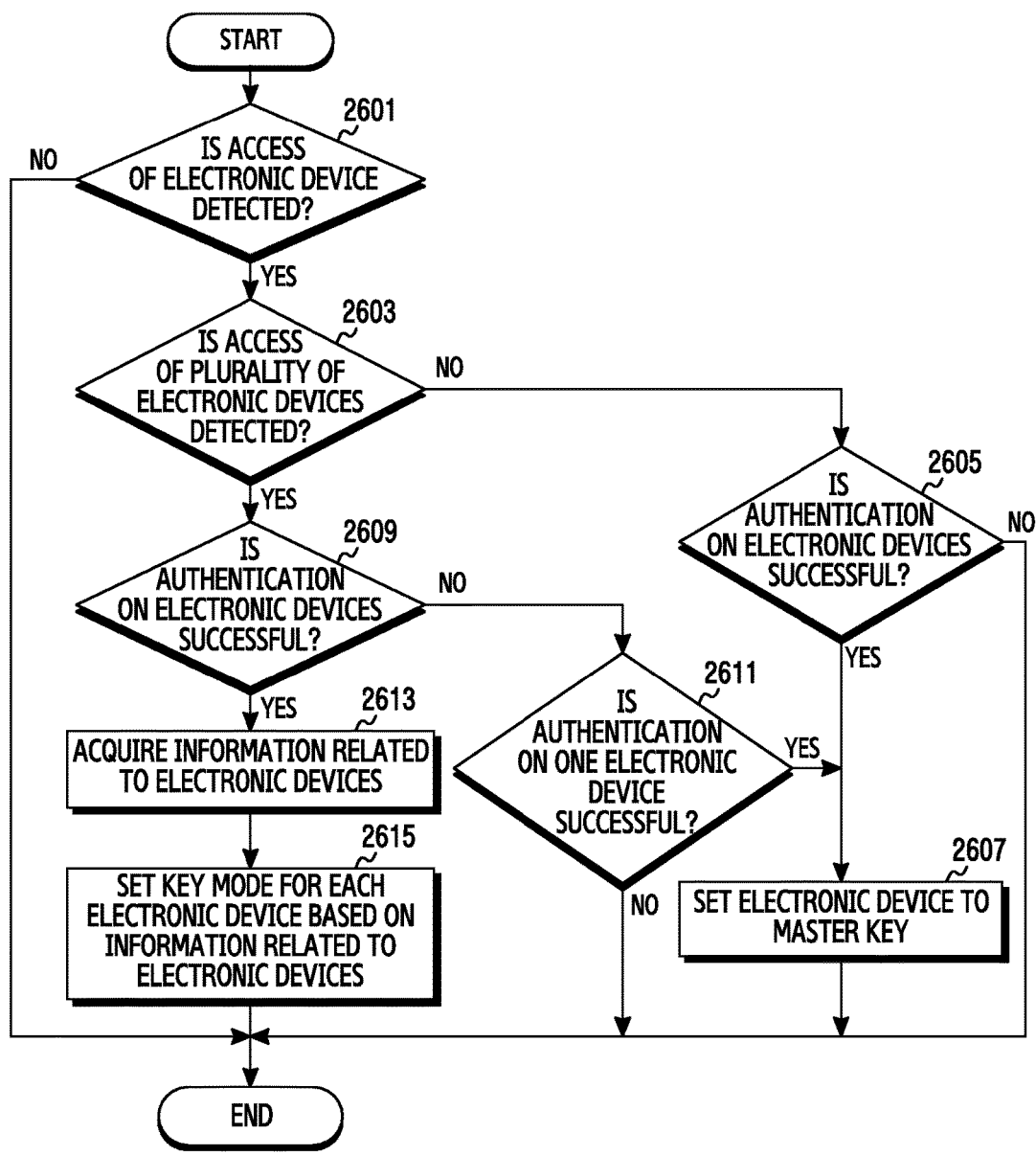
FIG. 26 is a flowchart illustrating an example operation in which a vehicle differently provides a vehicle control service by distinguishing a plurality of electronic devices according to various example embodiments of the present disclosure.

FIG. 26 is a flowchart illustrating an example operation in which a vehicle differently provides a vehicle control service by distinguishing a plurality of electronic devices according to various example embodiments of the present disclosure. The vehicle according to various example embodiments may include all or some parts of the smart key module 900 of FIG. 9 or the smart key module 1000 of FIG. 10. For example, the plurality of electronic devices may interwork by being divided into a master key and an auxiliary key of one vehicle.

Referring to FIG. 26 according to various example embodiments, in operation 2601, the vehicle may confirm whether an access of the electronic device is detected. For example, the vehicle may confirm whether a response signal is received in response to a call signal transmitted cyclically or persistently from the vehicle to detect the access of the electronic device. If the response signal is received, the vehicle may determine that the access of the electronic device is detected. For another example, the vehicle may confirm whether the call signal cyclically or persistently transmitted from the electronic device is received. If the call signal is received, the vehicle may determine that the access of the electronic device is detected.

In operation 2603 according to various example embodiments, the vehicle may determine whether the plurality of electronic devices have access simultaneously thereto. For example, the vehicle may confirm whether a response signal is received in response to the call signal from the plurality of electronic devices. For example, the vehicle may confirm whether the call signal is received from the plurality of electronic devices.

In operation 2605 according to various example embodiments, if it is determined that one electronic device has access thereto, the vehicle may confirm whether the electronic device is successfully authenticated through an authentication procedure on the electronic device. For example, if the call signal is received from the electronic device, the vehicle may compare a password included in the call signal with a password pre-stored in the vehicle to determine whether the electronic device can be authenticated. For example, if the pre-stored password is matched to the password included in the call signal, the vehicle may determine that the electronic device is successfully authenticated. For another example, the vehicle may compare a variety of identification information (e.g., electronic device identification information, user identification information, etc.)

pre-set for the vehicle control with identification information provided from the electronic device to determine whether the electronic device can be authenticated. For example, if the variety of pre-set identification information is matched to the identification information provided from the electronic device, the vehicle may determine that the electronic device is successfully authenticated.

If the authentication on the electronic device fails, the vehicle according to various example embodiments may determine that the electronic device is not an electronic device registered for the vehicle control. Accordingly, the vehicle may restrict the vehicle control performed by the electronic device.

In operation 2607 according to various example embodiments, if the electronic device is successfully authenticated, the vehicle may set a key stored in the electronic device as a master key of the vehicle. For example, the vehicle may provide a driver customized service such as a driver seat automatic adjustment, a driving mirror automatic adjustment, or the like on the basis of information corresponding to the electronic device. For example, the vehicle may acquire information corresponding to the electronic device from the smart key module of the vehicle or the electronic device. According to various example embodiments, the vehicle may set a key stored in the electronic device as a master key of the vehicle on the basis of location information of the electronic device. For example, if a distance to the electronic device is beyond a range in which the vehicle can be controlled or if the electronic device faces a different direction other than the vehicle, the vehicle does not set the key stored in the electronic device as the master key of the vehicle.

In operation 2609 according to various example embodiments, if the plurality of electronic devices have access thereto, the vehicle may confirm whether the electronic device is successfully authenticated through an authentication procedure of each electronic device.

In operation 2611 according to various example embodiments, if the plurality of electronic devices are not successfully authenticated, the vehicle may confirm whether one of the plurality of electronic devices is successfully authenticated.

If the authentication on the plurality of electronic devices fails, the vehicle according to various example embodiments may determine that the plurality of electronic devices are not electronic devices registered for the vehicle control. Accordingly, the vehicle may restrict the vehicle control performed by the plurality of electronic devices.

If one electronic device is successfully authenticated among the plurality of electronic devices, in operation 2607, the vehicle according to various example embodiments may set the key stored in the electronic device successfully authenticated as the master key of the vehicle.

In operation 2613 according to various example embodiments, if the plurality of electronic devices are successfully authenticated, the vehicle may acquire information related to each electronic device. For example, the vehicle may include at least any one of strength (e.g., RSSI), distance, and access angle of a signal received from each of the plurality of electronic devices.

In operation 2615 according to various example embodiments, the vehicle may set a key mode (e.g., a master key or an auxiliary key) for each electronic device on the basis of the information related to each electronic device. For example, if signal strength of the first electronic device is greater than signal strength of the second electronic device among the plurality of electronic devices, the vehicle may set the first electronic device to a master key as a driver key, and may set the second electronic device to an auxiliary key as a passenger key. For another example, if a distance to the first electronic device is closer than a distance to the second electronic device, the vehicle may set the first electronic device to the master key as the driver key, and may set the second electronic device to the auxiliary key as the passenger key. For example, if an access angle of the first electronic device is a straight line and if an access angle of the second electronic device is a curved line, the vehicle may set the first electronic device to the master key as the driver key, and may set the second electronic device to the auxiliary key as the passenger key.

The electronic device which is set to the master key according to various example embodiments may enter a driver mode, and may automatically execute a function required for vehicle driving such as a navigation application or the like. The vehicle may provide a driver customized service such as a driver seat automatic adjustment, a driving mirror automatic adjustment, or the like on the basis of information corresponding to the first electronic device.

According to various example embodiments, the second electronic device set to the auxiliary key may enter a passenger mode to interwork with the Internet or the like installed in the vehicle. The vehicle may provide a passenger customized service such as a passenger seat automatic adjustment, an auxiliary mirror automatic adjustment, or the like on the basis of information corresponding to the second electronic device.

According to various example embodiments, the vehicle may detect that a driver is changed when the vehicle stops, a door is open in a driver seat, and an electronic device including a new key is detected in a direction of the driver seat. Accordingly, the vehicle may change the driver customized service on the basis of information corresponding to the electronic device including the new key. For example, if the electronic device including the new key is successfully authenticated, the vehicle may automatically adjust locations of the driver seat and the driving mirror on the basis of the information corresponding to the electronic device including the new key.

Figure 27:
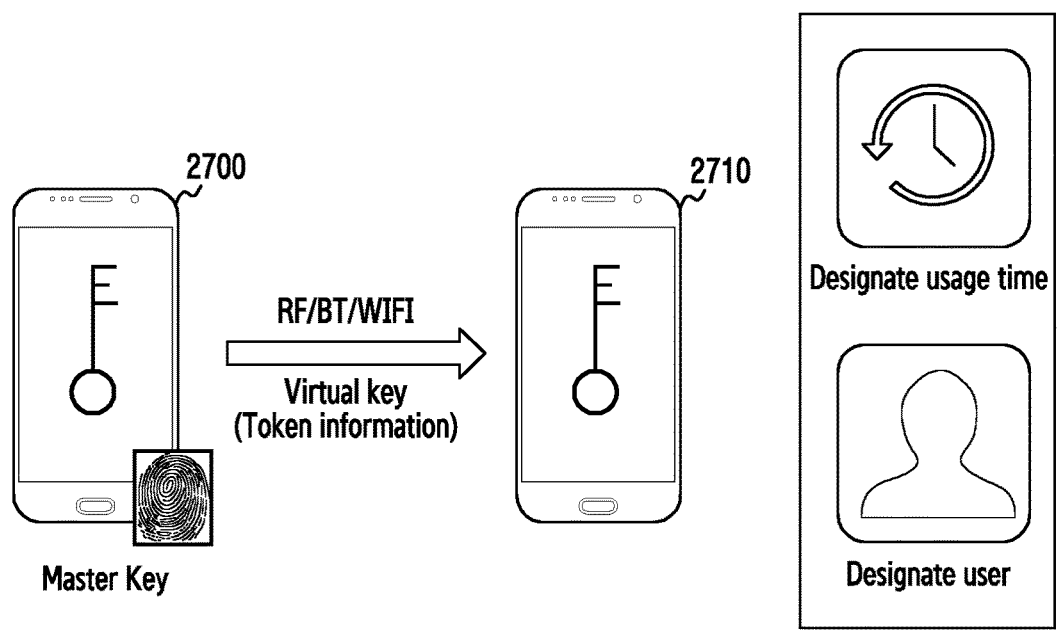
FIG. 27 is a diagram illustrating an example of a method for providing a temporary key in an electronic device according to various example embodiments of the present disclosure.

FIG. 27 is a diagram illustrating an example of a method for providing a temporary key in an electronic device according to various example embodiments of the present disclosure. An electronic device 2700 according to various example embodiments may include all or some parts of the electronic device 101 of FIG. 1. For example, a user may issue a temporary key for temporarily allowing a vehicle control and provide it to others.

Referring to FIG. 27 according to various example embodiments, the electronic device 2700 may deliver at least one part of information related to the vehicle control to a different electronic device 2710. For example, if the user is successfully authenticated through a user authentication procedure, the electronic device 2700 may provide a temporary key for the vehicle control to the different electronic device 2710. The electronic device 2700 may transmit the temporary key to the different electronic device 2710 in a state of including a master key for the vehicle control. For example, the electronic device 2700 may perform the user authentication by using at least one of user's bio information (e.g., a fingerprint, an iris, a retina, a vein, etc.), a password (e.g., a PIN number), and pattern information.

According to various example embodiments, the electronic device 2700 may set a vehicle control right using the temporary key. For example, the electronic device 2700 may set at least one vehicle control right of at least one of an electronic device (e.g., the different electronic device 2710), user, time, and region capable of controlling the vehicle by using the temporary key.

As token information of a virtual key, the temporary key according to various example embodiments may be transmitted from the electronic device 2700 to the different electronic device 2710 through RF, Bluetooth, WiFi, or the like.

According to various example embodiments, if the temporary key is provided from the electronic device 2700, the different electronic device 2710 may automatically take out an insurance service for the vehicle corresponding to the temporary key. For example, the different electronic device 2710 may transmit at least one part of the vehicle control right to the temporary key (e.g., user information, time) and vehicle information to an insurance server and thus may take out insurance on the vehicle. For another example, the different electronic device 2710 may transmit user information and vehicle information provided from the different electronic device 2710 or an external electronic device (e.g., a server) to take out insurance on the vehicle.

According to various example embodiments, the vehicle corresponding to the temporary key may restrict the vehicle control function for the different electronic device 2710 on the basis of the vehicle control right set to the temporary key. For example, if the different electronic device 2710 controls the vehicle by using the temporary key, the vehicle may confirm whether it is beyond the vehicle control right which is set to the temporary key. If it is beyond the vehicle control right which is set to the temporary key, the vehicle may transmit noncompliance information on the vehicle control right or reconfiguration request information of the vehicle control right to the electronic device 2700 including the master key for the vehicle. For another example, if it is beyond the vehicle control right which is set to the temporary key, the vehicle may be configured such that a speed of the vehicle does not exceed a reference speed, or may restrict persistent driving of the vehicle.

According to various example embodiments, the electronic device 2700 may display an image indicating a shape of a smart key and at least one icon for controlling the smart key on a display of the electronic device 2700. For example, the electronic device 2700 may display various shapes of icons on the display to select at least one of smart key registering, discarding, reissuing, right controlling, temporary key issuing, or the like. Accordingly, the user may execute a smart key application by intuitively touching an image having a smart key shape displayed on the display of the electronic device 2700. Further, the user may easily execute at least one function among smart key registering, discarding, reissuing, right controlling, temporary key issuing, or the like by selecting one of various shapes of icons displayed on the display.

Figure 28:
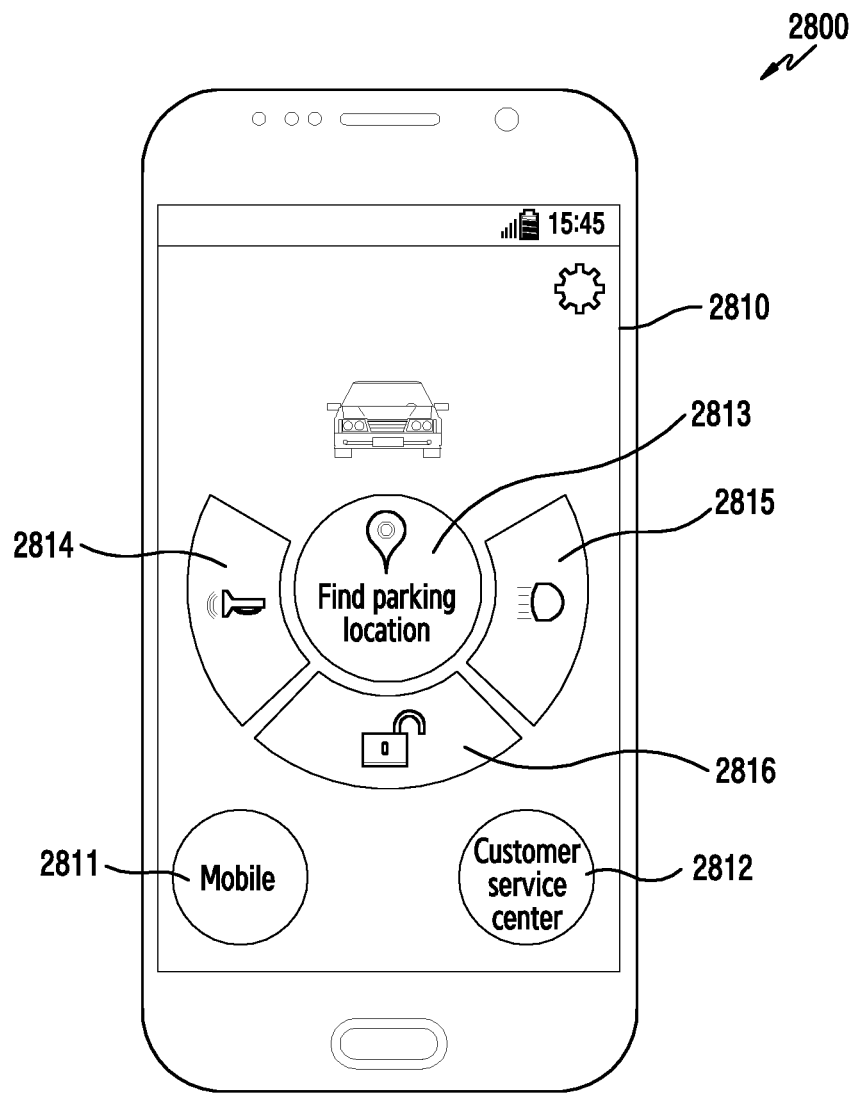
FIG. 28 is a diagram illustrating an example of a main screen for a vehicle control mode of an electronic device according to various example embodiments of the present disclosure.

FIG. 28 is a diagram illustrating an example of a main screen for a vehicle control mode of an electronic device according to various example embodiments of the present disclosure. An electronic device 2800 according to various example embodiments may include all or some parts of the electronic device 101 of FIG. 1. For example, a variety of information may be displayed on a main screen 2810 of the electronic device 2800.

According to various example embodiments, the main screen 2810 of the electronic device 2800 may display at least one object among a text, an image, an icon, and a menu. For example, the main screen 2810 may display various menus and information such as a logo 2811 of a vehicle as a remote control target, a menu 2812 for a contact with a customer service center, a menu 2813 for finding a parking location, a menu 2814 for issuing a vehicle warning sound, a menu 2815 for emitting vehicle illumination, a menu 2816 for releasing locking of the electronic device 2800 or the vehicle, or the like.

Figure 29:
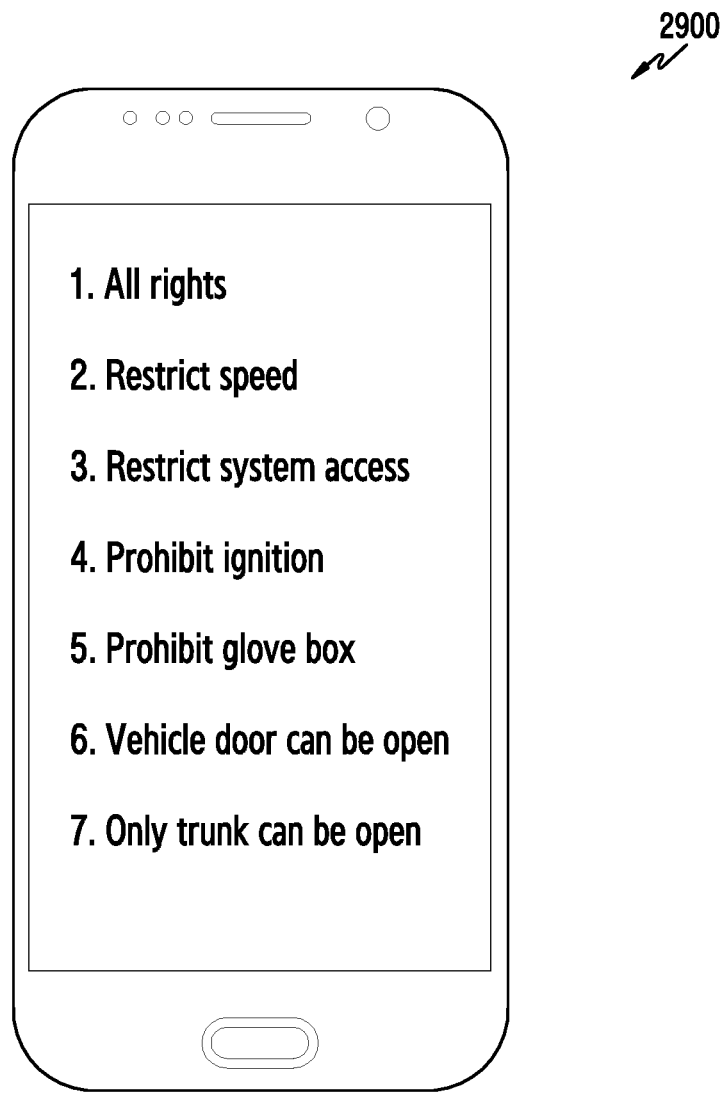
FIG. 29 is a diagram illustrating an example of a method for restricting a usage right of a temporary key in an electronic device according to various example embodiments of the present disclosure.

FIG. 29 is a diagram illustrating an example of a method for restricting a usage right of a temporary key in an electronic device according to various example embodiments of the present disclosure. An electronic device 2900 according to various example embodiments may include all or some parts of the electronic device 101 of FIG. 1. For example, a user may restrict the usage right if the temporary key is issued to temporarily allow a vehicle control.

Referring to FIG. 29 according to various example embodiments, if the temporary key is issued or any auxiliary key or the like is issued, the electronic device 2900 may restrictively designate a right to the temporary key or any auxiliary key. For example, if the temporary key or the auxiliary key is issued, the electronic device 2900 may display an item for restricting a right such as: "1. all rights"; "2. restrict speed", "3. restrict system access", "4. prohibit ignition", "5. prohibit glove box", "6. vehicle door can be open", "7. only trunk can be open", etc., on a display in a shape of a menu or an icon.

According to various example embodiments, the electronic device 2900 may set a right to the temporary key or the auxiliary key on the basis of a user's selection input on an item for controlling the right displayed on the display. For example, if one item (e.g., 6. vehicle door can be open) is selected on the basis of the user input, the electronic device 2900 may display a sub menu for setting the item in detail on the display. The electronic device 2900 may set the right to the temporary key or the auxiliary key for the item on the basis of the user input on the sub menu.

According to various example embodiments of the present disclosure, a method may include receiving first information related to a selected vehicle by an electronic device including a display, a first communication circuit supporting a cellular communication protocol, a second communication circuit supporting a short-distance communication protocol, at least one sensor, a processor, and a storage unit through the first communication circuit or the second communication circuit, storing the received first information and/or second information generated or provided on the basis of at least one part of the first information in the storage unit, receiving a first signal from the selected vehicle by using the second communication circuit and/or the sensor, determining strength of the first signal, and changing the determined strength by using the second information, and transmitting information regarding the changed strength to the outside either with a selected cycle or during a selected time by using the second communication circuit.

According to various example embodiments, the first information may include at least any one of an ID number of the vehicle, key box information related to the ID number, a password, and biometric information.

According to various example embodiments, the second information may include information regarding a magnitude of an output signal based on a relative location of the electronic device on the basis of the selected vehicle.

According to various example embodiments, the relative location of the electronic device may include an interior of the vehicle and an exterior of the vehicle on the basis of the selected vehicle.

According to various example embodiments, the relative location of the electronic device may include a location less than a first distance from an external housing of the vehicle or greater than or equal to the first distance and less than a second distance from the external housing on the basis of the selected vehicle.

According to various example embodiments, the second communication circuit may include at least one of Wireless Fidelity (WiFi), Bluetooth, Near Field Communication (NFC), and Global Navigation Satellite System (GNSS).

According to various example embodiments, a method of remotely performing a vehicle control operation through wireless communication with a vehicle may be provided by using various types of electronic devices such as a smart phone or the like.

According to various example embodiments, a method of performing various additional service operations such as key registering, discarding, reissuing, right controlling, temporary key issuing, or the like may be provided by using various types of electronic devices such as a smart phone or the like.

While the disclosure has been illustrated and described with reference to certain example embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be understood as being included in the present disclosure.

What is claimed is:

1. An electronic device comprising:
a first communication circuit;
a second communication circuit;
a memory; and
a processor electrically coupled to the first communication circuit, the second communication circuit, and the memory,
wherein the memory stores at least one instruction, which when executed by the processor is configured to cause the electronic device to:
detect a first Received Signal Strength Indicator (RSSI) value of a Radio Frequency (RF) signal received from a vehicle through the first communication circuit,
determine, based on the first RSSI value and RSSI deviation information stored in the memory, a second RSSI value, and
transmit the RF signal including the second RSSI value to the vehicle through the first communication circuit.

2. The apparatus of claim 1, wherein the RSSI deviation information comprises an RF characteristic data table for correcting an RF reception signal sensitivity difference between a smart key corresponding to a smart key module equipped in the vehicle and the first communication circuit.

3. The apparatus of claim 1,
wherein the first communication circuit is configured to support a short-distance communication protocol, and
wherein the processor is configured to adjust an input gain of the RF signal of the first communication circuit to correct the RF reception signal sensitivity difference between the smart key corresponding to the smart key module equipped in the vehicle and the first communication circuit.

4. The apparatus of claim 1, wherein the processor is configured to download the RSSI deviation information from a server configured to provide the RSSI deviation information, and to store the RSSI deviation information in the memory.

5. The apparatus of claim 1, wherein the processor is configured to download information related to the smart key from a server configured to provide the information related to the smart key corresponding to the smart key module equipped in the vehicle, the processor further configured to generate the RSSI deviation information based on at least one part of the information related to the smart key and to store the deviation information in the memory.

6. The apparatus of claim 1, further comprising:
a display that comprises a touch screen, and
wherein an image representing a shape of the smart key and an icon for selecting at least one of: smart key registering, discarding, reissuing, right controlling, and temporary key issuing, are displayed on the display.

7. The apparatus of claim 1, wherein the processor is configured to perform at least one of: smart key registering, discarding, reissuing, right controlling, and temporary key issuing to control the vehicle through the smart key module.

8. The apparatus of claim 1, further comprising an antenna configured to transmit/receive the RF signal, wherein the antenna comprises at least one of: a Low Frequency (LF) antenna and an Ultra High Frequency (UHF) antenna.

9. The apparatus of claim 8, wherein the antenna is disposed with a battery pack of the electronic device.

10. The apparatus of claim 8, wherein the antenna comprises a plurality of antenna portions disposed on different sides of the battery pack and configured to be radiated in directions of x, y, and z axes, respectively, of the battery pack.

11. A method for operating an electronic device, the method comprising:
receiving first information related to a selected vehicle;
obtaining second information based on at least one part of the first information;
receiving a first signal from the selected vehicle;
determining a first received signal strength of the first signal, and determining, based on the first received signal strength and the second information, a second received signal strength; and
transmitting a response signal comprising information indicating the second received signal strength to the selected vehicle.

12. The method of claim 11, wherein the first information comprises at least one of: an identification number of the vehicle, key box information related to the identification number, a password, and biometric information.

13. The method of claim 11, wherein the second information comprises information regarding strength of a signal based on a relative location of the electronic device based on the selected vehicle.

14. The method of claim 13, wherein the relative location of the electronic device comprises an interior of the vehicle and an exterior of the vehicle based on the selected vehicle.

15. The method of claim 14, wherein the relative location of the electronic device comprises a location less than a first distance from an external housing of the vehicle or greater than or equal to the first distance and less than a second distance from the external housing of the vehicle based on the selected vehicle.

16. The method of claim 11, wherein the transmitting information regarding the second strength comprises transmitting information regarding the second strength to the selected car during a selected cycle or at a selected time using at least one of: a Wireless Fidelity (WiFi) circuit, a Bluetooth circuit, a Near Field Communication (NFC) circuit, and a Global Navigation Satellite System (GNSS) circuit.

17. An electronic device comprising:
a first communication circuit configured to support a cellular communication protocol;
a second communication circuit configured to adjust a magnitude of an output signal and to support a short-distance communication protocol;
a processor electrically connected to the first communication circuit, and the second communication circuit; and
a storage unit electrically connected to the processor,
wherein the storage unit stores at least one instruction, which when executed by the processor is configured to cause the electronic device to:
receive first information related to a selected vehicle through the first communication circuit or the second communication circuit,
obtain, based on at least one part of the first information, second information from the storage unit,
receive a first signal from the selected vehicle using the second communication circuit,
determine a first received signal strength of the first signal, and determine, based on the first received signal strength and the second information which is obtained based on the first information, a second received signal strength, and
transmit a response signal comprising information indicating the second received signal strength to the selected vehicle using the second communication circuit.

18. The apparatus of claim 17, wherein the first information comprises at least one of: an identification number of the vehicle, key box information related to the identification number, a password, and biometric information.

19. The apparatus of claim 17, wherein the second information comprises information regarding strength of a signal based on a relative location of the electronic device based on the selected vehicle.

20. The apparatus of claim 19, wherein the relative location of the electronic device comprises an interior of the vehicle and an exterior of the vehicle based on the selected vehicle.

* * * * *